(12) United States Patent
Craven et al.

(10) Patent No.: US 12,527,318 B2
(45) Date of Patent: Jan. 20, 2026

(54) SYSTEMS, APPARATUS AND METHODS TO PICK AND/OR PLACE SPECIMEN CONTAINERS

(71) Applicant: TMRW LIFE SCIENCES, INC., New York, NY (US)

(72) Inventors: James Norman Craven, Ely (GB); Ian James Riley, Middlesbrough (GB)

(73) Assignee: TMRW Life Sciences, Inc., New York, NY (US)

( * ) Notice: Subject to any disclaimer, the term of this patent is extended or adjusted under 35 U.S.C. 154(b) by 442 days.

(21) Appl. No.: 17/961,983

(22) Filed: Oct. 7, 2022

(65) Prior Publication Data

US 2023/0115885 A1 Apr. 13, 2023

Related U.S. Application Data

(60) Provisional application No. 63/253,856, filed on Oct. 8, 2021.

(51) Int. Cl.
*A01N 1/14* (2025.01)
*A01N 1/145* (2025.01)
(Continued)

(52) U.S. Cl.
CPC ........... *A01N 1/145* (2025.01); *B65G 47/905* (2013.01); *F25D 13/02* (2013.01)

(58) Field of Classification Search
CPC ...... F25D 25/04; F25D 25/027; F25D 29/001; F25D 3/11; F25D 25/00; A61J 1/05;
(Continued)

(56) References Cited

U.S. PATENT DOCUMENTS

| 4,573,581 A | 3/1986 | Galloway et al. |
| D300,583 S | 4/1989 | Smith |

(Continued)

FOREIGN PATENT DOCUMENTS

| AU | 2011357590 B2 | 9/2015 |
| AU | 2017287017 A1 | 1/2019 |

(Continued)

OTHER PUBLICATIONS

Description of EP3336456 (Year: 2018).*

(Continued)

*Primary Examiner* — Filip Zec
(74) *Attorney, Agent, or Firm* — Cozen O'Connor

(57) ABSTRACT

A system, device and method to pick and/or place specimen containers may include a pick and/or place head, a first secondary reservoir, and optionally a second secondary reservoir which hold cryogenic fluid in a liquid form, above a main reservoir of cryogenic liquid, to cool the pick and/or place head and/or to cool or recharge the specimen containers during transfer operations. Storage locations may be arrayed in wedge-shaped sets spaced above cryogenic liquid of the main reservoir of a cryogenic storage tank at one or more levels, and pivotal about a central axis via a motor and control system. A gap (e.g., wedge shaped gap) between two successively angularly adjacent sets of storage locations of the sets of storage locations at an upper level provides access to the storage locations of the sets of storage locations at a lower level. Cryogenic liquid temperatures and levels in reservoirs are monitored.

23 Claims, 26 Drawing Sheets

(51) Int. Cl.
*B65G 47/90* (2006.01)
*F25D 13/02* (2006.01)

(58) Field of Classification Search
CPC ........ C12M 45/22; A01N 1/145; A01N 1/125; A01N 1/14; A01N 1/142; A01N 1/162
See application file for complete search history.

(56) References Cited

U.S. PATENT DOCUMENTS

| | | | |
|---|---|---|---|
| 4,944,162 A * | 7/1990 | Lang | F25D 25/04 198/852 |
| D310,264 S | 8/1990 | Leoncavallo et al. | |
| 5,024,830 A | 6/1991 | Linner | |
| 5,176,202 A | 1/1993 | Richard | |
| 5,233,844 A * | 8/1993 | Knippscheer | F25D 3/102 414/331.05 |
| 5,355,684 A | 10/1994 | Guice | |
| 5,545,562 A | 8/1996 | Cassou et al. | |
| D382,809 S | 8/1997 | Aldrich et al. | |
| D382,810 S | 8/1997 | Aldrich et al. | |
| 5,711,446 A | 1/1998 | Jeffs et al. | |
| 5,741,462 A | 4/1998 | Nova et al. | |
| 5,751,629 A | 5/1998 | Nova et al. | |
| 5,874,214 A | 2/1999 | Nova et al. | |
| D408,145 S | 4/1999 | Au | |
| 5,921,102 A | 7/1999 | Vago | |
| 5,925,562 A | 7/1999 | Nova et al. | |
| 5,964,095 A | 10/1999 | Coelho et al. | |
| 6,066,300 A | 5/2000 | Carey et al. | |
| 6,100,026 A | 8/2000 | Nova et al. | |
| 6,141,975 A | 11/2000 | Tatsumi | |
| 6,156,566 A | 12/2000 | Bryant | |
| 6,302,327 B1 * | 10/2001 | Coelho | F17C 3/085 235/383 |
| 6,329,139 B1 | 12/2001 | Nova et al. | |
| 6,564,120 B1 | 5/2003 | Richard et al. | |
| 6,701,743 B1 | 3/2004 | Durst et al. | |
| D496,398 S | 9/2004 | Greenberg | |
| 6,888,063 B1 | 5/2005 | Lien et al. | |
| D506,550 S | 6/2005 | Greenberg | |
| 7,070,053 B1 | 7/2006 | Abrams et al. | |
| 7,091,864 B2 | 8/2006 | Veitch et al. | |
| D535,478 S | 1/2007 | Uffner et al. | |
| 7,228,198 B2 * | 6/2007 | Vollm | G07F 11/44 700/235 |
| 7,278,328 B2 | 10/2007 | Massaro | |
| 7,316,896 B2 | 1/2008 | Kuwayama et al. | |
| 7,350,703 B2 | 4/2008 | Ambartsoumian | |
| 7,411,508 B2 | 8/2008 | Harazin et al. | |
| D576,488 S | 9/2008 | Miota et al. | |
| 7,661,591 B2 | 2/2010 | Dearing et al. | |
| 7,694,886 B2 | 4/2010 | Tan et al. | |
| 7,861,540 B2 | 1/2011 | Cloutier et al. | |
| 7,870,748 B2 | 1/2011 | Byrne | |
| D642,697 S | 8/2011 | Gaefvert | |
| 8,097,199 B2 | 1/2012 | Abbott et al. | |
| 8,098,162 B2 | 1/2012 | Abbott et al. | |
| 8,115,599 B2 | 2/2012 | Harazin et al. | |
| 8,168,138 B2 | 5/2012 | Che et al. | |
| 8,378,827 B2 | 2/2013 | Davidowitz et al. | |
| D682,045 S | 5/2013 | Myoung | |
| 8,502,645 B2 | 8/2013 | Thomas et al. | |
| 8,710,958 B2 | 4/2014 | Yang et al. | |
| 8,790,597 B2 | 7/2014 | Childs et al. | |
| 8,852,536 B2 | 10/2014 | Davidowitz et al. | |
| 8,872,627 B2 | 10/2014 | Davidowitz | |
| 8,884,743 B2 | 11/2014 | Chaffey et al. | |
| 8,919,532 B2 | 12/2014 | Buergermeister et al. | |
| 8,937,550 B2 | 1/2015 | Phaneuf et al. | |
| 9,028,754 B2 | 5/2015 | Winter et al. | |
| 9,033,251 B2 | 5/2015 | Weisshaupt et al. | |
| D733,314 S | 6/2015 | Lui | |
| 9,140,487 B2 | 9/2015 | Chaffey et al. | |
| 9,163,869 B2 | 10/2015 | Warhurst et al. | |
| 9,211,540 B2 | 12/2015 | Lansdowne | |
| 9,280,738 B2 | 3/2016 | Dor et al. | |
| 9,289,770 B2 | 3/2016 | Lavi | |
| 9,297,499 B2 | 3/2016 | Jimenez-Rios et al. | |
| 9,418,265 B2 | 8/2016 | Morris et al. | |
| 9,431,692 B2 | 8/2016 | Davidowitz et al. | |
| D768,868 S | 10/2016 | Inoue | |
| D771,271 S | 11/2016 | Zingre | |
| 9,501,734 B2 | 11/2016 | Morris | |
| 9,516,876 B2 | 12/2016 | Inoue | |
| D777,941 S | 1/2017 | Piramoon | |
| 9,538,746 B2 | 1/2017 | Inoue | |
| 9,538,747 B2 | 1/2017 | Inoue | |
| 9,547,782 B2 | 1/2017 | Lansdowne | |
| 9,551,649 B2 | 1/2017 | Houghton et al. | |
| 9,589,225 B2 | 3/2017 | Morris | |
| 9,619,678 B2 | 4/2017 | Morris et al. | |
| 9,697,457 B2 | 7/2017 | Morris | |
| 9,723,832 B2 | 8/2017 | Camenisch et al. | |
| 9,736,890 B2 | 8/2017 | Chaffey et al. | |
| 9,764,325 B2 | 9/2017 | Davidowitz | |
| 9,796,574 B2 | 10/2017 | Frey et al. | |
| 9,835,640 B2 * | 12/2017 | Raicu | B65G 1/06 |
| 9,902,068 B1 * | 2/2018 | Sestok, IV | B25J 9/1679 |
| 9,928,457 B2 | 3/2018 | Mcdowell | |
| D816,165 S | 4/2018 | Haug | |
| D835,472 S | 12/2018 | Seiders et al. | |
| 10,156,386 B2 | 12/2018 | Bartlett et al. | |
| D840,684 S | 2/2019 | Luburic | |
| 10,207,270 B2 | 2/2019 | Lansdowne | |
| 10,241,015 B2 | 3/2019 | Hollabaugh et al. | |
| D845,139 S | 4/2019 | Wilson et al. | |
| 10,328,431 B2 | 6/2019 | Davidowitz | |
| 10,401,082 B2 | 9/2019 | Coradetti et al. | |
| 10,493,457 B2 | 12/2019 | Croquette et al. | |
| 10,531,657 B2 | 1/2020 | Farrington et al. | |
| D874,875 S | 2/2020 | Huang | |
| 10,561,141 B2 | 2/2020 | Suzuki et al. | |
| 10,677,810 B2 | 6/2020 | Grimwood et al. | |
| D890,948 S | 7/2020 | Figueredo et al. | |
| 10,748,050 B2 | 8/2020 | Morris et al. | |
| D910,836 S | 2/2021 | Sandberg et al. | |
| 10,973,226 B2 | 4/2021 | Blair et al. | |
| 10,989,636 B2 | 4/2021 | Gutelius et al. | |
| D928,343 S | 8/2021 | Bonnoitt et al. | |
| D930,186 S | 9/2021 | Kim | |
| D931,128 S | 9/2021 | Li | |
| D932,906 S | 10/2021 | Schulz | |
| 11,148,143 B2 | 10/2021 | Davidowitz et al. | |
| 11,175,298 B2 | 11/2021 | Neeper et al. | |
| D938,053 S | 12/2021 | Xiao | |
| D945,271 S | 3/2022 | Halgren et al. | |
| 12,006,126 B2 | 6/2024 | Davidowitz et al. | |
| 2002/0190845 A1 | 12/2002 | Moore | |
| 2002/0196146 A1 | 12/2002 | Moore | |
| 2003/0017082 A1 | 1/2003 | Van Deursen et al. | |
| 2003/0174046 A1 | 9/2003 | Abrams | |
| 2004/0100415 A1 | 5/2004 | Veitch et al. | |
| 2004/0227617 A1 * | 11/2004 | Vasquez | G06Q 30/0241 705/5 |
| 2004/0245329 A1 * | 12/2004 | Huang | H05K 5/0243 361/679.02 |
| 2004/0265831 A1 * | 12/2004 | Arav | A01N 1/145 435/2 |
| 2005/0058483 A1 | 3/2005 | Chapman et al. | |
| 2005/0237195 A1 | 10/2005 | Urban | |
| 2005/0247782 A1 | 11/2005 | Ambartsoumian | |
| 2006/0051239 A1 | 3/2006 | Massaro | |
| 2006/0283945 A1 | 12/2006 | Excoffier et al. | |
| 2007/0034226 A1 * | 2/2007 | Ferkel | A61C 15/02 132/329 |
| 2007/0068208 A1 | 3/2007 | Norman et al. | |
| 2007/0150375 A1 * | 6/2007 | Yang | G06Q 10/08 705/26.81 |
| 2007/0172396 A1 | 7/2007 | Neeper et al. | |
| 2007/0267419 A1 | 11/2007 | Fuhr et al. | |
| 2008/0012687 A1 | 1/2008 | Rubinstein | |
| 2008/0024301 A1 | 1/2008 | Fritchie et al. | |
| 2008/0121700 A1 | 5/2008 | Dearing et al. | |

(56) References Cited

U.S. PATENT DOCUMENTS

| | | |
|---|---|---|
| 2008/0239478 A1 | 10/2008 | Tafas et al. |
| 2009/0015430 A1 | 1/2009 | Harazin et al. |
| 2009/0026907 A1 | 1/2009 | Davidowitz et al. |
| 2009/0153993 A1* | 6/2009 | Garcia .................. G11B 17/22 360/31 |
| 2009/0188272 A1 | 7/2009 | Cloutier et al. |
| 2009/0318751 A1 | 12/2009 | Lansdowne |
| 2009/0322486 A1 | 12/2009 | Gerstel |
| 2010/0028214 A1 | 2/2010 | Howard et al. |
| 2010/0123551 A1 | 5/2010 | Fritchie |
| 2010/0141384 A1 | 6/2010 | Chen et al. |
| 2010/0281886 A1 | 11/2010 | Shaham et al. |
| 2010/0302040 A1 | 12/2010 | Davidowitz et al. |
| 2010/0318217 A1 | 12/2010 | Ferrer et al. |
| 2011/0088424 A1 | 4/2011 | Cloutier et al. |
| 2011/0088517 A1 | 4/2011 | Tsujimura et al. |
| 2011/0120148 A1 | 5/2011 | Yoshimura et al. |
| 2011/0137812 A1 | 6/2011 | Sherga |
| 2011/0143452 A1 | 6/2011 | Che et al. |
| 2011/0181875 A1 | 7/2011 | Nakahana et al. |
| 2011/0199187 A1 | 8/2011 | Davidowitz |
| 2011/0199188 A1 | 8/2011 | Dickson |
| 2011/0214243 A1* | 9/2011 | Major .................. B44D 3/006 15/257.06 |
| 2011/0251982 A1* | 10/2011 | Dluhos .................. B82Y 10/00 706/13 |
| 2011/0308271 A1 | 12/2011 | Schryver |
| 2011/0312102 A1 | 12/2011 | Jo |
| 2012/0060514 A1 | 3/2012 | Warhurst et al. |
| 2012/0060520 A1 | 3/2012 | Collins et al. |
| 2012/0060539 A1 | 3/2012 | Hunt et al. |
| 2012/0060541 A1 | 3/2012 | Hunt et al. |
| 2012/0064603 A1 | 3/2012 | Childs et al. |
| 2012/0167786 A1 | 7/2012 | Laugharn, Jr. |
| 2012/0187197 A1 | 7/2012 | Masin |
| 2012/0212330 A1 | 8/2012 | Halberthal et al. |
| 2012/0256806 A1 | 10/2012 | Davidowitz et al. |
| 2012/0272500 A1 | 11/2012 | Reuteler |
| 2012/0293338 A1 | 11/2012 | Chaffey et al. |
| 2013/0011226 A1 | 1/2013 | Camenisch et al. |
| 2013/0048711 A1 | 2/2013 | Burns et al. |
| 2013/0076215 A1 | 3/2013 | Davidowitz et al. |
| 2013/0106579 A1 | 5/2013 | Aubert et al. |
| 2013/0119562 A1 | 5/2013 | Shimizu et al. |
| 2013/0151004 A1 | 6/2013 | Winter et al. |
| 2013/0152710 A1 | 6/2013 | Laugharn et al. |
| 2013/0217107 A1 | 8/2013 | Pederson et al. |
| 2013/0236276 A1* | 9/2013 | Richter .................. G01N 35/04 414/222.07 |
| 2013/0342320 A1 | 12/2013 | Hinman et al. |
| 2014/0008355 A1 | 1/2014 | Chaffey et al. |
| 2014/0081445 A1* | 3/2014 | Villamar .............. G06Q 10/087 701/19 |
| 2014/0157798 A1 | 6/2014 | Jimenez-Rios et al. |
| 2014/0171829 A1 | 6/2014 | Holmes et al. |
| 2014/0230472 A1 | 8/2014 | Coradetti et al. |
| 2014/0352456 A1 | 12/2014 | Davidowitz |
| 2015/0045782 A1 | 2/2015 | Ottanelli |
| 2015/0084771 A1 | 3/2015 | Nikitin et al. |
| 2015/0122887 A1 | 5/2015 | Morris et al. |
| 2015/0125574 A1 | 5/2015 | Arent et al. |
| 2015/0153369 A1 | 6/2015 | Giovanoli |
| 2015/0204598 A1 | 7/2015 | Affleck et al. |
| 2015/0205986 A1 | 7/2015 | Morris et al. |
| 2015/0273468 A1 | 10/2015 | Croquette et al. |
| 2015/0295328 A1 | 10/2015 | Fireaizen |
| 2015/0356398 A1 | 12/2015 | Morris |
| 2015/0379390 A1 | 12/2015 | Morris |
| 2016/0026911 A1 | 1/2016 | Morris et al. |
| 2016/0063287 A1 | 3/2016 | Birrer et al. |
| 2016/0085913 A1 | 3/2016 | Evans et al. |
| 2016/0086003 A1 | 3/2016 | Nikitin |
| 2016/0095309 A1 | 4/2016 | Reuteler |
| 2016/0101908 A1 | 4/2016 | Minnette et al. |
| 2016/0143270 A1 | 5/2016 | Schryver |
| 2016/0175837 A1 | 6/2016 | Chaffey et al. |
| 2016/0232487 A1* | 8/2016 | Yonker .............. G06Q 10/0834 |
| 2016/0236387 A1 | 8/2016 | Carroll et al. |
| 2016/0288999 A1 | 10/2016 | Caveney et al. |
| 2016/0289000 A1 | 10/2016 | Caveney et al. |
| 2016/0349172 A1 | 12/2016 | Houghton et al. |
| 2016/0353730 A1 | 12/2016 | Harston et al. |
| 2016/0358062 A1 | 12/2016 | Morris |
| 2016/0367188 A1* | 12/2016 | Malik .................. G16H 40/67 |
| 2017/0113909 A1 | 4/2017 | Frey et al. |
| 2017/0122846 A1 | 5/2017 | Holmes et al. |
| 2017/0146636 A1 | 5/2017 | Alicot et al. |
| 2017/0184479 A1 | 6/2017 | Schryver et al. |
| 2017/0190056 A1 | 7/2017 | Lapham et al. |
| 2017/0320054 A1 | 11/2017 | Crum et al. |
| 2018/0020659 A1 | 1/2018 | Camenisch et al. |
| 2018/0043364 A1 | 2/2018 | Davidowitz |
| 2018/0055042 A1 | 3/2018 | Sarmentero Ortiz |
| 2018/0086533 A1 | 3/2018 | Nelland |
| 2018/0100868 A1 | 4/2018 | Grimwood et al. |
| 2018/0128210 A1 | 5/2018 | Garner |
| 2018/0135806 A1 | 5/2018 | Qu et al. |
| 2018/0137315 A1 | 5/2018 | Johns et al. |
| 2018/0154359 A1 | 6/2018 | Ueyama |
| 2018/0202908 A1* | 7/2018 | Croquette .............. F25D 25/04 |
| 2018/0272353 A1* | 9/2018 | Malin .................. F25D 25/00 |
| 2018/0313498 A1 | 11/2018 | Antola et al. |
| 2018/0368394 A1 | 12/2018 | Nelland et al. |
| 2019/0000073 A1 | 1/2019 | Pedersen et al. |
| 2019/0005304 A1* | 1/2019 | Adalsteinsson .. G01N 35/00871 |
| 2019/0025280 A1 | 1/2019 | Kaditz et al. |
| 2019/0060892 A1 | 2/2019 | Davidowitz et al. |
| 2019/0092555 A1 | 3/2019 | Ma et al. |
| 2019/0162639 A1 | 5/2019 | Gutelius et al. |
| 2019/0193078 A1 | 6/2019 | Fiondella et al. |
| 2019/0215948 A1 | 7/2019 | Arnitz et al. |
| 2019/0250181 A1 | 8/2019 | Seeber |
| 2019/0276233 A1 | 9/2019 | Caveney et al. |
| 2019/0277868 A1* | 9/2019 | Privat De Fortune .................. G01N 35/00732 |
| 2019/0293344 A1* | 9/2019 | Sun .................. G01N 35/026 |
| 2019/0297877 A1 | 10/2019 | Komatsu et al. |
| 2020/0093122 A1 | 3/2020 | Lin et al. |
| 2020/0097788 A1 | 3/2020 | Pedersen et al. |
| 2020/0107541 A1 | 4/2020 | Blair et al. |
| 2020/0143930 A1 | 5/2020 | Catchings et al. |
| 2020/0229429 A1 | 7/2020 | Blair et al. |
| 2020/0229431 A1 | 7/2020 | Blair et al. |
| 2020/0248638 A1 | 8/2020 | Engfehr et al. |
| 2020/0281191 A1 | 9/2020 | Ally et al. |
| 2020/0319625 A1 | 10/2020 | Morris et al. |
| 2021/0039937 A1 | 2/2021 | Tansey et al. |
| 2021/0121876 A1 | 4/2021 | Blair et al. |
| 2021/0135061 A1 | 5/2021 | Navabi |
| 2021/0244018 A1 | 8/2021 | Sandy et al. |
| 2022/0087253 A1 | 3/2022 | Gupta et al. |
| 2022/0136656 A1 | 5/2022 | Clarke et al. |
| 2022/0221476 A1 | 7/2022 | Craven et al. |
| 2023/0329230 A1 | 10/2023 | Li et al. |

FOREIGN PATENT DOCUMENTS

| | | | |
|---|---|---|---|
| CA | 2972315 | A1 | 8/2016 |
| CN | 102456118 | A | 5/2012 |
| CN | 105857932 | A | 8/2016 |
| CN | 105890965 | A | 8/2016 |
| CN | 106102460 | A | 11/2016 |
| CN | 205815766 | U | 12/2016 |
| CN | 106370879 | A | 2/2017 |
| CN | 106871546 | A | 6/2017 |
| CN | 107624751 | A | 1/2018 |
| CN | 108112576 | A | 6/2018 |
| CN | 207595583 | | 7/2018 |
| CN | 207663251 | U | 7/2018 |
| CN | 207675193 | U | 7/2018 |
| CN | 108541702 | A | 9/2018 |
| CN | 109258627 | A | 1/2019 |
| CN | 208425434 | U | 1/2019 |

(56) References Cited

FOREIGN PATENT DOCUMENTS

| | | |
|---|---|---|
| CN | 109922887 A | 6/2019 |
| CN | 110476952 A | 11/2019 |
| CN | 110517737 A | 11/2019 |
| CN | 209677194 U | 11/2019 |
| CN | 110550327 A | 12/2019 |
| CN | 110583618 A | 12/2019 |
| CN | 110589332 A | 12/2019 |
| CN | 110645752 A | 1/2020 |
| CN | 110667986 A | 1/2020 |
| CN | 210614415 U | 5/2020 |
| CN | 210709605 U | 6/2020 |
| CN | 210709624 U | 6/2020 |
| CN | 210711515 U | 6/2020 |
| CN | 111357738 A | 7/2020 |
| CN | 111418578 A | 7/2020 |
| CN | 111771211 A | 10/2020 |
| CN | 112090469 A | 12/2020 |
| CN | 112189657 A | 1/2021 |
| CN | 112325976 A | 2/2021 |
| CN | 112325978 A | 2/2021 |
| CN | 112340334 A | 2/2021 |
| CN | 112841172 A | 5/2021 |
| CN | 213274464 U | 5/2021 |
| CN | 112894791 A | 6/2021 |
| CN | 213863260 U | 8/2021 |
| CN | 213863569 U | 8/2021 |
| CN | 213872207 U | 8/2021 |
| CN | 213874569 U | 8/2021 |
| CN | 213995979 U | 8/2021 |
| CN | 214006820 U | 8/2021 |
| CN | 214216855 U | 9/2021 |
| CN | 214358041 U | 10/2021 |
| CN | 214398091 U | 10/2021 |
| CN | 214758843 U | 11/2021 |
| CN | 115352743 A | 11/2022 |
| CN | 219596677 U | 8/2023 |
| EP | 0411224 A2 | 2/1991 |
| EP | 0706825 A1 | 4/1996 |
| EP | 0811140 A1 | 12/1997 |
| EP | 1002211 A2 | 5/2000 |
| EP | 1366998 A3 | 3/2004 |
| EP | 1366998 B1 | 1/2006 |
| EP | 1916492 A1 | 4/2008 |
| EP | 2301857 A1 | 3/2011 |
| EP | 2315163 A1 | 4/2011 |
| EP | 2358196 A1 | 8/2011 |
| EP | 2467465 A1 | 6/2012 |
| EP | 2124171 B1 | 8/2012 |
| EP | 102011012887 A1 | 8/2012 |
| EP | 2666694 B1 | 7/2014 |
| EP | 1888239 B1 | 10/2014 |
| EP | 1981692 B1 | 6/2015 |
| EP | 2498968 B1 | 9/2015 |
| EP | 2335182 B1 | 10/2015 |
| EP | 2297736 B1 | 2/2016 |
| EP | 2292332 B1 | 7/2016 |
| EP | 2765183 B1 | 7/2016 |
| EP | 2614320 B1 | 10/2016 |
| EP | 2354729 B1 | 12/2016 |
| EP | 2873497 B1 | 5/2017 |
| EP | 2948247 B1 | 11/2017 |
| EP | 3336456 A1 * | 6/2018 ........... A01N 1/0221 |
| EP | 2743865 B1 | 6/2019 |
| EP | 2866938 B1 | 6/2019 |
| EP | 2232175 B1 | 8/2019 |
| EP | 3539899 A1 | 9/2019 |
| EP | 2965266 B1 | 10/2019 |
| EP | 2492663 B1 | 12/2019 |
| EP | 3655892 A1 | 5/2020 |
| EP | 3228191 B1 | 8/2020 |
| EP | 4252009 A4 | 4/2024 |
| ES | 2467465 A2 | 6/2014 |
| ES | 2595984 T3 | 1/2017 |
| FR | 3095602 A1 | 11/2020 |
| JP | 2000137031 A | 5/2000 |
| JP | 2001142861 A | 5/2001 |
| JP | 2004028595 A | 1/2004 |
| JP | 2005009863 A | 1/2005 |
| JP | 2005239366 A | 9/2005 |
| JP | 2005321935 A | 11/2005 |
| JP | 2007235905 A | 9/2007 |
| JP | 2007532867 A | 11/2007 |
| JP | 2008021082 A | 1/2008 |
| JP | 2008522184 A | 6/2008 |
| JP | 2010521725 A | 6/2010 |
| JP | 2012526966 A | 11/2012 |
| JP | 5278978 B2 | 5/2013 |
| JP | 2014174647 A | 9/2014 |
| JP | 2015019244 A | 1/2015 |
| JP | 2015087306 A | 5/2015 |
| JP | 2017508984 A | 3/2017 |
| JP | 2017514499 A | 6/2017 |
| JP | 2017165487 A | 9/2017 |
| JP | 2018511782 A | 4/2018 |
| JP | 6343934 B2 | 6/2018 |
| JP | 2018136246 A | 8/2018 |
| JP | 2018529062 A | 10/2018 |
| JP | 2019505042 A | 2/2019 |
| JP | 2019518974 A | 7/2019 |
| JP | 2019529938 A | 10/2019 |
| JP | 2019536973 A | 12/2019 |
| JP | 2020079797 A * | 5/2020 ........... A01N 1/0257 |
| KR | 20080070015 A | 7/2008 |
| KR | 102368093 B1 | 2/2022 |
| WO | 9216800 A1 | 10/1992 |
| WO | 0105687 A1 | 1/2001 |
| WO | 0194016 A1 | 12/2001 |
| WO | 02081743 A2 | 10/2002 |
| WO | 03061381 A1 | 7/2003 |
| WO | 2004026661 A1 | 4/2004 |
| WO | 2005093641 A1 | 10/2005 |
| WO | 2005109332 A1 | 11/2005 |
| WO | 2005115621 A1 | 12/2005 |
| WO | 2006029110 A1 | 3/2006 |
| WO | 2007024540 A1 | 3/2007 |
| WO | 2007049039 A1 | 5/2007 |
| WO | 2007075253 A2 | 7/2007 |
| WO | 2007092119 A1 | 8/2007 |
| WO | 2008024471 A2 | 2/2008 |
| WO | 2008057150 A1 | 5/2008 |
| WO | 2009003231 A1 | 1/2009 |
| WO | 2009004366 A1 | 1/2009 |
| WO | 2009017558 A1 | 2/2009 |
| WO | 2009094071 A3 | 10/2009 |
| WO | 2009120596 A1 | 10/2009 |
| WO | 2009155638 A1 | 12/2009 |
| WO | 2010037166 A1 | 4/2010 |
| WO | 2011069190 A1 | 6/2011 |
| WO | 2012083396 A1 | 6/2012 |
| WO | 2012100281 A1 | 8/2012 |
| WO | 2012033605 A3 | 11/2012 |
| WO | 2012033994 A3 | 12/2012 |
| WO | 2012033992 A3 | 4/2013 |
| WO | 2013053011 A1 | 4/2013 |
| WO | 2010014656 A3 | 5/2013 |
| WO | 2012034037 A3 | 5/2013 |
| WO | 2014001819 A1 | 1/2014 |
| WO | 2014006417 A1 | 1/2014 |
| WO | 2014009729 A1 | 1/2014 |
| WO | 2014114938 A2 | 7/2014 |
| WO | 2014157798 A1 | 10/2014 |
| WO | 2014191757 A1 | 12/2014 |
| WO | 2015073964 A1 | 5/2015 |
| WO | 2015109315 A3 | 10/2015 |
| WO | 2016081755 A1 | 5/2016 |
| WO | 2016120224 A1 | 8/2016 |
| WO | 2016160984 A1 | 10/2016 |
| WO | 2016160986 A3 | 11/2016 |
| WO | 2016200519 A1 | 12/2016 |
| WO | 2017014999 A1 | 1/2017 |
| WO | 2017075144 A1 | 5/2017 |
| WO | 2017109153 A1 | 6/2017 |
| WO | 2017149468 A1 | 9/2017 |
| WO | 2017215957 A1 | 12/2017 |

(56) References Cited

FOREIGN PATENT DOCUMENTS

| WO | 2018000051 A1 | 1/2018 |
|---|---|---|
| WO | 2018002287 A1 | 1/2018 |
| WO | 2018005129 A1 | 1/2018 |
| WO | 2018025053 A1 | 2/2018 |
| WO | 2018039727 A1 | 3/2018 |
| WO | 2018041516 A1 | 3/2018 |
| WO | 2018097267 A1 | 5/2018 |
| WO | 2018215588 A1 | 11/2018 |
| WO | 2019005450 A1 | 1/2019 |
| WO | 2019182900 A1 | 9/2019 |
| WO | 2020033578 A1 | 2/2020 |
| WO | 2020072945 A1 | 4/2020 |
| WO | 2021086983 A1 | 5/2021 |
| WO | 2022066943 A1 | 3/2022 |
| WO | 2022072646 A1 | 4/2022 |
| WO | 2022155225 A1 | 7/2022 |

OTHER PUBLICATIONS

Description of JP2020079797 (Year: 2020).*
Japanese Office Action for Japanese Patent Application No. 2022-525678, mailed May 29, 2023 (with English Translation) 12 pages.
Japanese Office Action, dated Jun. 6, 2023, for corresponding Japanese Application No. 2022-525679, 16 pages.
Canadian Office Action, for Canadian Application No. 3,202,347, dated Nov. 7, 2024 4 pages.
Fontaine, "Automated Visual Tracking for Behavioral Analysis of Biological Model Organisms," Dissertation (Ph.D.), California Institute of Technology, ProQuest Dissertations Publishing (2008), 156 pages.
Notice of Allowance for U.S. Appl. No. 17/321,174, mailed Jul. 12, 2023, 13 pages.
Japanese Office Action, dated Mar. 19, 2024, for corresponding Japanese Application No. 2023-519519, 15 pages.
Chinese Notice of Allowance for Application No. 2023-541871 mailed Oct. 8, 2024, 3 pages.
Comiso, S. et al., "Biot cryocarrier-standardized cryogenic temperature handling of biospecimens"; Biopreservation and Biobanking 13.3: A15. Mary Ann Liebert Inc. (Jun. 2015) (Year: 2015).
Non Final Office Action for U.S. Appl. No. 18/487,878, mailed Sep. 16, 2024, 25 pages.
Thermo Fisher Scientific Introduces System to Double Cryogenic Storage Capacity; M2 Presswire Oct. 27, 2011: NA (Year: 2011).
Zachman, "High-Resolution Studies of Intact Solid-Liquid Interfaces and Reactive Materials by Cryogenic Electron Microscopy"; Cornell University. ProQuest Dissertations & Theses, 2018. 10845397. (Year: 2018).
Final Office Action Issued in U.S. Appl. No. 18/113,297, mailed Aug. 27, 2024, 54 pages.
Notice of Allowance for U.S. Appl. No. 17/490,274, mailed Jun. 26, 2024, 13 pages.
Notice of Reasons for Refusal. Japanese Application No. 2023-518185, dated Jun. 17, 2024, 8 pages.
Non-Final Office Action Issued in U.S. Appl. No. 18/113,297, mailed May 14, 2024, 41 pages.
Notice of Reasons for Refusal, Japanese Application No. 2023-541871, dated Apr. 24, 2024, 3 pages.
"Secure Your Future with Cryofuture", Https://cryofuture.com, 2004, 13 pages.
"Your Partner for Local and Secure Cryostorage and Transportation", http://cryofuture.com, Clinic's workflow, 2024, 12 pages.
Australian Examination Report mailed Feb. 26, 2024, Application No. 2021348066, 8 pages.
International Search Report and Written Opinion for PCT/US2022/077741, mailed date Feb. 1, 2023, 12 pages.
EP Search Report mailed Mar. 6, 2024 in EP App No. 22739992.0, 7 pages.
EP Search Report mailed Nov. 7, 2023, in EP App No. 21808453.1, Nov. 11, 2023.
Japanese Office Action for Japanese Patent Application No. 2022-525678, mailed Oct. 12, 2023 (with English Translation) 12 pages.
Japanese Office Action for JP 2022-569516, mailed Nov. 8, 2023, 6 pages {with English Translation).
Non Final Office Action for U.S. Appl. No. 17/738,981, mailed Apr. 23, 2025, 29 pages.
"Abeyance Web App / Stay Connected", July 6, Abeyance Cry Solutions—Abeyateck, LLC, 2021, 3 pages.
"IVF Witness System: RI Witness TM ART Management System", Confidence, Efficiency and Trust, IVF Witness System—RI Witness—CooperSurgical Fertility Companies https//fertility.coopersurgical.com/equipment/ri-witness—Apr. 19, 2021, 28 pages.
"IVF Witness System: RI Witness Tm Art Management System", CooperSurgical Fertility Company 2021, 24 pages.
"RI Witness—Confidence, Efficiency and Trust", CooperSurgical, Fertility and Genomic Solutions, Order No. WIT_BRO_001_V13_ROW—Oct. 13, 2020, 13 pages.
"RI Witness—Product guide", CooperSurgical Fertility and Genomic Solutions, Order No. EQU_BRO_004, V1: ROW Oct. 24, 2018, 12 pages.
"S840 Lab Mover", Large Volume LNS Dry Vapor Shipper, Products Shipping, July 6, Abeyance Cry Solutions—Abeyateck, LLC, 2021, 3 pages.
"Simple, Secure—190° C. LN2 Vapor Storage", Products Shipping, July 6, Abeyance Cry Solutions—Abeyateck, LLC, 2021, 7 pages.
Brady printer Range, "Everyone is Unique" Continual cryopreservation monitoring from RI Witness, CooperSurgical, Inc. Order No. WIT_FLY_010_V2_US Oct. 14, 2020, 3 pages.
Comley, J., "New approaches to sample identification tracking and technologies for maintaining the quality of stored samples," Drug Discovery World Summer 2017. 11 pages.
CooperSurgical, RI Witness, Order No. CE 60010312 Version 3-ROW: Oct. 24, 2018, 12 pages.
Cryogenic Vials, Standard. Online, published date unknown. Retrieved on Dec. 8, 2021 from URL: https://www.nextdayscience.com/cryogenic-vials-standard.htm.
CX100 Cryo Express Dry Shipper With Shipping Case. Online, published date unknown. Retrieved on May 24, 2022 from URL:https://www.mitegen.com/product/cryo-express-dry-shipper-cx100-with-case, 2 pages.
Extended European Search Report dated Jun. 30, 2022, for European Application No. 19869478.8, 9 pages.
FluidX Tri-Coded Jacket: 0.7ml Sample Storage Tube with External Thread; Brooks Life Sciences; https://bioinventory.biostorage.com, 2019, 7 pages.
HID Beyond Cool: RFID disentangles cryopreservation storage and management, 2015, 4 pages.
Ihmig et al., "Frozen cells and bits," IEEE Pulse, Sep. 2013, 9 pages.
International Preliminary Report on Patentability and Written Opinion from PCT Application No. PCT/GB2005/002048 dated Aug. 23, 2005, 9 pages.
International Search Report and Written Opinion for International Application No. PCT/US2020/057779, Mailed on Jun. 17, 2021, 12 pages.
International Search Report and Written Opinion for PCT/US2020/057764, Mailed Date: Feb. 19, 2021, 14 pages.
International Search Report and Written Opinion for PCT/US2020/060565, mailed Mar. 8, 2021, 11 pages.
International Search Report and Written Opinion for PCT/US2021/051803, mailed Jan. 12, 2022, 6 pages.
International Search Report and Written Opinion for PCT/US2021/062676, mailed Apr. 1, 2022, 9 pages.
International Search Report and Written Opinion for PCT/US2021/063608, mailed Apr. 12, 2022, 11 pages.
International Search Report and Written Opinion for PCT/US2022/012151, mailed Apr. 29, 2022, 9 pages.
International Search Report and Written Opinion for PCT/US2022/028185, mailed Aug. 26, 2022, 11 pages.
International Search Report for PCT/US2021/032600, malled Sep. 3, 2021, 4 pages.
Non Final Office Action for U.S. Appl. No. 17/083,179, mailed Sep. 1, 2022, 8 pages.

(56) References Cited

OTHER PUBLICATIONS

Non Final Office Action for U.S. Appl. No. 17/321,174, mailed Nov. 22, 2022, 26 pages.
Non-Final Office Action Issued in U.S. Appl. No. 16/840,270, Mailed Sep. 21, 2021, 58 pages.
Notice of Allowance mailed Jan. 4, 2022, for "Cryogenic Vial", U.S. Appl. No. 29/748,815, 9 pages.
Notice of Reasons for Refusal for Japanese Patent Application No. 2021-518707, mailed May 11, 2022, 11 pages.
Notice of Reasons for Rejection, issued in corresponding Japanese Application No. 2021-518707, dated May 11, 2022, 5 pages.
Office Action dated Sep. 3, 2020, for U.S. Appl. No. 16/840,718, 46 pages.
OXO Airtight Pet Food Storage POP Container. Online published date unknown. Retrieved on May 24, 2022 from URL: https://www.walmart.com/ip/oxo-pet-food-storage-pop-container/623284606, 1 page.
Maggiulli, Roberta , et al., "Implementing an electronic witnessing system into a busy IVF clinic—one clinic's experience", Genera Center for Reproductive Medicine, Rome, Italy, 2 pages.
Rienzi, Laura , et al., Poster Witness "Electronic Witness System makes patients less concerned about biological sample mix-up errors and comfortable with IOVF clinical practice", Genera Center for Reproductive Medicine, Via de Notaris 2b, 00197, Rome, Italy. 2015, 1 page.
Swedberg, Claire , "Hitachi Chemical Markets Tiny UHF Tag", https://www.rfidjournal.com/hitachi-chemical-markets-tiny-uhf-tag, Sep. 12, 2010, 4 pages.
Thornhill, A. R, et al., Measuring human error in the IVF laboratory using an electronic witnessing system, Monduzzi Editoriale, Proceedings, 17th World Congress on Controversies in Obstetrics, Genecology & Infertility (GOGI), Nov. 8-11, 2012 Lisbon, Portugal, 6 pages.
"BioStore (TM) III Cryo" 2015, pp. 1-1, XP093203663, Internet Retrieved from the Internet: URL:https://corecryolab.com/wp-content/uploads/2016/04/Brooks-BioStore-III-Cryo-One-Pager-Automation.
"BioStoreTM III Automated LN2 Sample Storage Solutions", brookslifesciences.com. Mar. 17, 2020 (Mar. 17, 2020), pp. 1-6.
Notice of Allowance, mailed Feb. 14, 2025, for U.S. Appl. No. 18/113,297, 27 pages.
EP Search Report in EP App No. 22808100.6, mailed Mar. 6, 2025, 9 pages.
EP Search Report mailed Dec. 19, 2024, in European Patent Application No. 22879511.8, 8 pages.
European Patent Search Report mailed Sep. 27, 2024 in EP Application No. 21873453.1. in 6 pages.
European Search Report dated Sep. 20, 2024, for European Application No. 20955465.8 in 7 pages.
Extended European Search Report for European Application No. 21876482.7, dated Oct. 2, 2024, 7 pages.

* cited by examiner

SYSTEMS, APPARATUS AND METHODS TO PICK AND/OR PLACE SPECIMEN CONTAINERS

TECHNICAL FIELD

The present disclosure relates generally to systems, apparatus and/or methods to pick and/or place specimen containers, for example picking specimen containers and/or placing specimen containers to an array of specimen containers, for instance in a cryogenic environment.

BACKGROUND

Description of the Related Art

Long-term preservation of cells and tissues through cryopreservation has broad impacts in multiple fields including tissue engineering, fertility and reproductive medicine, regenerative medicine, stem cells, blood banking, animal strain preservation, clinical sample storage, transplantation medicine, and in vitro drug testing. This can include the process of vitrification in which a biological sample (e.g., an oocyte, an embryo, a biopsy) contained in or on a specimen holder is rapidly cooled by placing the biological sample and the specimen holder in a substance, such as liquid nitrogen. This results in a glass-like solidification or glassy state of the biological sample (e.g., a glass structure at the molecular level), which maintains the absence of intracellular and extracellular ice (e.g., reducing cell damage and/or death) and, upon thawing, improves post-thaw cell viability. To ensure viability, the vitrified biological samples are then typically continuously stored in a liquid nitrogen dewar or other container, which is at a temperature conducive to cryopreservation, for example negative 196 degrees Celsius.

BRIEF SUMMARY

The specimen holder may, for example, take the form of a cryopreservation straw, cryopreservation tube, cryopreservation stick or cryopreservation spatula. The specimen holders are typically placed in a specimen container. The specimen container typically comprises a vial and a cap, the cap selectively removable from the vial to access an interior of the vial. In some instances, two or more specimen holders may be placed in a single specimen container. In other instances, as described in Applicant's own patent applications, a specimen holder may be attached or fixed to the cap. The cap may be removably attached to the vial, for example, via mating threads or a snap fit. As also described in Applicant's own patent applications, the specimen containers and/or even the specimen holder(s) can include identification information, for instance in the form of one or more of: direct markings or indicia made on the specimen containers or specimen holders; one or more labels (e.g., labels bearing printed or hand written indicia); one or more machine-readable symbols (e.g., one-dimensional or barcode symbols; two-dimensional code symbols) and/or one or more wireless transponders (e.g., radio frequency identification (RFID) transponders). While denominated as radio frequency identification, it is noted that RFID typically encompasses wireless transmission in the radio frequency and/or microwave frequency portions of the electromagnetic spectrum. Hence, references herein to radio or radio frequency are not intended to be limited to the radio frequency range of the electromagnetic spectrum unless clearly indicated otherwise, and typically are meant to also include the microwave frequency range of the electromagnetic spectrum.

The ability to accurately identify, manage, inventory, store, and/or retrieve biological specimens is typically considered an objective of any system or facility (e.g., in vitro fertilization (IVF) facility). Vitrification can be damage direct markings or indicia, labels, and/or machine readable symbols. In any case, wireless interrogation of wireless transponders may be preferred as a more fully automated approach to identification.

The specimen containers in many implementations will be closely spaced with respect to one another, for instance to minimize the amount of storage spaced required and/or to maximize the number of specimens that may be stored in a given volume of space (e.g., stored in a volume of a cryogenic freezer or dewar). For example, a plurality of specimen containers may be arrayed in a carrier, tray or shelf, the specimen containers spaced within a few centimeters of one another. A storage space (e.g., a cryogenic freezer or dewar) may contain a plurality of these carriers, trays or shelves, for example arrayed about a central axis, and at two or more levels along the central axis.

Conventionally, entire carriers, trays or shelves that hold a plurality of specimen containers are retrieved from and/or placed into the cryogenic environment. While retrieval of only one or a limited number of specimen containers may be desired, conventional approaches that retrieve entire carriers, trays or shelves expose many more specimen containers to non-cryogenic temperatures then need to be exposed. The close spacing of specimen containers in an array may cause difficulties in picking specimen containers from and/or placing specimen containers into the array. While not limited to cryogenic environments, such difficulties may be exacerbated where the specimen containers are located in a cryogenic environment such as a cryogenic freezer or dewar, as such cryogenic environments typically provided limited access to the interior of the cryogenic environment, typically through a single opening or aperture at a top of the cryogenic freezer or dewar.

Various systems, devices and methods are described herein that advantageously address the various issues presented with picking or retrieving individual specimen containers from an array of specimen containers and/or placing individual specimen containers into an array of specimen containers, even where the array of specimen containers is located in a cryogenic freezer or dewar. Such may advantageously reduce or even eliminate exposure of other specimen containers to non-cryogenic temperatures. Such may also advantageously automate retrieval and/or placement of specimen containers, whether from or into cryogenic storage or non-cryogenic storage, reducing manual labor, increasing accuracy and/or improving tracking of specimen container and specimens held by the specimen containers. Such may also advantageously cool a pick and/or place head or portion thereof before engaging a specimen container during a pick operation in which the specimen container is retrieved from storage (e.g., cryogenic storage tank) and/or during a place operation in which the specimen container is placed into storage (e.g., cryogenic storage tank). Additionally or alternatively, such may advantageously charge or recharge a specimen container with liquid cryogenic fluid, for example during a pick operation in which the specimen container is retrieved from storage (e.g., cryogenic storage tank), whereas the specimen container might otherwise contain cryogenic fluid in a gaseous or vapor form.

A system to store and/or retrieve specimen containers can be summarized as including: a first secondary reservoir of a cryogenic fluid in liquid form, the first secondary reservoir located in a cryogenic storage tank and spaced relatively above an upper level of a cryogenic liquid of a main reservoir of the cryogenic liquid of the cryogenic storage tank; a pick and/or place head; at least one motor drivingly coupled to move the pick and/or place head; a control system controlling coupled to the at least one motor and operable to: cause the pick and/or place head to engage at least one of the specimen containers; moving the pick and/or place head to place the at least one of the specimen containers at least partially in the first secondary reservoir of the cryogenic fluid in liquid form; and move the pick and/or place head to remove the at least one of the specimen containers from the first secondary reservoir of the cryogenic fluid in liquid form.

The storage locations can take the form of a radial array of storage locations spaced above an upper level of the cryogenic liquid of the main reservoir of the cryogenic liquid of the cryogenic storage tank. The radial array of storage locations can be arrayed and pivotally mounted to pivot or rotate about a central axis to permit the pick and/or place head to physically access the defined storage location at which the at least one of the specimen containers, is stored for example before the control system moves the pick and/or place head to place the at least one of the specimen containers at least partially in a first secondary reservoir of a cryogenic fluid in liquid form. The radial array of storage locations can include a first group of one or more sets of storage locations, the sets of storage locations of the first group arranged in respective wedge-shaped segments that reside at a first level in the cryogenic storage tank. The radial array of storage locations can include a second group of one or more sets of storage locations, the sets of storage locations of the second group arranged in respective in wedge-shaped segments which reside at a second level in the cryogenic storage tank, the second level below the first level. The system can include at least one motor drivingly coupled to cause the radial array of storage locations to pivot about the central axis.

The radial array of storage locations can include a first group of one or more sets of storage locations, the sets of storage locations of the first group arranged in respective wedge-shaped segments that reside at a first level in the cryogenic storage tank. At least one wedge-shaped gaps can be provided between two successively angularly adjacent ones of the sets of storage locations of the first group of storage locations.

Each of the first group of one or more sets of storage locations can respectively include an upper rack and a lower rack, the upper rack having a plurality of throughholes extending therethrough and the lower rack having a plurality of throughholes extending therethrough, the throughholes of the lower rack each aligned with a respective one of the throughholes of the upper rack, the throughholes sized to receive a portion of the specimen containers therein. Each of the second group of one or more sets of storage locations respectively can include an upper rack and a lower rack, the upper rack having a plurality of throughholes extending therethrough and the lower rack having a plurality of throughholes extending therethrough, the throughholes of the lower rack each aligned with a respective one of the throughholes of the upper rack, the throughholes sized to receive a portion of the specimen containers therein.

The pick and/or place head can be a mechanical pick and/or place head with features that mechanically physically engage a specimen container during pick and/or place operations. The pick and/or place head can be a pneumatic pick and/or place head which produces a negative pressure to physically secure a specimen container during pick and/or place operations.

The pick and/or place head can include one or more temperature sensors or temperature sensor probes, for example positioned at a distal end of the pick and/or place head. The temperature sensors or temperature sensor probes can take the form of a thermocouple or other temperature sensitive or temperature responsive transducer. One or more circuits can be employed to determine a temperature sensed by the temperature sensor probe and/or compare the sensed temperature to a threshold temperature or temperature range. One or more circuits can be employed to determine a liquid level in one or more secondary reservoirs, for example based on a position of the pick and/or place head (e.g., elevation) when the sensed temperature shows an abrupt change or when the sensed temperature transitions a characteristic temperature of a cryogenic fluid (e.g., a phase or state transition temperature at which the cryogenic fluid transitions between gaseous and liquid phases or states). For instance, the circuit can determine when the sensed temperature equals or exceeds a temperature at which a cryogenic fluid is in a liquid state. A control system (e.g., processor-based) can determine whether to issue an alert, record an occurrence of a condition, and/or take one or more other actions based on the sensed temperature and/or liquid level. For example, the control system can determine whether to cause the one or more secondary reservoirs to be replenished with cryogenic liquid via one or more supply systems. The control system can cause the determined one or more actions to take place.

A method operation of a system to handle specimen containers which are storable and retrievable from a cryogenic storage tank, the cryogenic storage tank comprising a main reservoir of a cryogenic liquid, can be summarized as including: engaging at least one of the specimen containers with a pick and/or place head; moving the pick and/or place head to place the at least one of the specimen containers at least partially in a first secondary reservoir of a cryogenic fluid in liquid form, the first secondary reservoir located in the cryogenic storage tank and spaced relatively above an upper level of the cryogenic liquid of the main reservoir of the cryogenic liquid of the cryogenic storage tank; and moving the pick and/or place head to remove the at least one of the specimen containers from the first secondary reservoir of the cryogenic fluid in liquid form.

The method may further include: before engaging at least one of the specimen containers with a pick and/or place head, moving the pick and/or place head to place at least a portion of the pick and/or place head at least partially in a second secondary reservoir of a cryogenic fluid in liquid form to pre-cool the pick and/or place head before engaging the at least one of the specimen containers, the second secondary reservoir located in the cryogenic storage tank and spaced relatively above the upper level of the cryogenic liquid of the main reservoir of the cryogenic liquid of the cryogenic storage tank as part of either the storage or the retrieval task.

The method may further include: supplying the cryogenic fluid in liquid form directly to the first secondary reservoir, independently of supplying the cryogenic liquid to the main reservoir; and/or supplying the cryogenic fluid in liquid form directly to the second secondary reservoir, independently of supplying the cryogenic liquid to the main reservoir.

The method may further include rotating the radial array of storage locations to pivot about the central axis to permit the pick and/or place head to physically access the defined storage location at which the at least one of the specimen containers is to be stored.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with wireless transponders, interrogators or interrogation systems, computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Figure 1A:
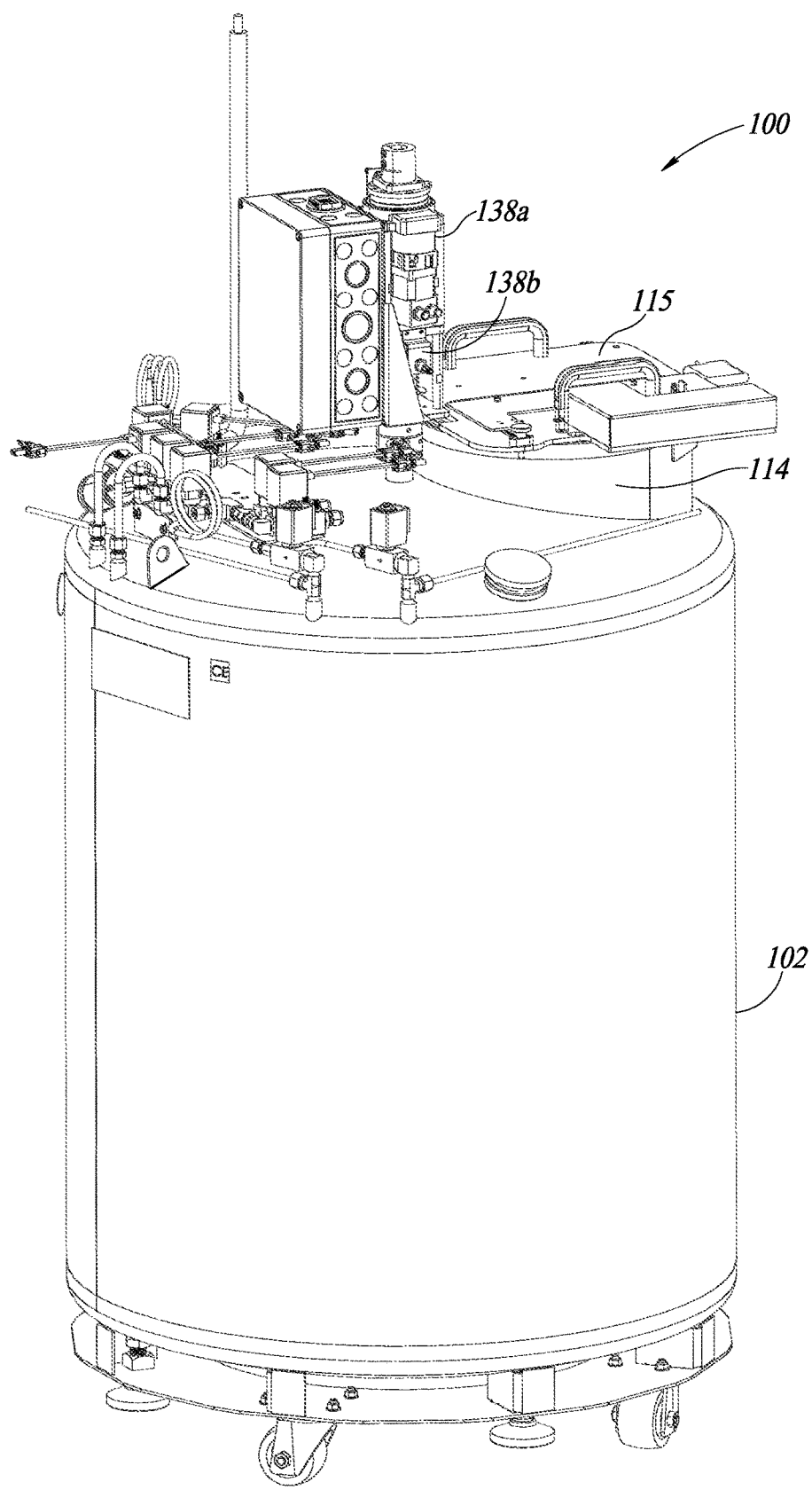
FIG. 1A is a front, top isometric view of a storage and retrieval system in which specimen containers can be stored in and/or retrieved from a cryogenic tank via a pick and/or place system, according to one illustrated implementation.
Figure 1B:
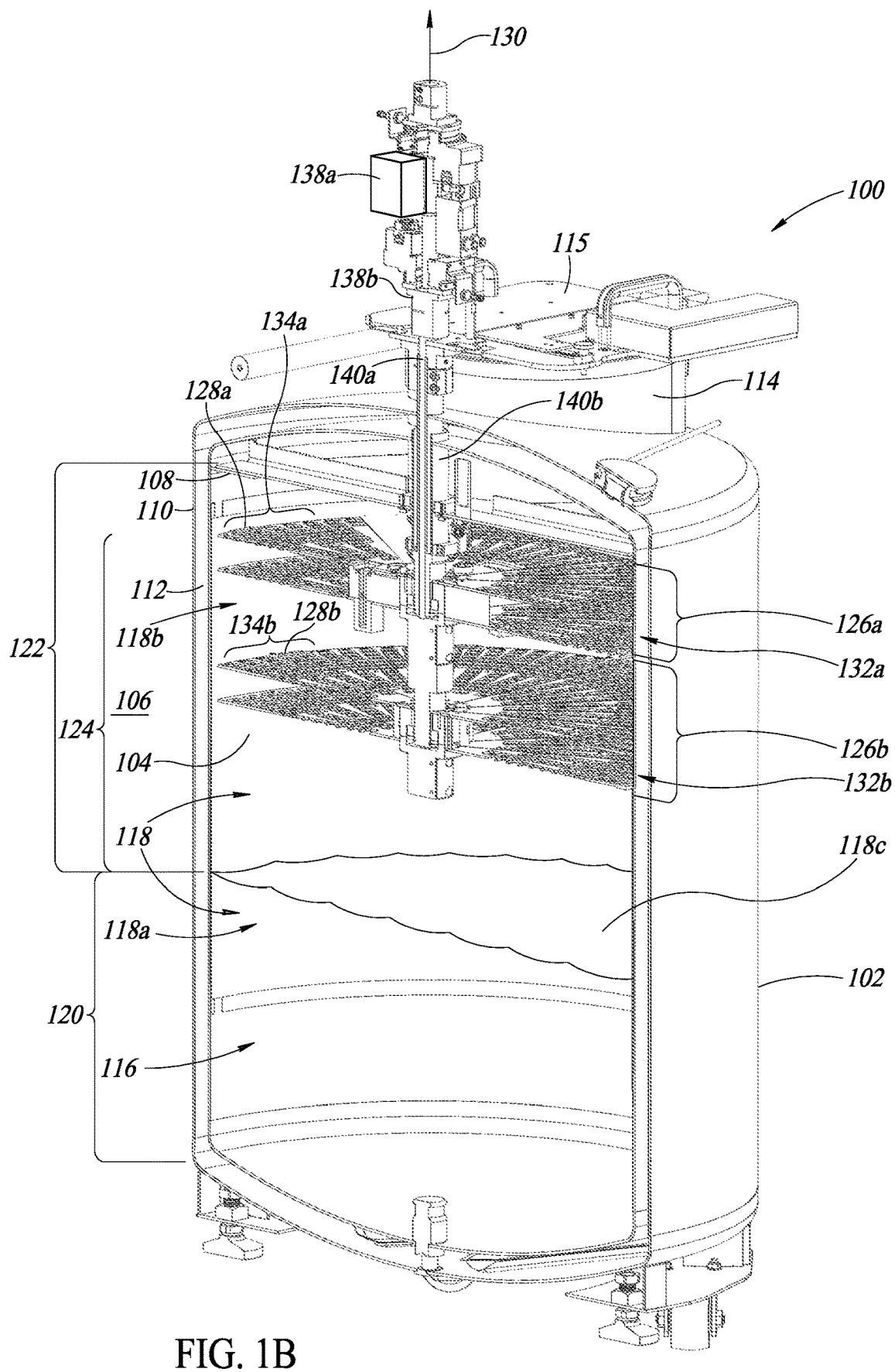
FIG. 1B is cross sectional view of the storage and retrieval system of FIG. 1A, illustrating a rack assembly of the storage and retrieval system, the rack assembly located in an interior of the cryogenic tank and including a first group of one or more sets of storage locations, the sets of storage locations of the first group arranged in respective wedge-shaped segments that reside at a first level in the cryogenic storage tank and a second group of one or more sets of storage locations, the sets of storage locations of the second group arranged in respective in wedge-shaped segments which reside at a second level in the cryogenic storage tank, the second level below the first level, the second level above a level of liquid cryogenic fluid in a main reservoir of the cryogenic storage tank, according to one illustrated implementation.

FIGS. 1A and 1B show a storage and retrieval system 100 in which specimen containers 1500 (FIG. 15) can be stored in and/or retrieved from a cryogenic tank 102 via a pick and/or place system 1600, 1700 (FIGS. 16 and 17), according to one illustrated implementation.

Figure 18:
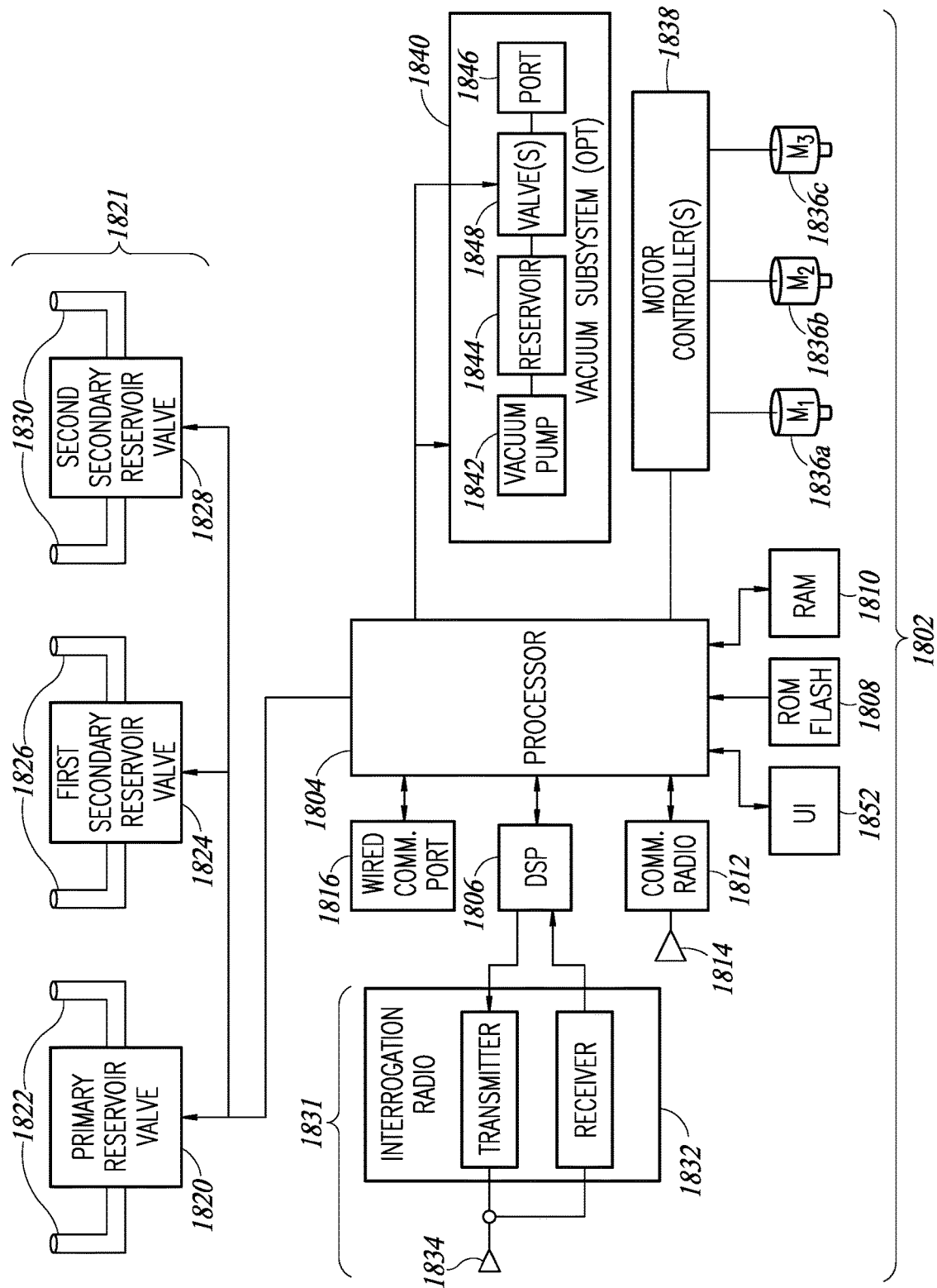
FIG. 18 is a schematic diagram of a storage and retrieval system, according to at least one illustrated implementation.

The cryogenic tank 102 (also referred to as a dewar or cryogenic dewar) includes an interior 104 which is thermally insulated from an exterior 106 thereof. The cryogenic tank 102 can be an insulated container, for example having a double-walled 108 with a thermally insulative medium 110 (e.g., vacuum, inert gas) in a space 112 between the double wall 108. The cryogenic tank 102 includes a port 114 with a hatch 115 that is movable to selectively provide access to the interior 104 of the cryogenic tank 102 from the exterior 106 thereof. In operation, the interior 104 of the cryogenic tank 102 holds a main or primary reservoir 116 of a cryogenic fluid 118. Typically, the cryogenic fluid 118 will be in a liquid state 118a at a lower portion 120 (e.g., bottom) of the interior the cryogenic tank 102, and will be in a gaseous state 118b in an upper portion 122 (e.g., above a midline) of the interior 104 of the cryogenic tank 102. While cold in both states, the cryogenic fluid 118 is colder in the liquid state 118a than the gaseous state 118b. The cryogenic fluid 118 may be delivered to the interior of the cryogenic tank 102 via one or more plumbing systems 1821 (FIG. 18).

As best illustrated in FIG. 1B, the storage and retrieval system 100 includes a rack assembly 124 located in the interior 104 of the cryogenic tank 102. The rack assembly 124 can include a first group 126a of one or more sets of storage locations 128a (only one called out to prevent clutter). The sets of storage locations 128a of the first group 126a can take the form of a radial array of storage locations arrayed around a central axis 130 and that reside at a first level 132a in the cryogenic storage tank 102. The sets of storage locations 128a of the first group 126a can, for example, be arranged in respective wedge-shaped segments 134a (only one called out to prevent clutter) that reside at the first level 132a in the cryogenic storage tank 102, above a level of liquid cryogenic fluid 118a of the main or primary reservoir 116 of the cryogenic tank 102.

As best illustrated in FIG. 1B, the rack assembly 124 can optionally include a second group 126b of one or more sets of storage locations 128a (only one called out to prevent clutter). The sets of storage locations 128b of the second group 126b can take the form of a radial array of storage locations arrayed around the central axis 130 and that reside at a second level 132b in the cryogenic storage tank 102. The sets of storage locations 128b of the second group 126b can, for example, be arranged in respective in wedge-shaped segments 134b (only one called out to prevent clutter) which reside at a second level 132b in the cryogenic storage tank 102. The second level 132b can be below the first level 132a, while the second level 132b is above a level 118c of liquid cryogenic fluid 118a in the main or primary reservoir 116 of the cryogenic storage tank 102.

The first group 126a of one or more sets of storage locations 128a can be physically coupled together and mounted to rotate or pivot about the central axis 130. The second group 126b of one or more sets of storage locations 128b can be physically coupled together and mounted to rotate or pivot about the central axis 130. In particular, the second group 126b of one or more sets of storage locations 128b can rotate or pivot independently of the first group 126a of one or more sets of storage locations 128a. The first group 126a of one or more sets of storage locations may include a gap 136 (e.g., illustrated as a wedge-shaped gap) between successively radially adjacent sets of storage locations 128a in order to provide access from above to the second group 126b of one or more sets of storage locations 128b.

The storage and retrieval system 100 can include one or more actuators 138a, 138b (e.g., electric motors for instance stepper motors, solenoids) and transmissions 140a, 140b (e.g., drive shafts, gears, belts, magnets) coupled and operable to cause the rotations or pivoting of the first group and/or second group of one or more sets of storage locations about the central axis under control of a control system (described below with reference to FIG. 18). For example, the storage and retrieval system 100 may include separate actuators (e.g., motors) 138a, 138b and transmissions 140a, 140b for each group 126a, 126b of one or more sets of storage locations 128a, 128b.

While two groups 126a, 126b of one or more sets of storage locations 128a, 128b are illustrated and described, the storage and retrieval system 100 can include one group, two groups, three groups or even more groups of sets of storage locations respectively arranged at one level, two levels, three levels or even more levels. Where there are three or more groups of one or more sets of storage locations, all but a lowermost set of storage locations may include a gap 136 to provide access the storage locations at the lower levels.

Figure 2:
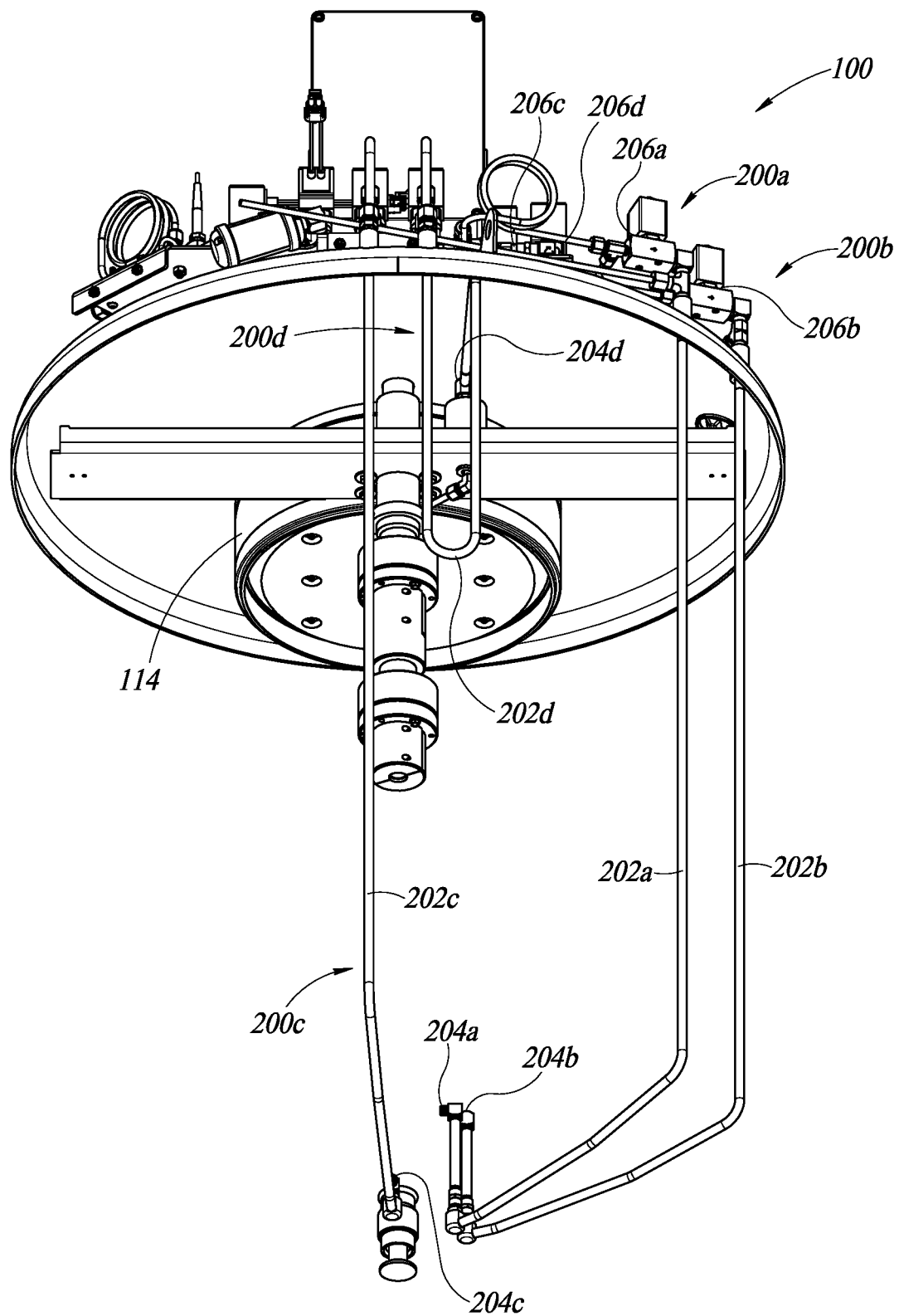
FIG. 2 is a bottom isometric view of a portion of the storage and retrieval system of FIGS. 1A and 1B, illustrating a portion of an interior of the cryogenic tank including plumbing that provides conduits to carry cryogenic fluids and to sense pressure within the interior of the cryogenic tank.

FIG. 2 shows a portion of the storage and retrieval system 100 of FIGS. 1A and 1B, illustrating a portion of an interior 104 of the cryogenic tank 102 including plumbing 200a, 200b, 200c, 200d (collectively 200) that provides conduits to carry cryogenic fluids and to sense pressure within the interior of the cryogenic tank.

The plumbing 200 can be located on an exterior or external to the cryogenic tank 102 and/or located in the interior 104 of the cryogenic tank 102. For example, the plumbing 200 can include conduits 202a, 202b, 202c, 202d, inlet ports 204a, 204b and outlet ports 204c, 204d positioned in the interior 104 of the cryogenic tank 102, sensors 206a, 206b and valves 206c, 206d typically positioned on the exterior of the cryogenic tank 102, and/or couplers or connectors (not called out).

For example, plumbing 200a, 200b (two shown) for sensors (also referred to as sensor plumbing) can include conduits 202a, 202b with respective inlet ports 204a, 204b positioned in a lower portion of the interior 104 of the cryogenic tank 102. The plumbing 200a, 200b can allow conditions within the interior 104 of the cryogenic tank 102 to be sensed via one or more sensors 206a, 206b (e.g., pressure sensors, temperature sensors, volume sensors), typically located outside the interior 104 of the cryogenic tank 102. Typically, the cryogenic fluid in the lower portion of the interior 104 of the cryogenic tank 102 will be in a liquid form, while the cryogenic fluid in an upper portion of the interior 104 of the cryogenic tank 102 may be in a gaseous (e.g., vapor) form. Hence, the inlet ports 204a, 204b can be positioned in the lower portion of the interior 104 of the cryogenic tank 102 to facilitate one or more sensors 206a, 206b (e.g., pressure sensors, temperature sensors, volume sensors) sensing, detecting and/or measuring a pressure, temperature and/or volume of liquid cryogenic fluid (e.g., liquid nitrogen) in the interior 104 of the cryogenic tank 102. While not illustrated, additional plumbing can be included with respective inlets positioned in an upper portion of the interior 104 of the cryogenic tank 102 to allow sensing of conditions of gaseous cryogenic fluid (e.g., nitrogen in vapor form) in the upper portion of the interior 104 of the cryogenic tank 102.

Additionally or alternatively, plumbing 200c (also referred to as primary supply plumbing) can include one or more conduits 202c (one shown, also generically referred to as a supply line or specifically referred to as a primary supply line) with an outlet port 204c positioned in the interior 104 of the cryogenic tank 102, the outlet port 204c positioned, for example, at or proximate a bottom of the interior 104 of the cryogenic tank 102, to supply cryogenic fluid (e.g., cryogenic fluid in liquid form, for instance liquid nitrogen) into the interior 104 of the cryogenic tank 102. The plumbing 200c can be coupled to one or more sources (not shown) of cryogenic fluids, for instance one or more sources of cryogenic liquid (e.g., liquid nitrogen) maintained at cryogenic temperatures. In some implementations, backup supply plumbing (not shown) can act as a backup or emergency supply of cryogenic liquid should the primary supply plumbing 200c fail. The operational conditions and/or status of the primary supply plumbing 202c, primary source(s) of cryogenic fluid, and/or the conditions within the interior 104 of the cryogenic tank 102 can be monitored via a set of sensors and a processor or controller (e.g., microcontroller) communicatively coupled to the sensors, and operable to control operation of the backup supply plumbing, for instance via control of one or more actuators coupled to control one or more valves, pumps, and/or compressors (illustrated as actuator and valve combination 206c).

Additionally or alternatively, plumbing 200d (also referred to as secondary reservoir supply plumbing) can include one or more conduits 202d (only one shown in FIG. 2, also generically referred to as a supply line or specifically referred to as a secondary supply line) with respective outlet ports 204d (only one shown in FIG. 2) positioned above one or more secondary reservoirs (described below) in the interior 104 of the cryogenic tank 102, for example to supply cryogenic liquid into the secondary reservoirs. The plumbing 200d can be coupled to one or more sources (not shown) of cryogenic fluids, for instance one or more sources of cryogenic liquid (e.g., liquid nitrogen) maintained at cryogenic temperatures. The operational conditions and/or status of cryogenic liquid in the secondary reservoirs can be monitored via a set of sensors and a processor or controller (e.g., microcontroller) communicatively coupled to the sensors, and operable to control operation of the secondary reservoir supply plumbing 200d for instance via control of one or more actuators coupled to control one or more valves, pumps, and/or compressors (illustrated as actuator and valve combination 206d). Where there are two or more secondary reservoirs and those secondary reservoirs are mounted to rotate about a common axis, for instance to rotate along with radially arrayed racks, one conduit 202d can advantageously be used to fill two, more, or even all secondary reservoirs by radially spacing the secondary reservoirs from the central axis by the same distance as one another, and radially spacing the outlet port 204d at that same distance. As the secondary reservoirs rotate about the central axis, they each successively pass under the outlet port 204d, at which point the plumbing 200d can replenish the respective aligned secondary reservoir with cryogenic liquid if an amount or volume of cryogenic liquid in the respective secondary reservoir is below a threshold amount. In some implementations, rotation of the secondary reservoirs can be stopped until replenished with cryogenic liquid, while in other implementations filing can occur during rotation.

Figure 3:
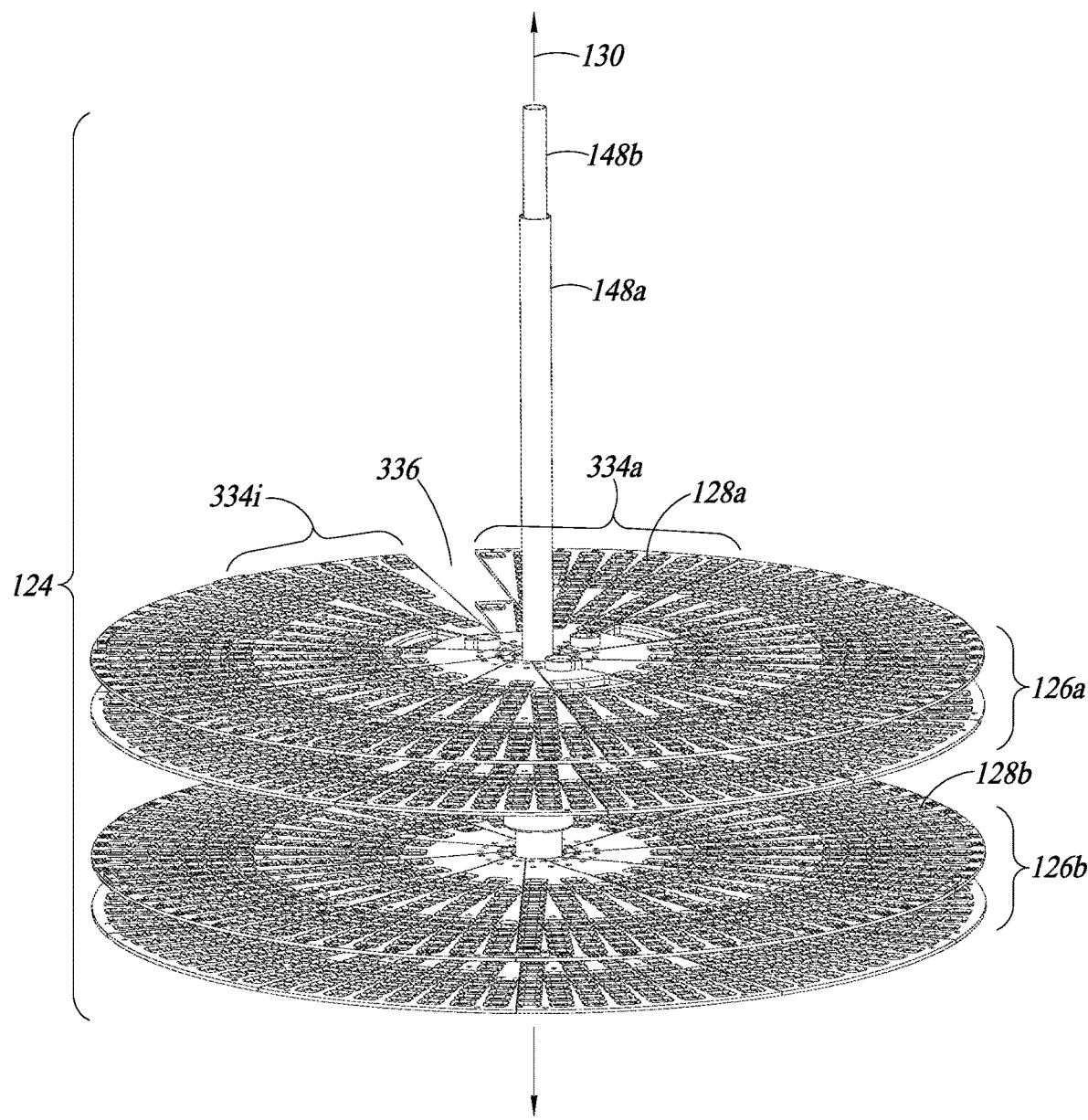
FIG. 3 is a first top isometric view of the rack assembly of the storage and retrieval system of FIGS. 1A and 1B.
Figure 4:
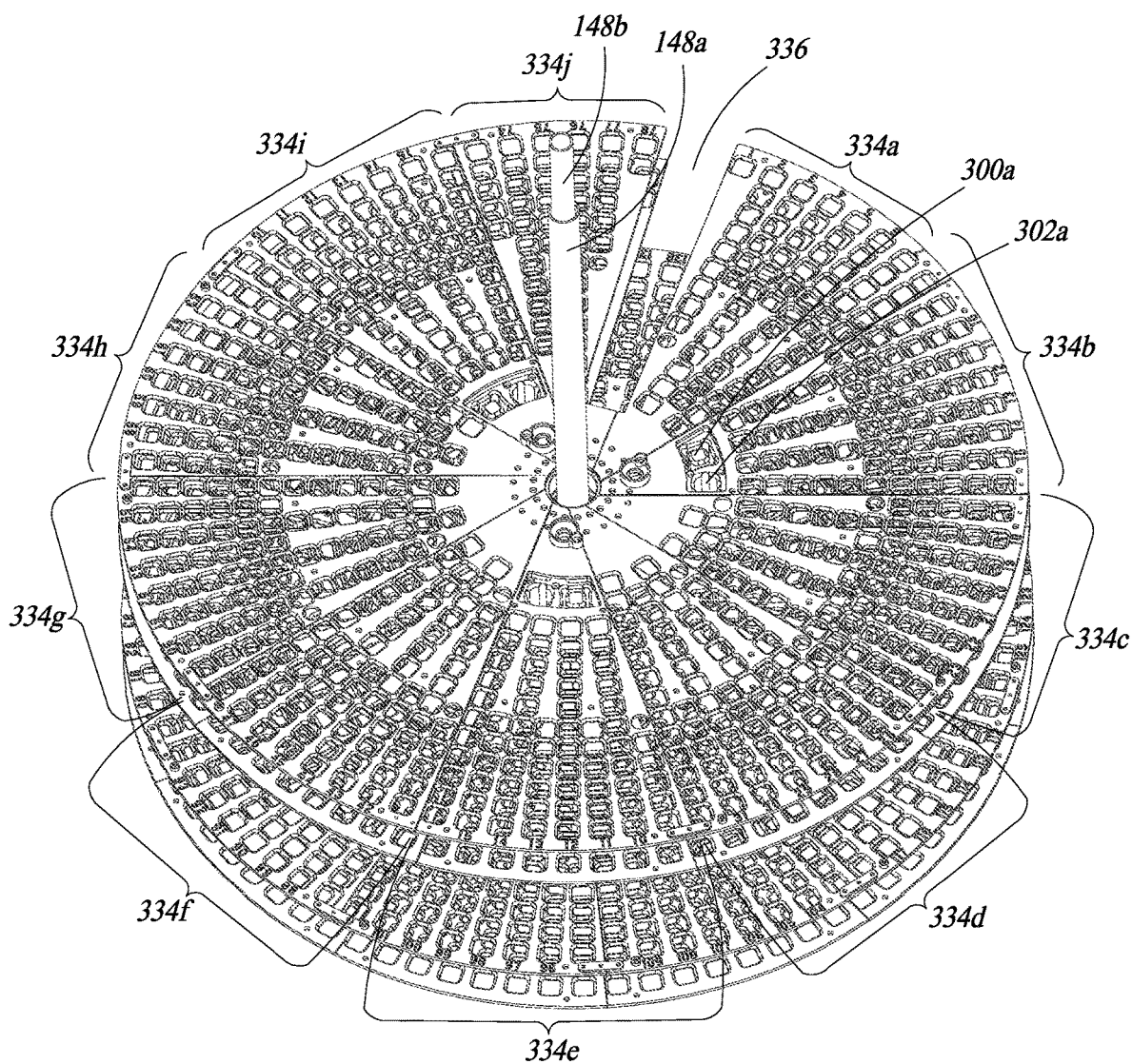
FIG. 4 is a second top isometric view of the rack assembly of the storage and retrieval system of FIGS. 1A and 1B.
Figure 5:
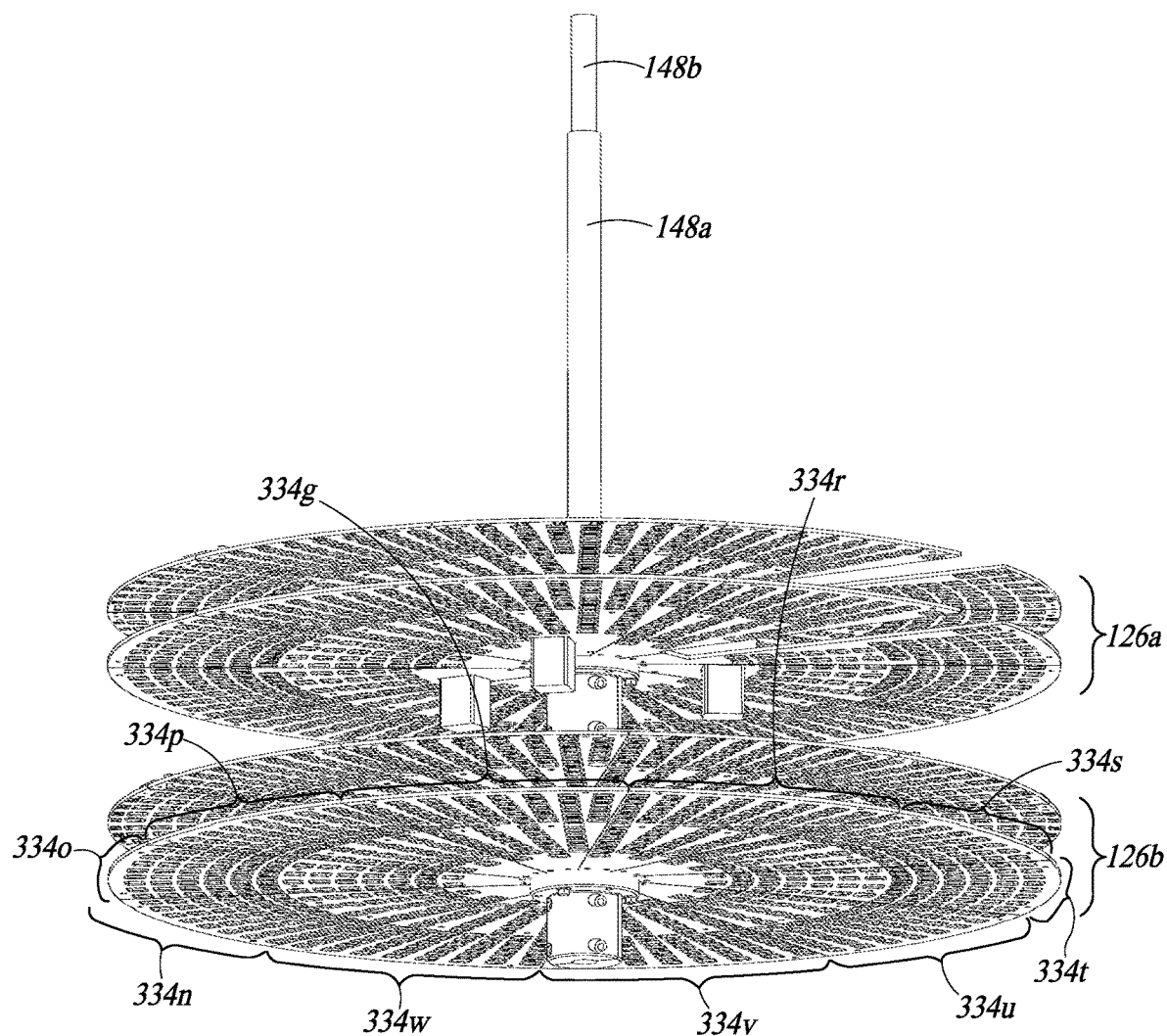
FIG. 5 is a bottom isometric view of the rack assembly of the storage and retrieval system of FIGS. 1A and 1B.

FIGS. 3, 4 and 5 show a portion of the rack assembly 124 of the storage and retrieval system 100 (FIGS. 1A and 1B) in more detail.

As noted above, the sets of storage locations 128a of the first group 126a can take the form of a radial array of storage locations arrayed around a central axis 130 and that reside at a first level 132a in the cryogenic storage tank 102 (FIGS. 1A and 1B). The sets of storage locations 128a of the first group 126a can, for example, be arranged in respective wedge-shaped segments 334a, 334b, 334c, 334d, 334e, 334f, 334g, 334h, 334i, 334j (ten shown). A gap 336 may be present between, for example two of the edge-shaped segments 334a, 334j.

Also as noted above, the sets of storage locations 128b of the second group 126b can take the form of a radial array of storage locations arrayed around the central axis 130 and that reside at a second level 132b in the cryogenic storage tank 102 (FIGS. 1A and 1B). The sets of storage locations 128b of the second group 126b can, for example, be arranged in respective in wedge-shaped segments 334k, 334l, 334m, 334n, 334o, 334p, 334q, 334r, 334s, 334t (ten shown). If there are additional groups of sets of storage locations, the second group 126b may include a gap (not shown) between, for example two of the edge-shaped segments 334k, 334t to allow access to the storage locations of the additional groups of sets of storage locations.

As best illustrated in FIG. 4, one or more of the wedge-shaped segments (e.g., three wedge-shaped segments 134b, 134e, 134i) can each include a first secondary reservoir 300a (only one called out in FIG. 4). In use, the first secondary reservoir 300a holds a cryogenic fluid in liquid form. Optionally, one or more of the wedge-shaped segments (e.g., three wedge-shaped segments 134b, 134e, 134i) can each include a second secondary reservoir 302a (only one called out in FIG. 4). In use, the second secondary reservoir 302a holds a cryogenic fluid in liquid form.

The first secondary reservoir 300a and/or the second secondary reservoir 302a allows at least a portion of a pick and/or place head 1600, 1700 (FIGS. 16, 17) to be cooled prior to engaging a specimen container 1500 (FIG. 15) during a pick and/or place operation. For example, the portion of a pick and/or place head 1600, 1700 (FIGS. 16, 17) can be placed in the first secondary reservoir 300a and/or the second secondary reservoir 302a prior to a pick and/or place operation for a time sufficient to cool the pick and/or place head 1600, 1700 (FIGS. 16, 17) to a suitable temperature and thereby minimizing heat transfer from the pick and/or place head 1600, 1700 (FIGS. 16, 17) to the specimen container 1500 (FIG. 15), and thereby protecting a specimen contained therein and/or advantageously increasing a duration of time during which the specimen container may be safely handled while outside the cryogenic tank 102.

The first secondary reservoir 300a and/or the second secondary reservoir 302a additionally or alternatively a specimen container 1500 (FIG. 15) to be charged or recharged with cryogenic fluid in liquid form during a pick and/or place operation. For example, a pick and/or place head 1600, 1700 (FIGS. 16, 17) can be moved to place at least a portion of specimen container 1500 (FIG. 15) in the first secondary reservoir 300a and/or the second secondary reservoir 302a prior to a pick operation for a time sufficient to allow liquid cryogenic fluid to ingress into an interior of the specimen container 1500, thereby protecting a specimen contained therein and/or advantageously increasing a duration of time during which the specimen container may be safely handled while outside the cryogenic tank 102.

Arranging the first and the secondary reservoirs 300a, 302a as pairs on a same wedge-shaped segment 134b, 134e, 134i can increase efficiency, for example allowing the pick and/or place head 1600, 1700 (FIGS. 16, 17) to be cooled prior to a picking operation and then allowing a picked specimen container 1500 (FIG. 15) to be recharged with liquid cryogenic fluid without pivoting or rotating the first group of sets of storage locations between those two operations. While illustrated as pairs of the first and the secondary reservoirs 300a, 302a on a same wedge-shaped segment 134b, 134e, 134i, the first and the secondary reservoirs 300a, 302a could be located on different ones of the wedge-shaped segments with respect to one another.

As best illustrated in FIGS. 3, 4 and 5, separate transmissions 138a, 138b can be drivingly coupled to the first group 126a of storage locations 128a and the second group 126b of storage locations 128b so that the first group 126a and the second group 126b can be rotated or pivoted separately from one another. For example, where access is desired to a given storage location 128b of the second group 126b, the second group can be rotated or pivoted into alignment with the port 114 (FIG. 1A) and the first group 126a can be rotated or pivoted to align the gap 136 (FIG. 1B), 336 (FIGS. 3-5) with the port 114 (FIG. 1A), thereby providing access from the exterior 106 through the port 114 into the interior 104 of the cryogenic tank 102 and through the gap 136 to the second group 126b of storage locations 128b for pick or retrieval and/or placement or storage operations.

Figure 6:
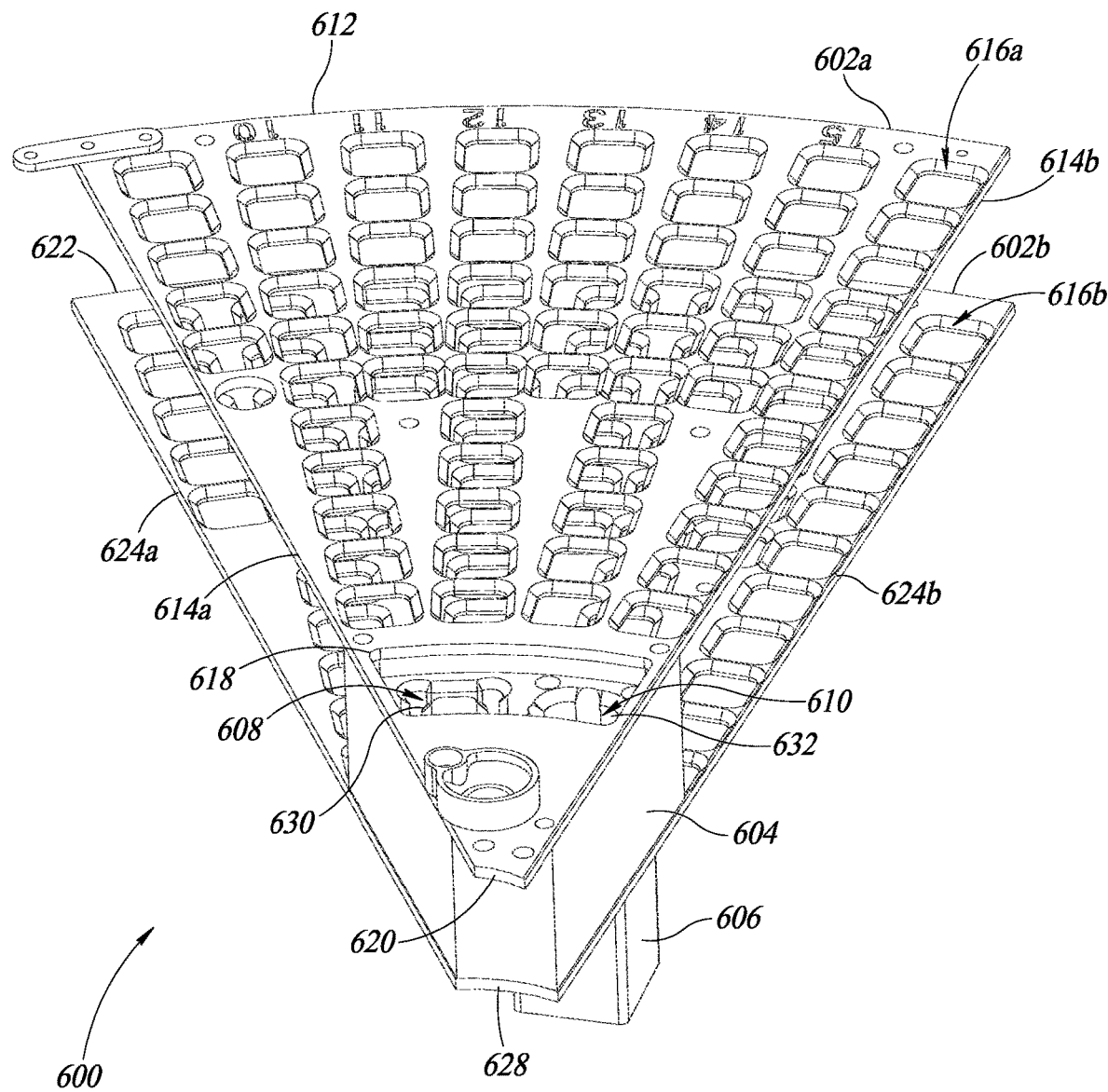
FIG. 6 is a top isometric view of a wedged-shaped segment of the rack assembly of FIGS. 3 through 5, better illustrating an upper and a lower rack, intermediary block between the upper and lower racks, and a bottom block that comprise the illustrated wedged-shaped segment, according to at least one illustrated implementation.
Figure 7:
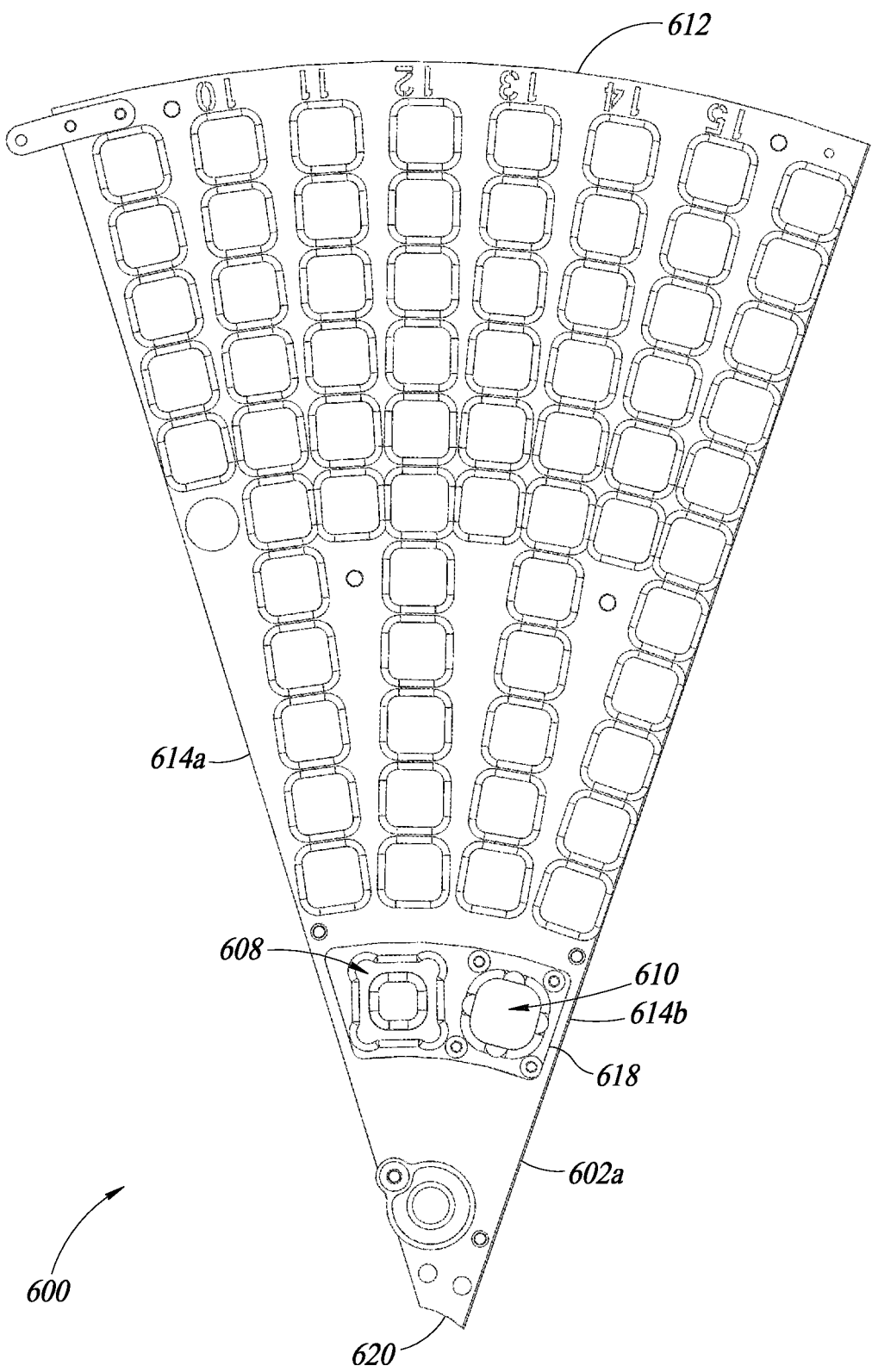
FIG. 7 is a top plan view of the wedged-shaped segment of the rack assembly of FIG. 6.
Figure 8:
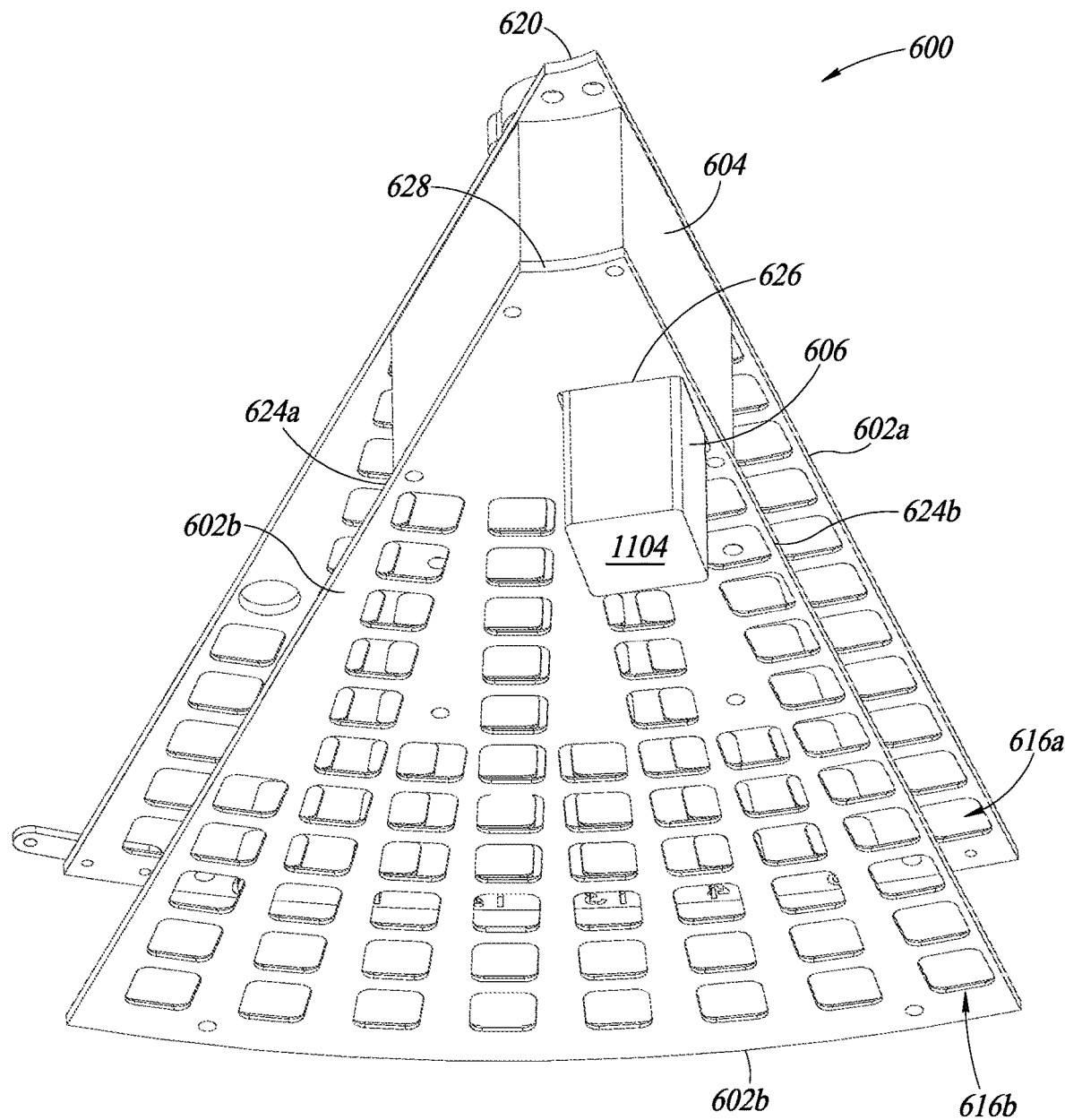
FIG. 8 is a bottom isometric view of the wedged-shaped segment of the rack assembly of FIG. 6.

FIGS. 6, 7 and 8 show a wedged-shaped segment 600 of the rack assembly 124 in even more detail, better illustrating an upper rack plate 602a, a lower rack plate 602b, an intermediary block 604 between the upper and lower rack plates 602a, 602b, and a bottom block 606 below the lower rack plate 602b that comprise the illustrated wedged-shaped segment 600, according to at least one illustrated implementation. The illustrated wedged-shaped segment 600 is similar or identical to the wedge-shaped segments 134b, 134e, 134i (FIGS. 3, 4, 5) as the wedged-shaped segment 600 includes a first secondary reservoir 608 and optionally includes a second secondary reservoir 610.

The upper rack plate 602a can have a wedge-shape, with an arcuate outer perimeter 612, and straight peripheral edges 614a, 614b. The upper rack plate 602a includes one or more throughholes 616a (one called out) which extend through a thickness of the upper rack plate 602a. The throughholes 616a can be arranged in one or more arrays. The throughholes 616a are sized, shaped and/or dimension to receive a lower portion 1502 of a specimen container 1500 (FIG. 15) therethrough while engaging an upper portion 1504 of the specimen container 1500 (FIG. 15), and thus can constitute a respective storage location The throughholes 616a are spaced from one another by a sufficient distances to allow at least an engagement portion 1620, 1706b of a pick and/or place head 1600, 1700 (FIGS. 16, 17) to physically access individual specimen containers 1500 (FIG. 15) at each storage location without physically engaging any specimen containers 1500 at neighboring storage locations. The upper rack plate 602a includes a slot 618 that extends through the thickness of the upper rack plate 602a and which provides an opening to the first secondary reservoir 608 and optionally the second secondary reservoir 610. The slot 618 in the upper rack plate 602a may be located relatively toward an inner peripheral portion 620 of the upper rack plate 602a. The upper rack plate 602a is preferably relatively thin but also sufficiently rigid to support the specimen containers 1500 in conjunction with the lower rack plate 602b. The upper rack plate 602a is preferably capable of withstanding cryogenic temperatures without premature failure, and can be formed of a high strength-to-weight metal (e.g., aluminum, titanium).

Figure 9:
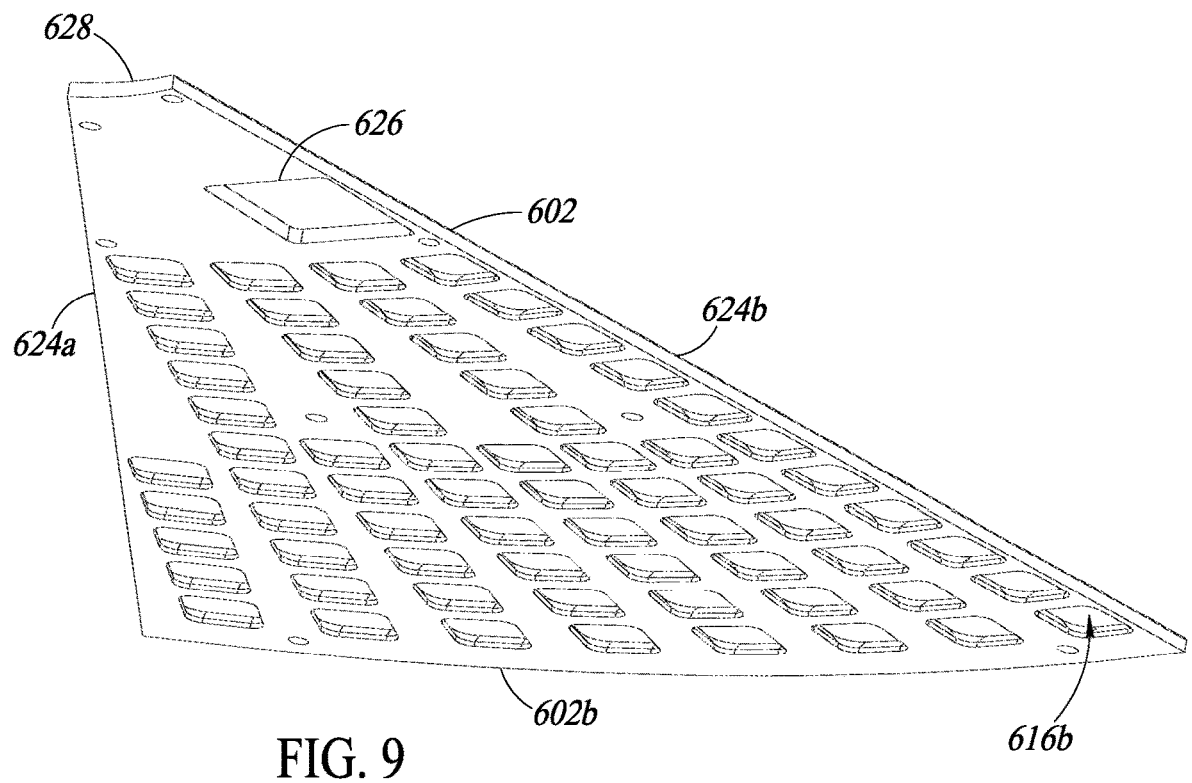
FIG. 9 is a bottom isometric view of the lower rack of FIGS. 6 through 8.

As best seen in FIGS. 8 and 9, the lower rack plate 602b can have a wedge-shape, with an arcuate outer perimeter 622, and straight peripheral edges 624a 624b. The lower rack plate 602b includes one or more throughholes 616b which extend through a thickness of the lower rack plate 602b. The throughholes 616b can be arranged in one or more arrays, and aligned with respective throughholes 616a of the upper rack plate 602a. The throughholes 616b are sized, shaped and/or dimension to receive a lower portion 1502 of a specimen container 1500 (FIG. 15) therethrough. The throughholes 616b are spaced from one another by a sufficient distances to allow at least an engagement portion 1620, 1706b of a pick and/or place head 1600, 1700 (FIGS. 16, 17) to physically access individual specimen containers 1500 (FIG. 15) at each storage location without physically engaging any specimen containers 1500 at neighboring storage locations. Use of the upper and lower rack plates 602a, 602b ensures that specimen containers 1500 will be in an upright position when stored at the storage locations (e.g. throughholes 616a, 616b), advantageously facilitating placement and retrieval operations on individual specimen containers 1500 via a pick and/or place head 1600, 1700 (FIGS. 16, 17), while providing a strong yet light weight rack capable of easy rotation. To this extent the lower rack plate 602b may be identical to the upper rack plate 602a, possible differences between the lower rack plate 602b and the upper rack plate 602a are described immediately below, although in some implementations the lower rack plate 602b may be identical to the upper rack plate 602a thereby advantageously reducing parts count.

The lower rack plate 602b includes a slot 626 that extends through the thickness of the lower rack plate 602b. The slot 626 in the lower rack plate 602b may be smaller than the slot 618 in the upper rack plate 602a, and can provide a passage between a cavity 632 in the intermediary block 604 and a cavity 1106 (FIG. 11) in the bottom block 606, where the cavities 630, 632 of the intermediary block 604 and the bottom block 606 comprise one of the first secondary reservoir 608 or the second secondary reservoir 610. Alternatively, the slot 626 in the lower rack plate 602b can be the same size as the slot 618 in the upper rack plate 602a, and an upper surface of the bottom block 606 used to seal a bottom of one of the first secondary reservoir 608 or the second secondary reservoir 610. The slot 626 in the lower rack plate 602b may be located relatively toward an inner peripheral portion 628 of the lower rack plate 602b. The lower rack plate 602b is preferably relatively thin but also sufficiently rigid to support the specimen containers 1500 in conjunction with the upper rack plate 602a. The lower rack plate 602b is preferably capable of withstanding cryogenic temperatures without premature failure, and can be formed of a high strength-to-weight metal (e.g., aluminum, titanium).

The other wedged-shaped segments 134a, 134c, 134d, 134f, 134g, 134h, 134j, (FIGS. 3, 4, 5) of the first group 126a and the other wedged-shaped segments 134k, 134m, 134n, 134p, 134q, 134s, 134t of the second group 126b may be identical to that described above, although omitting the slot from the upper rack plate 602a and the slot from the lower rack plate 602b.

Figure 10A:
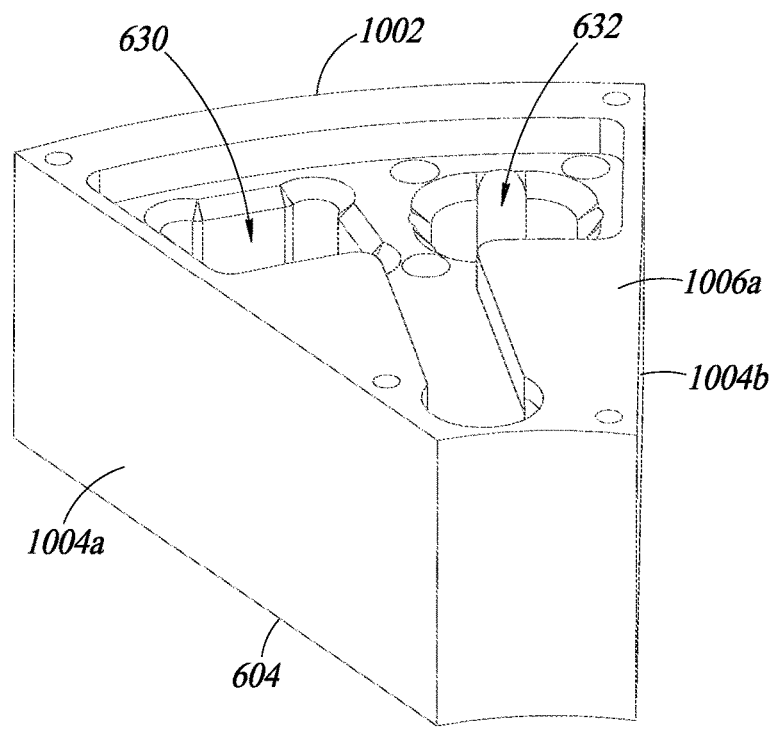
FIG. 10A is a top isometric view of the intermediary block of FIGS. 6 through 8.
Figure 10B:
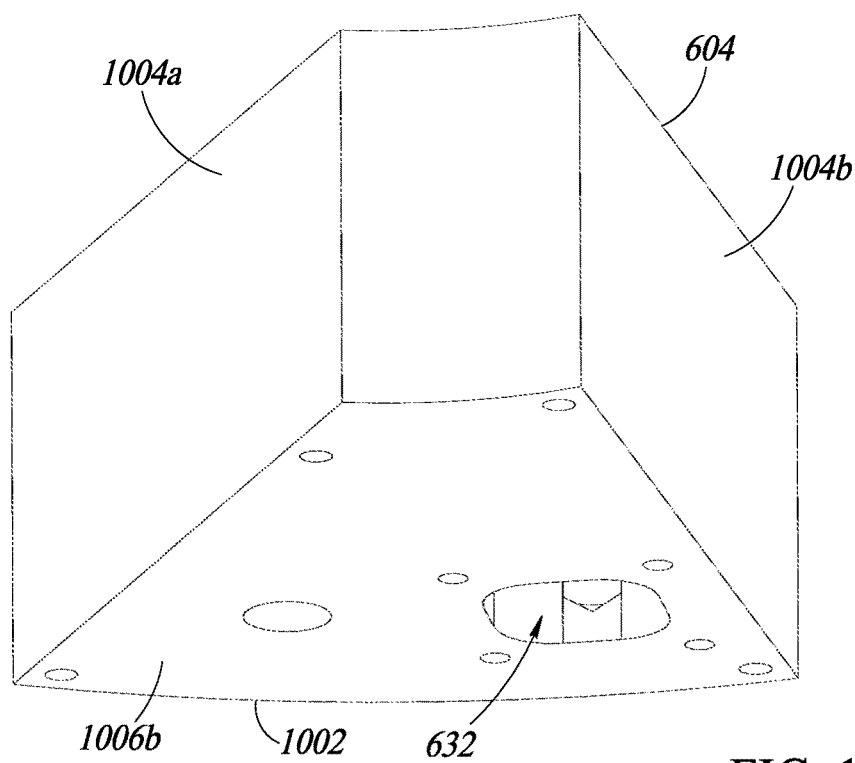
FIG. 10B is a bottom isometric view of the intermediary block of FIGS. 6 through 8.

FIGS. 10A and 10B show the intermediary block 604 of the wedged-shaped segment of the rack assembly 124.

The intermediary block 604 can have a wedge-shape, with an arcuate outer perimeter 1002, straight peripheral edges 1004a, 1004b, and upper face 1006a and a lower face 1006b opposed to the upper face 1006a across a thickness of the intermediary block 604. The intermediary block 604 includes a first cavity 630 and a second cavity 632. The second cavity 632 extends through the thickness of the intermediary block 604, while the first cavity 630 preferably does not extend through the thickness of the intermediary block 604. The first cavity 630 forms at least a portion of one of the first secondary reservoir 608 or the second secondary reservoir 610. The second cavity 632 forms at least a portion of one of the first secondary reservoir 608 or the second secondary reservoir 610. At least one of the first cavity 630 or the second cavity 632 is sized, shaped and/or dimensioned to receive a lower portion 1502 of a specimen container 1500 (FIG. 15) therethrough. The other one of the first cavity 630 or the second cavity 632 is sized, shaped and/or dimensioned to receive at least a portion of a pick and/or place head 1600, 1700 (FIGS. 16, 17) therein.

The intermediary block 604 is preferably capable of withstanding cryogenic temperatures without premature failure, and can be formed of a high strength-to-weight metal (e.g., aluminum, titanium).

Figure 11:
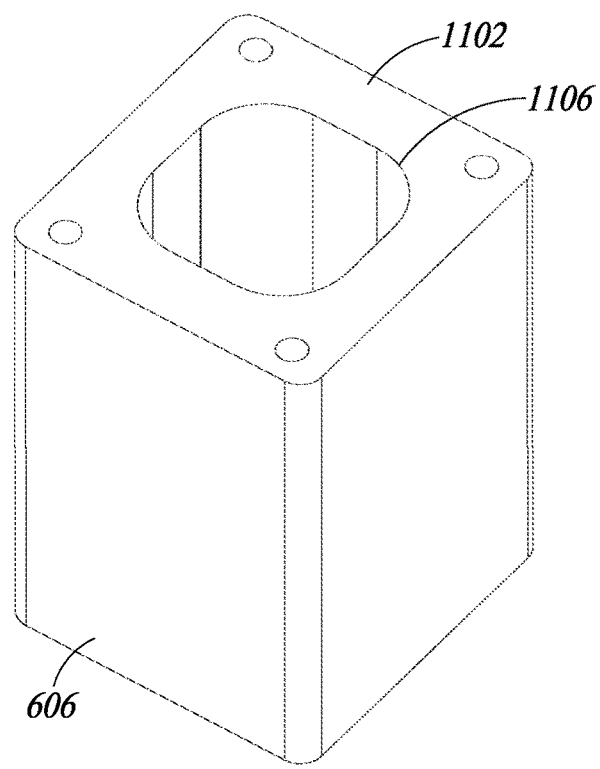
FIG. 11 is a top isometric view of the bottom block of FIGS. 6 through 8.

FIG. 11 shows the bottom block 606 of the wedged-shaped segment 600 of the rack assembly 124, which is also visible in FIGS. 5, 6, and 8.

The bottom block 606 has an upper face 1102 and a lower face 1104 (FIG. 8), the lower face 1104 opposed to the upper face 1102 across a thickness of the bottom block 606. The bottom block 606 has a cavity 1106 that is accessible via an opening in the upper face 1102, and which is closed at the lower face 1104. The cavity 1106 in the bottom block 606 forms at least a portion of one of the first secondary reservoir 608 or the second secondary reservoir 610 along with the cavity 632 of the intermediate block 604. The cavity 1106 in the bottom block 606 is sized, shaped and/or dimensioned to receive a lower portion 1502 of a specimen container 1500 (FIG. 15) therethrough. Thus, one of the first secondary reservoir 608 or the second secondary reservoir 610 is deeper than the other one of the first secondary reservoir 608 or the second secondary reservoir 610, to accommodate a major portion of a length of a specimen container 1500 (FIG. 15) therein to, for example recharge or replenish the specimen container 1500 with liquid cryogenic fluid via one or more ports 1508 (FIG. 15) of the specimen container 1500, for example prior to removal of the specimen container 1500 from the cryogenic tank 102 (FIGS. 1A and 1B).

The upper rack plate 602a, lower rack plate 602b, intermediary block 404 and/or bottom block 606 can each include a number of throughholes that align with respective throughholes in the other ones of the upper rack plate 602a, lower rack plate 602b, intermediary block and/or bottom block to receive respective fasteners (e.g., screws, bolts) to secure the upper rack plate 602a, the lower rack plate 602b, the intermediary block and/or the bottom block together.

Figure 12:
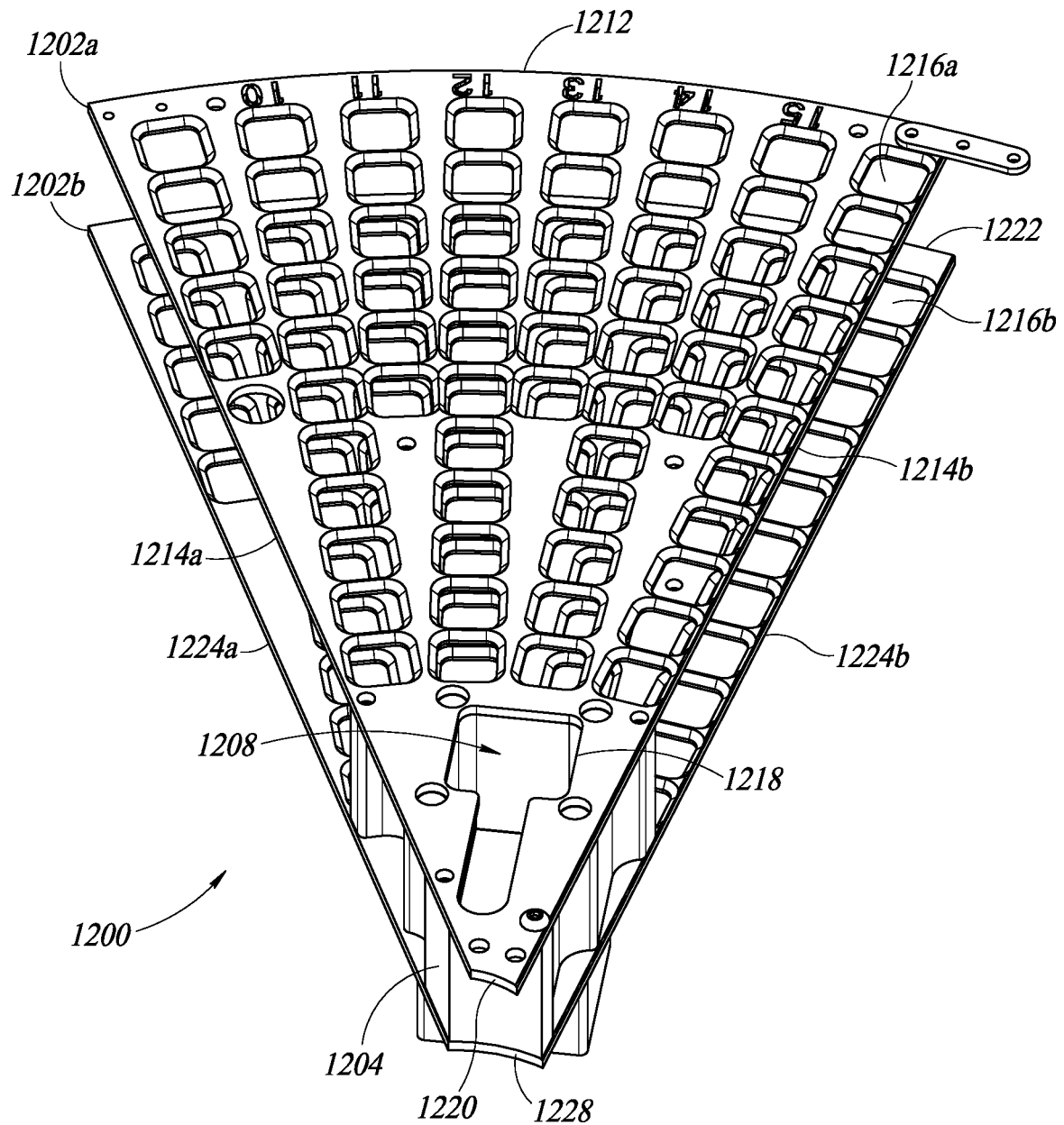
FIG. 12 is a top isometric view of a wedged-shaped segment of a rack assembly according to another illustrated implementation.
Figure 13:
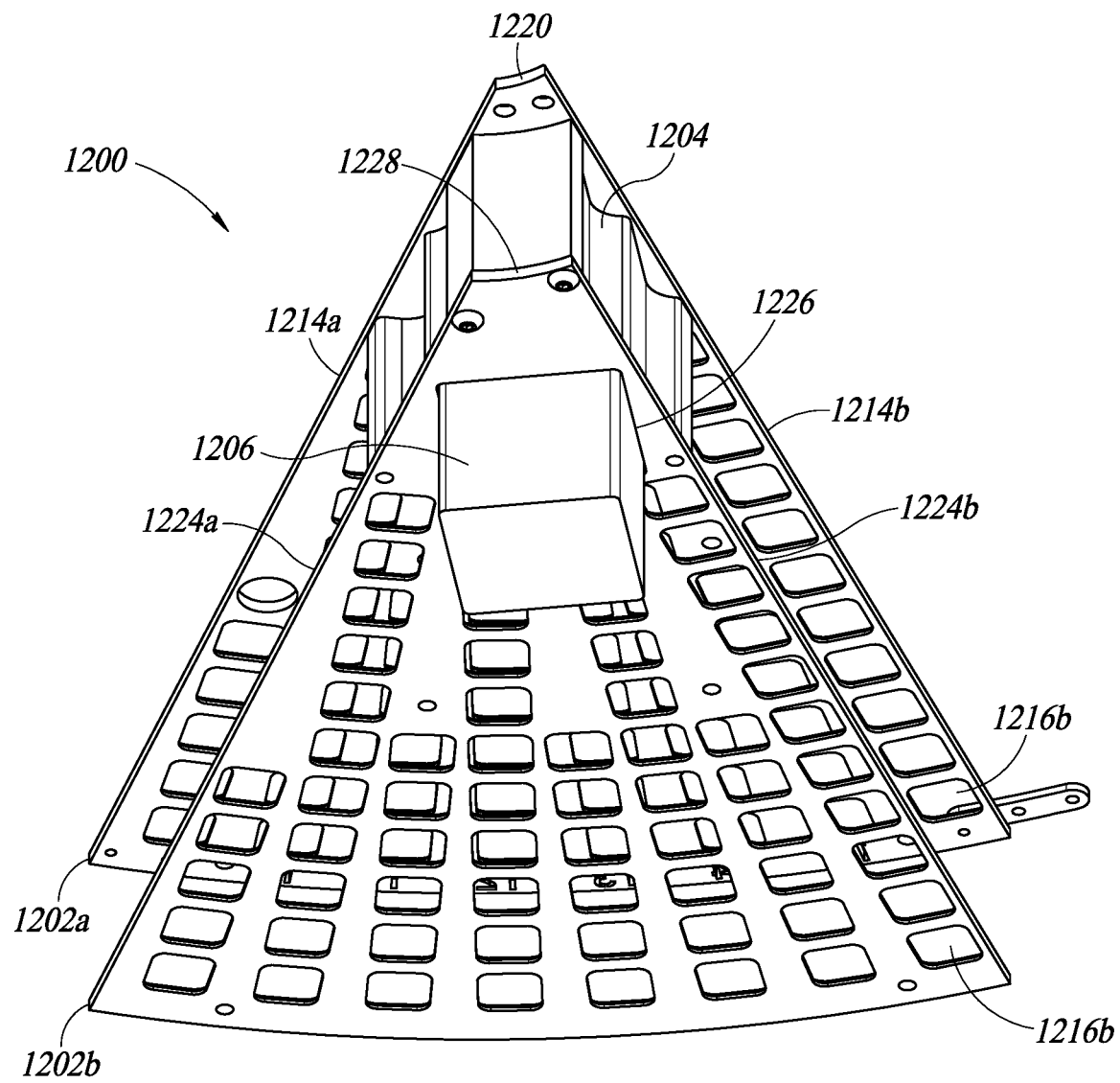
FIG. 13 is a top plan view of the wedged-shaped segment of the rack assembly of FIG. 12.

FIGS. 12 and 13 show a wedged-shaped segment 1200 of a rack assembly according to another illustrated implementation. The wedged-shaped segment 1200 is similar in many respect to the wedged-shaped segment 600 (FIG. 6), although includes a single secondary reservoir 1208 instead of two secondary reservoirs 608, 610.

The wedged-shaped segment 1200 includes an upper rack plate 1202a, a lower rack plate 1202b, an intermediary block 1204 between the upper and lower rack plates 1202a, 1202b, and a bottom block 1206 below the lower rack plate 1202b that comprise the illustrated wedged-shaped segment 1200, according to at least one illustrated implementation. The illustrated wedged-shaped segment 1200 is similar to the wedge-shaped segments 134b, 134e, 134i (FIGS. 3, 4, 5), although the wedged-shaped segment 1200 includes only first secondary reservoir 1208.

The upper rack plate 1202a can have a wedge-shape, with an arcuate outer perimeter 1212, and straight peripheral edges 1214a, 1214b. The upper rack plate 1202a includes one or more throughholes 1216a (one called out) which extend through a thickness of the upper rack plate 1202a. The throughholes 1216a can be arranged in one or more arrays. The throughholes 1216a are sized, shaped and/or dimension to receive a lower portion 1502 of a specimen container 1500 (FIG. 15) therethrough while engaging an upper portion 1504 of the specimen container 1500 (FIG. 15), and thus can constitute a respective storage location The throughholes 1216a are spaced from one another by a sufficient distances to allow at least an engagement portion 1620, 1706b of a pick and/or place head 1600, 1700 (FIGS. 16, 17) to physically access individual specimen containers 1500 (FIG. 15) at each storage location without physically engaging any specimen containers 1500 at neighboring storage locations. The upper rack plate 1202a includes a slot 1218 that extends through the thickness of the upper rack plate 1202a and which provides an opening to the first secondary reservoir 1208. The slot 1218 in the upper rack plate 1202a may be located relatively toward an inner peripheral portion 1220 of the upper rack plate 1202a. The upper rack plate 1202a is preferably relatively thin but also sufficiently rigid to support the specimen containers 1500 in conjunction with the lower rack plate 1202b. The upper rack plate 1202a is preferably capable of withstanding cryogenic temperatures without premature failure, and can be formed of a high strength-to-weight metal (e.g., aluminum, titanium).

The lower rack plate 1202b can have a wedge-shape, with an arcuate outer perimeter 1222, and straight peripheral edges 1224a 1224b. The lower rack plate 1202b includes one or more throughholes 1216b which extend through a thickness of the lower rack plate 1202b. The throughholes 1216b can be arranged in one or more arrays, and aligned with respective throughholes 1216a of the upper rack plate 1202a. The throughholes 1216b are sized, shaped and/or dimension to receive a lower portion 1502 of a specimen container 1500 (FIG. 15) therethrough. The throughholes 1216b are spaced from one another by a sufficient distances to allow at least an engagement portion 1620, 1706b of a pick and/or place head 1600, 1700 (FIGS. 16, 17) to physically access individual specimen containers 1500 (FIG. 15) at each storage location without physically engaging any specimen containers 1500 at neighboring storage locations. Use of the upper and lower rack plates 1202a, 1202b ensures that specimen containers 1500 will be in an upright position when stored at the storage locations (e.g. throughholes 1216a, 1216b), advantageously facilitating placement and retrieval operations on individual specimen containers 1500 via a pick and/or place head 1600, 1700 (FIGS. 16, 17), while providing a strong yet light weight rack capable of easy rotation. To this extent the lower rack plate 1202b may be identical to the upper rack plate 1202a, possible differences between the lower rack plate 1202b and the upper rack plate 1202a are described immediately below, although in some implementations the lower rack plate 1202b may be identical to the upper rack plate 1202a thereby advantageously reducing parts count.

The lower rack plate 1202b includes a slot 1226 which extends through the thickness of the lower rack plate 1202b. The slot 1226 (FIG. 13) in the lower rack plate 1202b can provide a passage between a cavity 1430 (FIGS. 14A, 14B) in the intermediary block 1204 and a cavity 1106 (FIG. 11) in the bottom block 1206, where the cavity 1430 (FIGS. 14A, 14B of the intermediary block 1204 and the bottom block 1206 comprise the first secondary reservoir 1208. The slot 1226 in the lower rack plate 1202b may be located relatively toward an inner peripheral portion 1228 of the lower rack plate 1202b. The lower rack plate 1202b is preferably relatively thin but also sufficiently rigid to support the specimen containers 1500 in conjunction with the upper rack plate 1202a. The lower rack plate 1202b is preferably capable of withstanding cryogenic temperatures without premature failure, and can be formed of a high strength-to-weight metal (e.g., aluminum, titanium).

The other wedged-shaped segments 134a, 134c, 134d, 134f, 134g, 134h, 134j, (FIGS. 3, 4, 5) of the first group 126a and the other wedged-shaped segments 134k, 134m, 134n, 134p, 134q, 134s, 134t of the second group 126b may be identical to that described above, although omitting the slot from the upper rack plate 1202a and the slot from the lower rack plate 1202b.

Figure 14A:
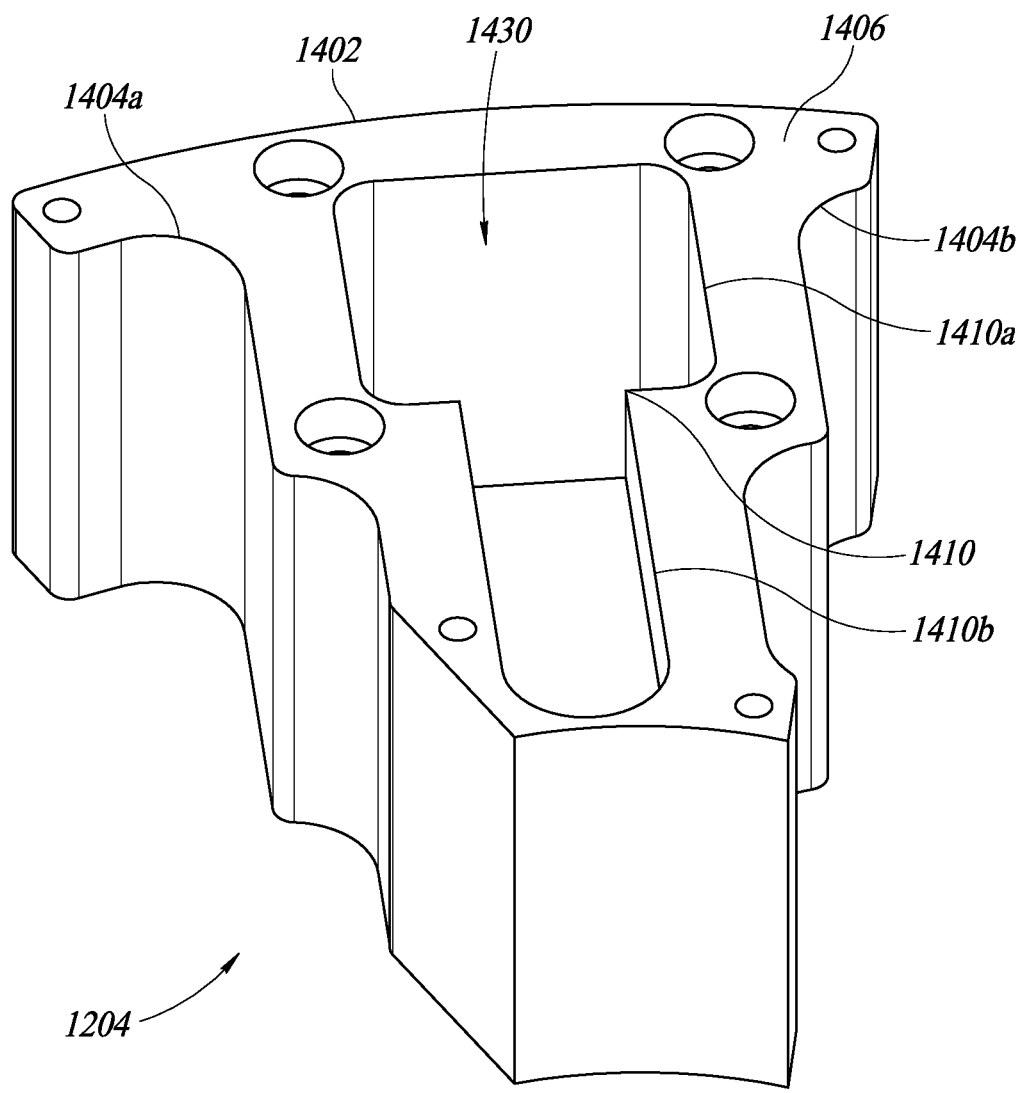
FIG. 14A is a top isometric view of the intermediary block of FIGS. 12 and 13.
Figure 14B:
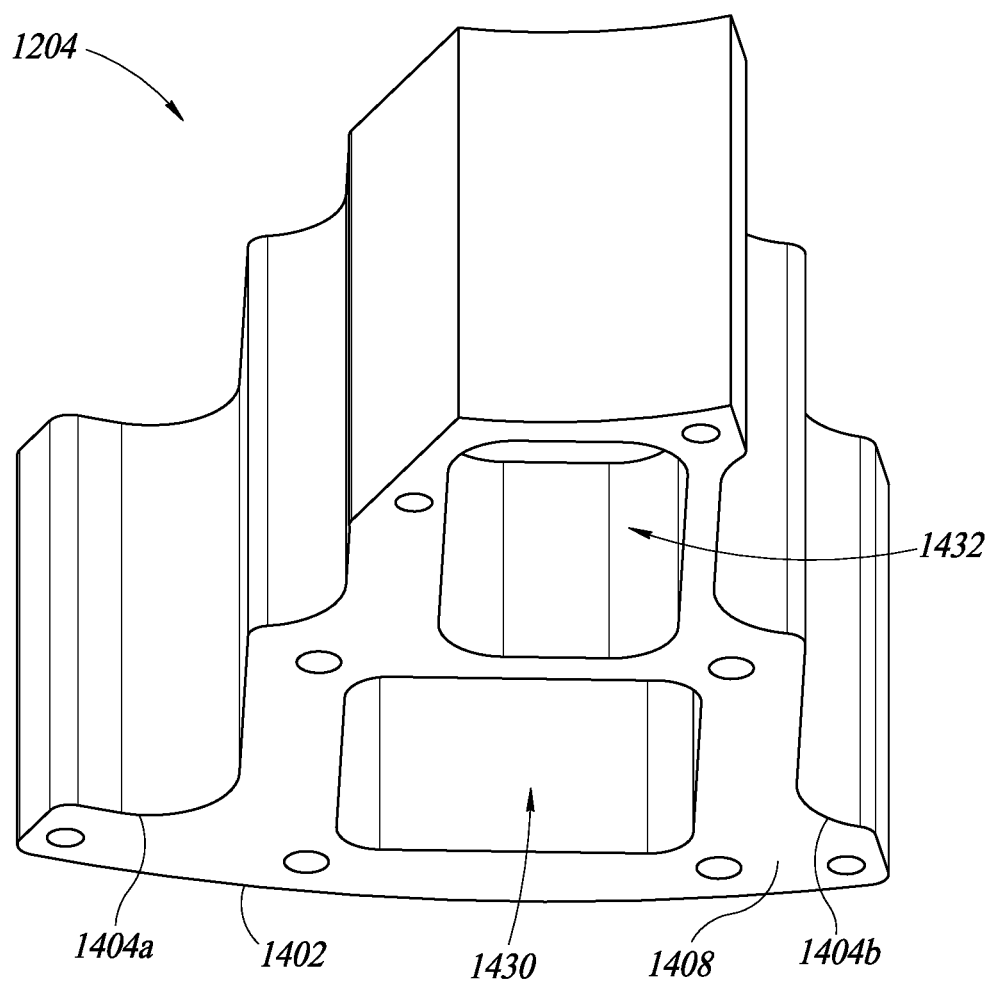
FIG. 14B is a bottom isometric view of the intermediary block of FIGS. 12 and 13.

FIGS. 14A and 14b show an intermediary block 1204 of the wedged-shaped segment 1200 (FIGS. 12 and 13) of the rack assembly 124 of FIGS. 12 and 13, according to another illustrated implementations.

The intermediary block 1204 can have a general wedge-shape, with an arcuate outer perimeter 1402, convoluted peripheral edges 1404a, 1404b, and upper face 1406a (FIG. 14B) and a lower face 1406b (FIG. 14B) opposed to the upper face 1406a across a thickness of the intermediary block 1204. The intermediary block 1204 includes a slot 1410 in the upper face 1406a, a portion 1410a of which extends through the thickness of the intermediary block 1204 and a portion 1410b of which does not extend all the way through the thickness of the intermediary block 1204. The slot 1410 can mate with and provide a passage to the slot 1218 (FIG. 12) of the upper rack plate 1202a. A portion 1410a of the slot 1410 can mate with and provide a passage to the slot 1226 (FIG. 13) in the lower rack plate 1202b to thereby provide a passage to a cavity 1106 (FIG. 11) in the bottom block 1206. A first cavity 1430 (FIGS. 14A, 14B) of the intermediary block 1204 and the cavity 1102 of the bottom block 1206 comprise the first secondary reservoir 1208. At least a portion (e.g., portion 1410a) of the slot 1410 and the first cavity 1430 of the intermediary block 1204 and the cavity 1102 of the bottom block 1206 are sized, shaped and/or dimensioned to receive a lower portion 1502 of a specimen container 1500 (FIG. 15) therethrough. Additionally or alternatively, at least a portion (e.g., portion 1410b) of the slot 1410 and the first cavity 1430 of the intermediary block 1204 are sized, shaped and/or dimensioned to receive at least a portion of a pick and/or place head 1600, 1700 (FIGS. 16, 17) therein.

As best seen in FIG. 14B, the intermediary block 1204 can optionally include a second cavity 1432, which does not extend through the thickness of the intermediary block 1204. The second cavity 1432 can advantageously reduce a weight of the intermediary block 1204, and hence reduce inertia to rotation or pivoting of the assembly of storage locations.

The intermediary block 1204 is preferably capable of withstanding cryogenic temperatures without premature failure, and can be formed of a high strength-to-weight metal (e.g., aluminum, titanium).

The bottom block may be identical or similar in shape to the bottom block 606 (FIG. 11), although the overall dimension may differ.

Typically, the main reservoir has a maximum cryogenic liquid storage volume and the secondary reservoir(s) have a maximum cryogenic liquid storage volume, the maximum cryogenic liquid storage volume of the secondary reservoirs each being less than half of the maximum cryogenic liquid storage volume of the main reservoir. In may implementations, the maximum cryogenic liquid storage volume of the secondary reservoirs will each be less than a quarter or even a tenth of the maximum cryogenic liquid storage volume of the main reservoir.

Figure 15:
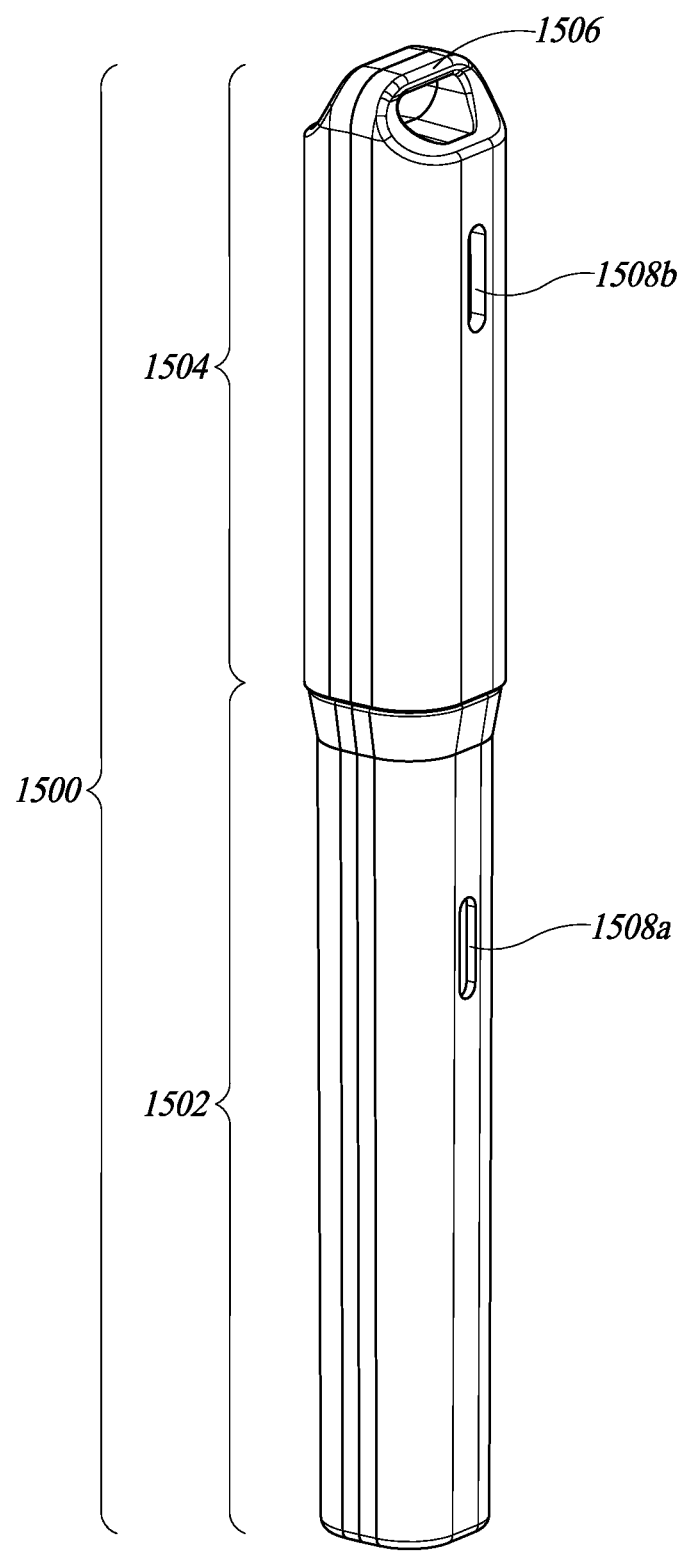
FIG. 15 is a top isometric view of a specimen container, according to at least one illustrated implementation, the specimen container receivable in the storage locations of the rack assembly.

FIG. 15 shows an exemplary specimen container 1500, according to at least one illustrated implementation, the specimen container 1500 receivable in a vertical orientation in the storage locations 128 (FIGS. 1A and 1B) of the rack assembly 124 (FIGS. 1A and 1B).

Each specimen container 1500 may comprises a lower portion (e.g., a vial 1502) and an upper portion (e.g., cap 1504). The vial 1502 is generally tubular, and includes one or more walls that delineate an interior or interior volume from an exterior thereof. The wall or a portion thereof may, for example, be transparent. The vial 1502 typically includes an opening (not visible) at a top thereof which provides access to the interior from the exterior. The vial 1502 may include a coupler feature (not visible) proximate the top thereof to detachably secure the cap 1504 thereto. The coupler feature may, for example, take the form of a thread, a detent, and/or a portion of a bayonet mount.

While illustrated as having a square with rounded corners cross-section or profile, the vial 1502 may in some implementations have other non-circular cross-sections or profiles, for example an oval cross-section or profile, a rectangular cross-section or profile, a square cross-section or profile, a D-shape cross-section or profile, hexagonal cross-section or profile, or octagonal cross-section or profile. In some instances, the vial 1502 may have a two or more different cross-sections or profiles that vary from one another along a longitudinal axis or length thereof.

The cap 1504 couples to the vial at a top thereof, and is moveable to provide and alternatingly prevent access to the interior from the exterior. In some implementations, the cap 1504 is completely removably from the vial 1502, while in other implementations the cap 1504 may remain tethered to the vial 1502 even when removed from the opening. The cap 1504 may include a complementary coupler feature 1506, that is complementary to the coupler feature of the vial 1502. The complementary coupler feature may, for example, take the form of a thread, a detent, and/or a portion of a bayonet mount sized, positioned or otherwise configured to engagingly mate with the coupler feature of the vial 1502.

The specimen container 1500 including the vial 1502 and cap 1504 may take any of a large variety of forms, and may be composed of any of a large variety of materials (e.g., plastics), for example materials which are suitable to withstand cryogenic temperatures and/or repeated cycling between room temperatures and cryogenic temperatures. The vial 1502 and/or the cap 1504 may include one or more ports 1508a and/or vents 1508b to allow ingress and egress of fluid (e.g., liquid nitrogen, air) into and out of the interior of the vial. In some implementations, the cap 1504 may include one or more engagement features that facilitate engagement, for example a handle 1510.

The specimen container 1500 has a set of outer dimensions that represent the outer dimensions of at least one portion (e.g., cap 1504, vial 1502) of the specimen container 1500 measure at one or more positions along a longitudinal axis of the specimen container 1500. For example, the outer dimensions of the cap 1504 includes a first dimension between outer portions of a first pair of parallel sides, a second dimension between outer portions of a second pair of parallel sides, and a third dimension between outer portions of two corners that extend between perpendicular sides (e.g., third dimension extends across diametrically opposed corners). The set of outer dimensions may, for example, be the outer lateral dimensions of a largest portion of the single one of the specimen containers 1500. In at least some implementations, the vial 1502 and the cap 1504 will have the similar or even the same profile, although the outer lateral dimensions of the cap 1504 will typically be slightly larger than the corresponding outer lateral dimensions of the vial 1502. As noted earlier, the storage locations 128 have a shape or profile and interior dimensions that allow the outer dimensions of at least a portion of a single one of the specimen containers 1500 to be received therein, and in at least some implementations prevent or restrain the single one of the specimen containers 1500 from rotating.

The specimen container 1500 may hold one or more specimen holders (not visible), which may take any of a large variety of forms capable of retaining a biological specimen, according to one illustrated implementation. For example, the specimen holders may take the form of cryopreservation straws, cryopreservation tubes, sticks or spatulas. The specimen holders may be composed of any of a large variety of materials (e.g., plastics), for example materials which are suitable to withstand cryogenic temperatures and/or repeated cycling between room temperatures and cryogenic temperatures.

One or more wireless transponders (not visible), for example radio frequency identification (RFID) transponders, are physically associated with the specimen container 1500. For example, one or more wireless transponders may be physically secured to the vial 1502, for instance molded thereon, secured thereto via adhesive and/or fasteners, or via an interference fit or even a shrink fit. Also for example, one or more wireless transponders may be physically secured to the cap 1504, for instance molded thereon, secured thereto via adhesive and/or fasteners, or via an interference fit or even a shrink fit. Additionally or alternatively, one or more wireless transponders may, for example, be physically secured to the specimen holders, for instance molded thereon, secured thereto via adhesive and/or fasteners, or via an interference fit or even a shrink fit.

Typically, the wireless transponder(s) will have an antenna and will be secured to the such that a principal axis of transmission of the antenna is aligned with the longitudinal axis or length of the vial 1502, although such is not necessary to operation of the described embodiments. The antenna of the wireless transponder(s), whether attached to the vial 1502, cap 1504, or specimen holders will also be located at a defined distance along the longitudinal axis or length of the vial 1502 from some fixed point (e.g., a top of the cap 1504, or top of the vial 1502).

One or more optically readable symbols (not visible), for example machine-readable symbols (e.g., one- or two-dimensional machine-readable symbols for instance barcode symbols or QR code symbols) and/or human-readable symbols (e.g., alphanumeric symbols) may be carried by or inscribed in or on the specimen container 1500.

Figure 16:
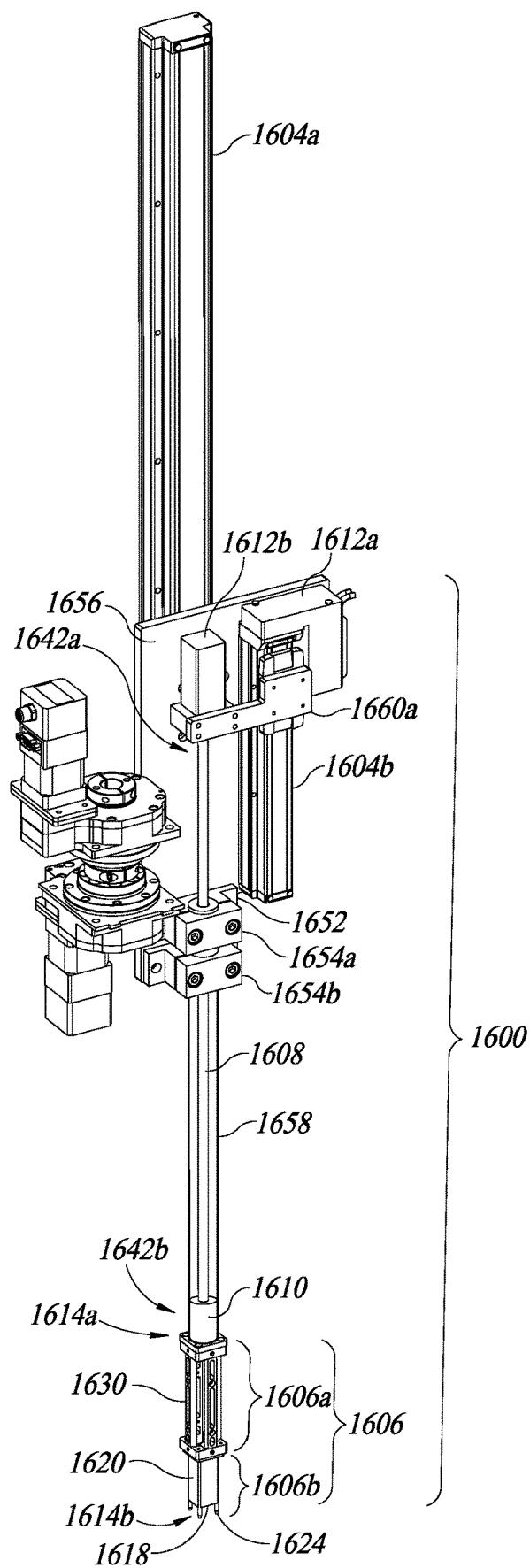
FIG. 16 is an isometric view of a mechanical pick and/or place head, according to at least one illustrated implementation, the mechanical pick and/or place head operable to physically manually engage a specimen container for example during a pick and/or place operation to pick and/or place the specimen container from or to one of the storage locations of the rack assembly.

FIG. 16 shows a mechanical pick and/or place head 1600, according to at least one illustrated implementation, the mechanical pick and/or place head 1600 operable to physically manually engage a specimen container 1500 (FIG. 15) for example during a pick and/or place operation to pick and/or place the specimen container 1500 from or to one of the storage locations 128 (FIGS. 1A and 1B) of the rack assembly 126 (FIGS. 1A and 1B).

The pick and/or place head 1600 is mounted to travel along a first rail 1604a. The first rail 1604a may extend vertically, for example, allowing the pick and/or place head 1600 to translate vertically. Such may, for example, allow the pick and/or place head 1600 to be moved between an interior and an exterior of an enclosed cryogenic environment (e.g., cryogenic tank 102, cryogenic freezer, dewar or other cryogenic enclosure), for example via a door or access port 114 at a top of cryogenic enclosure.

The pick and/or place head 1600 includes a receiver 1606, a drive shaft 1608, an engagement head 1610, and one or more actuators, for example a translation motor 1612a and a rotation motor 1612b.

The receiver 1606 has a proximate end 1614a, a distal end 1614b, and a receptacle having an opening 1618 at the distal end 1614b of the receiver 1606.

As illustrated the receiver 1606 and the receptacle may be formed of two or more parts, although in some implementations the receiver 1606 may take the form of a single-piece, unitary structure. As illustrated, the receiver 1606 comprises a proximate portion 1606a and a distal portion 1606b.

The distal portion 1606b of the receiver 1606 can take the form of a block or sleeve 1620 with a peripheral flange (not visible) extending laterally therefrom at a proximate end of the receiver 1606 and with a set of feet or standoffs 1624 (only one called out) extending or projecting longitudinally therefrom at a distal end of the receiver 1606. The receiver 1606 includes the opening which provides access to an interior 1626 of the receiver 1606. The opening and/or the interior of the receiver 1606 have a profile that is/are sized and/or shaped to accommodate a profile of a single specimen container 1500 (FIG. 15). The peripheral flange of the receiver 1606 may have throughholes to allow the distal portion 1606*b* to be coupled to the proximate portion 1606*a*, for instance via one or more fasteners.

The proximate portion 1606*a* of the receiver 1606 is illustrated as a frame or cage 1630, comprising a base, a top and frame members or struts that extend between the base and the top, to define an interior therebetween The interior of the proximate portion 1606*a* has a profile that is sized and/or shaped to accommodate a profile of a single specimen container 1500 (FIG. 15), although may have higher fit tolerances than that of the interior of the receiver 1606 or opening 1618. The interior of the proximate portion 1606*a*, or a part thereof, may be open to an exterior or alternatively one or more sidewalls may enclose the interior. The base of the proximate portion 1606*a* may have throughholes to allow the proximate portion 1606*a* to be coupled to the distal portion 1606*a*, for instance via one or more fasteners (e.g., threaded fasteners for instance screws or bolts and nuts). The top of the proximate portion 1606*a* may have throughholes (not called out) to allow the proximate portion 1606*a* to be coupled to other portions of the pick and/or place head 1600, for instance via one or more fasteners ((e.g., threaded fasteners for instance screws or bolts and nuts).

The receptacle has a principal axis and a set of lateral inner dimensions measured laterally with respect to the principal axis. The lateral inner dimensions of the receptacle are sized to accommodate a set of lateral outer dimensions 1512 (FIG. 15) of at least a portion of a single container 1500 (FIG. 15) therein. At least a portion of the receptacle is sized to physically prevent rotation of the single one of the specimen containers 1500 (FIG. 15) about the principal axis while allowing translation with respect thereto. For example, the lateral inner dimensions of the receptacle at a smallest portion is sized to provide either a clearance fit or close fit (e.g., physically contact without deformation while preventing rotation) with a widest portion of the single container 1500 (FIG. 15). For example, the receptacle or a portion thereof may have a non-circular profile, for instance a D-shaped profile, rectangular profile, or the receptacle has a square profile with two pairs of parallel sides (e.g., a rectangular cuboid) and rounded or arcuate corners between pairs of the sides. Such may receive a portion or all of a single specimen container 1500 (FIG. 15), while preventing rotation of or restraining rotation of the single specimen container 1500 within a set angular range.

The drive shaft 1608 has a proximate end 1642*a* and a distal end 1642*b*. The drive shaft 1608 is a generally elongate member, and may take a variety of forms that allow transmission of translational displacement and rotation. The drive shaft 1608 may, for example, take the form of a solid rod or a hollow rod. While illustrated as a cylindrical rod, the drive shaft 1608 can have non-circular profiles, for example a D-shaped profile, rectangular profile including a square profile, or a polygonal profile such as a hexagonal or octagonal profile. The drive shaft 1608 may be made of a metal, or a plastic, or a combination thereof.

The engagement head 1610 is located at the distal end 1642*b* of the drive shaft 1608, and translates and rotates along with the drive shaft 1608. The engagement head 1610 may be an integral, unitary part of the drive shaft 1608, or may be a separate and distinct part physically coupled or otherwise attached directly, or indirectly to the drive shaft 1608. The engagement head 1610 includes or more engagement features to engage a portion of a single one of the specimen containers 1500 (FIG. 15) when the single one of the specimen containers 1500 is positioned in the receptacle of the receiver 1606. For example, the engagement head 1610 includes a base and a pair of lugs. Each of the lugs comprises a stem positioned at diametrically opposed locations at a periphery of the base and extending longitudinally outwardly (e.g., perpendicularly) from the base. Each of the lugs comprises a finger that extends angled radially inwardly from the respective stem, the fingers each having a distal most portion that is spaced radially inwardly of the principal axis of the receptacle. The finger of each of the lugs is disposed in a same rotational direction about the principal axis as the finger of the other one of the lugs. The stems provide for a gap to exist between the fingers and the base.

Where specimen containers 1500 (FIG. 15) each include a vial and a cap, the cap having a handle, the cap threadedly coupled to vials, and the lugs are disposed about the principal axis such that a counterclockwise rotation of the drive shaft 1608 causes the lugs, and in particular fingers, to mechanically physically engage the handle of the cap in a direction in which the cap tightens to the vial, and such that a clockwise rotation of the drive shaft 1608 causes the lugs to disengage the handle of the cap. For an oppositely or reverse threaded cap and vial, the inverse directions would apply.

The pick and/or place head 1600 may optionally include one or more bearings 1652 that support the drive shaft 1608 for translation along the principal axis and rotation about the principal axis of the receptacle. The bearing(s) 1652 may be supported via one or more brackets 1654*a* attached for example to a support plate 1656. The pick and/or place head 1600 may optionally include a guide tube 1658 through which a portion of the drive shaft 1608 translates in moving between a retracted position the engagement head 1610 and an extended position of the engagement head 1610. In the extended position, the engagement head 1610 is positioned distally with respect to the retracted position, for example positioned to contact and engage a portion (e.g., handle on cap) of the single specimen container 1500 (FIG. 15) that is located in the interior of the block or sleeve 1620. The guide tube 1658 may be supported via one or more brackets 1654*b*, for example, attached to the support plate 1656.

The translation motor 1612*a* and a rotation motor 1612*b* may be coupled to the drive shaft 1608 via respective drive trains or transmissions 1660*a*. For example, the translation motor 1612*a* may be coupled to a second rail 1604*b*, to drive the drive shaft to translate along the second rail 104*b*, in what would typically be a vertical direction. The translation motor 1612*a*, rotation motor 1612*b*, and/or the respective drive trains or transmissions 1660*a* may be supported by the support plate 1656. While illustrated as a translation motor 1612*a* and a rotation motor 1612*b*, the actuators of the pick and/or place head 1600 can take other forms, for example one or more of the actuators may take the form of one or more solenoids. The translation motor 1612*a* and a rotation motor 1612*b* may be controlled or operated via signals supplied by one or more control systems, for instance via one or more motor controllers 1838 (FIG. 18).

The drive shaft 1608 is translatable, via the translation motor 1612*a* and respective drive train or transmission 1660*a*, parallel with the principal axis to selectively position the engagement head 1610 alternatingly distally from and proximate to a first portion of the single one of the specimen containers 1500 (FIG. 15) when the single one of the specimen containers 1500 is positioned at least partially in the receptacle of the receiver 1606. At least when positioned proximate to the first portion of the single one of the specimen containers 1500, the drive shaft 1608 is selectively rotatable, via the rotation motor 1612*b* and respective drive train or transmission 1660*b*, alternatingly in a clockwise and a counterclockwise direction about the principal axis to cause at least a portion (e.g., lugs) of the engagement head 1610 to alternatingly engage and disengage the first portion of the single one of the specimen containers 1500 while at least a portion of the receptacle of the receiver 1606 prevents the single one of the specimen containers 1500 from rotating about the principal axis. An exemplary mechanical pick and/or place head and operation of the same is described in U.S. patent application 63/135,886, filed Jan. 13, 2021.

Figure 17A:
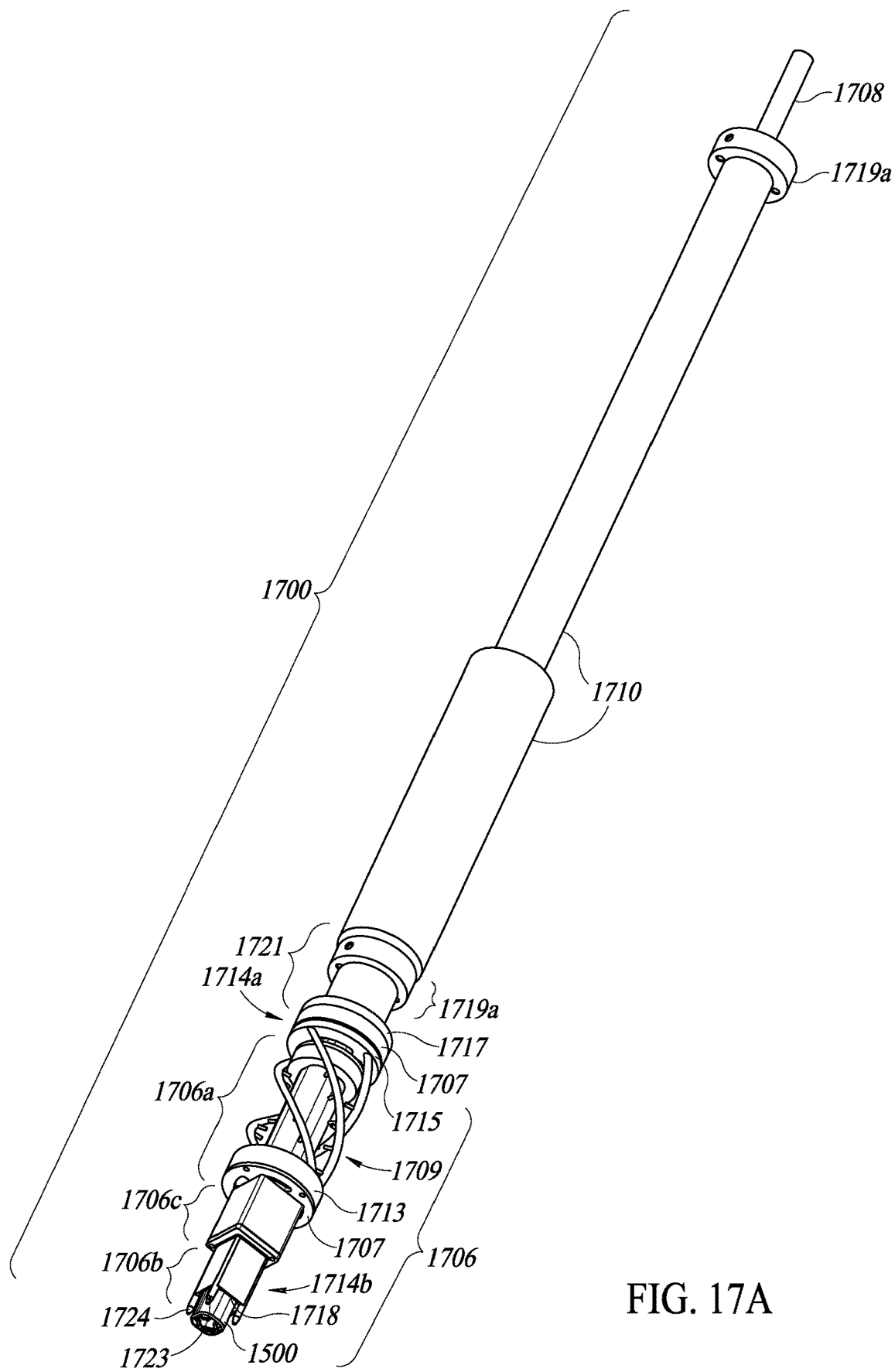
FIG. 17A is an isometric view of a pneumatic or vacuum-based pick and/or place head, according to at least one illustrated implementation, the pneumatic or vacuum-based pick and/or place head operable to physically manually engage a specimen container for example during a pick and/or place operation to pick and/or place the specimen container from or to one of the storage locations of the rack assembly.

FIG. 17A shows a pneumatic or vacuum-based pick and/or place head 1700, according to at least one illustrated implementation, the pneumatic or vacuum-based pick and/or place head 1700 operable to physically manually engage a specimen container 1500 (FIG. 15) for example during a pick and/or place operation to pick and/or place the specimen container 1500 from or to one of the storage locations 128 (FIGS. 1A and 1B) of the rack assembly 126.

The pick and/or place head 1700 may be mounted to travel along a rail (e.g., first rail 1604*a*, FIG. 16). The first rail 1604*a* may extend vertically, for example, allowing the pick and/or place head 1700 to translate vertically. Such may, for example, allow the pick and/or place head 1700 to be moved between an interior and an exterior of an enclosed cryogenic environment (e.g., cryogenic tank 102, cryogenic freezer, dewar or other cryogenic enclosure), for example via a door or access port 114 (FIG. 1A) at a top of cryogenic enclosure.

The pick and/or place head 1700 includes a receiver 1706, a drive shaft 1708, a vacuum conduit 1710. The pick and/or place head 1700 may include or may be coupled with one or more actuators, for example one or more solenoids or electric motors 1836*a*, 1836*b*, 1836*c* (FIG. 18) and/or one or more vacuum source(s) 1842 (FIG. 18). It is noted that use of the term vacuum herein and in the claims refers to a negative pressure, e.g., a pressure below atmospheric pressure or below ambient pressure in the adjacent surroundings, which typically is somewhat above an absolute vacuum or zero pressure.

The receiver 1706 has a proximate end 1714*a*, a distal end 1714*b*, and a receptacle having an opening 1718 at the distal end 1714*b* of the receiver 1706.

As illustrated, the receiver 1706 may be formed of two or more parts, although in some implementations the receiver 1706 may take the form of a single-piece, unitary structure. As illustrated, the receiver 1706 comprises a proximate portion 1706*a*, a distal portion 1706*b*, and an intermediate portion 1706*c*, the intermediate portion 1706*c* positioned between the proximate portion 1706*a* and the distal portion 1706*b*.

The distal portion 1706*b* of the receiver 1706 is illustrated as a distal block or sleeve with a peripheral flange extending laterally therefrom at a proximate end of the receiver 1706 and with a set of feet or standoffs 1724 extending or projecting longitudinally therefrom at a distal end of the receiver 1706. The receiver 1706 includes a through-passage with openings that provide access to an interior of the receiver 1706, for example from an exterior of the receiver 1706. The openings and/or the through-passage of the receiver 1706 have a profile that is/are sized and/or shaped to accommodate a profile of a single specimen container 1500 (FIG. 15). The peripheral flange of the receiver 1706 may have holes to allow the distal portion 1706*b* to be coupled to the intermediate portion 1706*c*, for instance via one or more fasteners (e.g., threaded fasteners).

One or more temperature sensors, for example thermocouples 1723 (only one visible in FIG. 17A) can be carried by the distal portion 1706*b* of the receiver 1706, for example mounted on or mounted in or otherwise carried by the portion 1706*b*. For instance, a thermocouple 1723 can be mounted in a cavity 1725 in one or more of the feet or standoffs 1724 or otherwise carried or mounted on one or more of the feet or standoffs 1724. Such can advantageously position the thermocouple(s) 1723 to sense a temperature of the distal portion 1706*b* itself and/or sense a temperature of a reservoir or bath (e.g., main or primary reservoir 116, first secondary reservoir 300*a*, second secondary reservoir 302*a*) into which the distal portion 1706*b* or portion thereof (e.g., feet or standoffs 1724) may be placed, for example during cooling (e.g., pre-cooling) of the distal portion 1706*b* and/or cooling or replenishment of the specimen container 1500 with cryogenic liquid (e.g., $N_2$ in liquid form). The thermocouple(s) 1723 can be communicatively coupled (e.g., wired, wirelessly) to processor or controller (e.g., microcontroller), the processor or controller monitoring a temperature and/or liquid levels of a reservoir (e.g., first secondary reservoir 300*a*, second secondary reservoir 302*a*) and/or monitoring a temperature of the distal portion 1706*b* itself.

The intermediate portion 1706*c* of the receiver 1706 is illustrated as an intermediate block or sleeve. The intermediate portion 1706*c* includes a through-passage with openings that provide access to an interior of the intermediate portion 1706*c*. The openings and/or the through-passage of the portion 1706*c* have a profile that is/are sized and/or shaped to accommodate a profile of a single specimen container 1500 (FIG. 15). The portion 1706*c* may have holes 728*c* to allow the intermediate portion 1706*c* to be coupled to the distal portion 1706*a* and coupled to proximate portion 1706*b*, for instance via one or more fasteners. One or more bearings may be coupled to a proximate end of the intermediate portion 1706*c* of the receiver 1706.

The proximate portion 1706*a* of the receiver 106 is illustrated as a proximate block or sleeve. The proximate portion 1706*a* comprises a tubular main body portion with a distal flange extending laterally from a distal end thereof and a proximate flange extending laterally from a proximate end thereof. The proximate portion 1706*a* includes a through-passage with openings that provide access to an interior of the proximate portion 1706*a*. The openings and/or through-passage of the proximate portion 1706*a* may have a profile that is sized and/or shaped to accommodate a profile of a single specimen container 1500 (FIG. 15), although may have higher fit tolerances than that of the openings and/or through-passage of the distal portion 1706*b* or corresponding openings and/or through-passage of the intermediate portion 1706*c*. The interior or through-passage of the proximate portion 1706*a* is laterally enclosed, with the opening at the proximate end providing a vacuum port which allows a vacuum or negative pressure to be established in the interior of the proximate portion 1706*a*, which can advantageously be used to draw a single specimen container 1500 (FIG. 15) inwards into the interior of the through-passage from a position in which a portion of the single specimen container 1500 was received in the distal and/or intermediary portions 1706*a*, 1706*c*.

The distal flange of the proximate portion 1706a may have holes (e.g., threaded holes) to allow the proximate portion 1706a to be coupled to the intermediate portion 1706c, for instance via one or more fasteners (e.g., threaded fasteners, for instance screws or bolts) and/or via one or more bearings and a pivot plate 1707 (as described below). The proximate flange of the proximate portion 1706a may have holes to allow the proximate portion 1706b to be coupled to a cover of the pick and/or place head 1700, for instance via one or more fasteners (e.g., threaded fasteners).

As noted above, the proximate end of the proximate portion 1706a of the receiver 1706 may be coupled to a pivot plate 1707. The pivot plate 1707 may, for example, take the form of a disk, and has a central passage. The central passage has a profile that is sized and/or shaped to accommodate a profile of a single specimen container 1500 (FIG. 15). The central passage aligns with the through-passages of the proximate portion 1706a, distal portion 1706b and intermediate portion 1706c of the receiver 1706 such that single specimen container 1500 (FIG. 15) can pass within or extend through the distal portion 1706b, intermediate portion 1706c, pivot plate 1707, and proximate portion 1706a.

The pivot plate 1707 may also have a number (e.g., four) of arcuate slots spaced radially outward of central passage. The arcuate slots have a width sized to receive respective ones of the bearings. The pivot plate 1707 allows pivoting through a defined range of angles. The pivot plate 1707 also include a number of holes (e.g., threaded holes) to allow the pivot plate 1707 to be physically coupled to a torque coupler 1709.

As best illustrated in FIG. 16, the torque coupler 1709 has a proximate end, a distal end. The torque coupler 1709 has an annular base 1713 at the distal end and a plate in the form of a disk 1715 at the proximate end. The torque coupler 1709 has a plurality of strands 1711 (four shown, one called out) that couple the annular base 1713 with the plate 1715. The strands 1711 are spaced radially outward of a longitudinal axis, to define a space in which the intermediate portion 1706c (FIGS. 11A, 11B) can be received. Each of the strands 1711 may, for example, have a helical shape, the plurality of strands 1711 forming a helical cage about the intermediate portion 1706c. The plurality of strands 1711 are sufficiently stiff in rotation about the longitudinal axis to transmit torque, yet may be compliant to axial forces (e.g., compression and/or tension along the longitudinal axis) to dampen vibration.

The annular base 1713 at the distal end of the torque coupler 1709 has a plurality of holes 728e (e.g., threaded holes), which allows the annular base 1713 to be physically coupled to the pivot plate 1707 (FIG. 15), for instance via fasteners (not shown), for instance threaded screws or bolts.

The plate 1715 at the proximate end of the torque coupler 1709 includes a number (e.g., three) arcuate slots spaced radially outward of the longitudinal axis. The arcuate slots extend through an entire thickness of the plate 1715 so constitute through-slots. The arcuate slots are sized, shaped and/or positioned to receive respective arcuate projections of the cover, that is itself attached to the proximate portion 1706a of the receiver 1706 at the proximate end thereof, thereby rotationally coupling the torque coupler 1709 with the intermediate portion 1706c of the receiver 1706 and providing for fluid (e.g., airflow, negative pressure or vacuum) as described below.

The cover may alternatively be described as a manifold.

The drive shaft 1708 may take the form of an elongated member, for instance a rod, with a head at a distal end of the drive shaft 1708. The head may take the form of a plate 1717, for example a disk, with an upstanding peripheral wall or edge to define a recess or interior volume. The drive shaft 1708 may terminate at a floor or may extend through the plate 1717. The plate 1717 has a number of throughholes that are positioned, oriented, sized, and/or shaped to align or couple with respective throughholes of the cover, to provide a fluidly conductive paths therethrough.

A head may also include a number of holes (e.g., threaded holes) which allow the head to be physically coupled or fastened to a collar 1721.

The collar 1721 includes a stem with a flange 1606 that extends radially outward from a distal end of the stem and collar 1721. The flange 1606 may include a number of holes (e.g., threaded holes) which allow the collar 1721 to be physically coupled or fastened to the head. When coupled to the head, the collar 1721 and the head form a cavity therebetween. The stem has a central passage which provides a fluidly conductive path into an interior of the cavity formed by the collar 1721 and the head.

A vacuum conduit 1710 in the form of a tube or sheath receives a portion the drive shaft 1708, allowing rotation of the drive shaft 1708 relative to the vacuum conduit 1710. The vacuum conduit 1710 also provides a conduit for airflow, including a negative pressure or even a positive pressure, in a volume of the interior of the vacuum conduit 1710 that is not occupied by the drive shaft 1708. The vacuum conduit 1710 may have a coupler 1719a at a proximal end thereof to provide a detachable or even permanent coupling to a supply line from a vacuum source (e.g., vacuum pump, Venturi). The vacuum conduit 1710 may have a coupler 1719b at a distal end thereof to provide a detachable or even permanent coupling to the collar 1721.

The described pick and/or place head 1700 of the vacuum-based system 700 provides a fluidly conductive path that allows a pressure (e.g., negative pressure or vacuum, positive pressure) generated or produced by a source to be communicated into the interior of the receiver 1706. For example, a vacuum is supplied at the proximate end of the vacuum conduit 1710. The vacuum is supplied by the central passage of the collar 1721 into the chamber formed by the head 1802 (FIGS. 18A, 18B) and cover. The throughholes in the base of the head supply the vacuum into the interior volume defined at the proximate end of the proximate portion 1706a of the receiver 1706. The through-passage of the proximate portion 1706a of the receiver 1706 fluidly communicatively couples the vacuum from the proximate portion 1706a of the receiver 1706 to the through-passage of the intermediate portion 1706c of the receiver 1706, which in turn fluidly communicatively couples the vacuum to the through-passage of the distal portion 1706b of the receiver 1706. Supplying a negative pressure at a proximate end can draw a single specimen container 1500 (FIG. 15) into, or further into, the receiver 1706, for example drawing a cap 1504 of the single specimen container 1500 (FIG. 15) into the through-passage of the proximate portion 1706a. Additionally, or alternatively, supplying a positive pressure at a proximate end, can push a single specimen container 1500 out of, or further out of the receiver 1706.

An exemplary pneumatic or vacuum based pick and/or place head and operation of the same is described in U.S. patent application 63/135,886, filed Jan. 13, 2021.

Figure 17B:
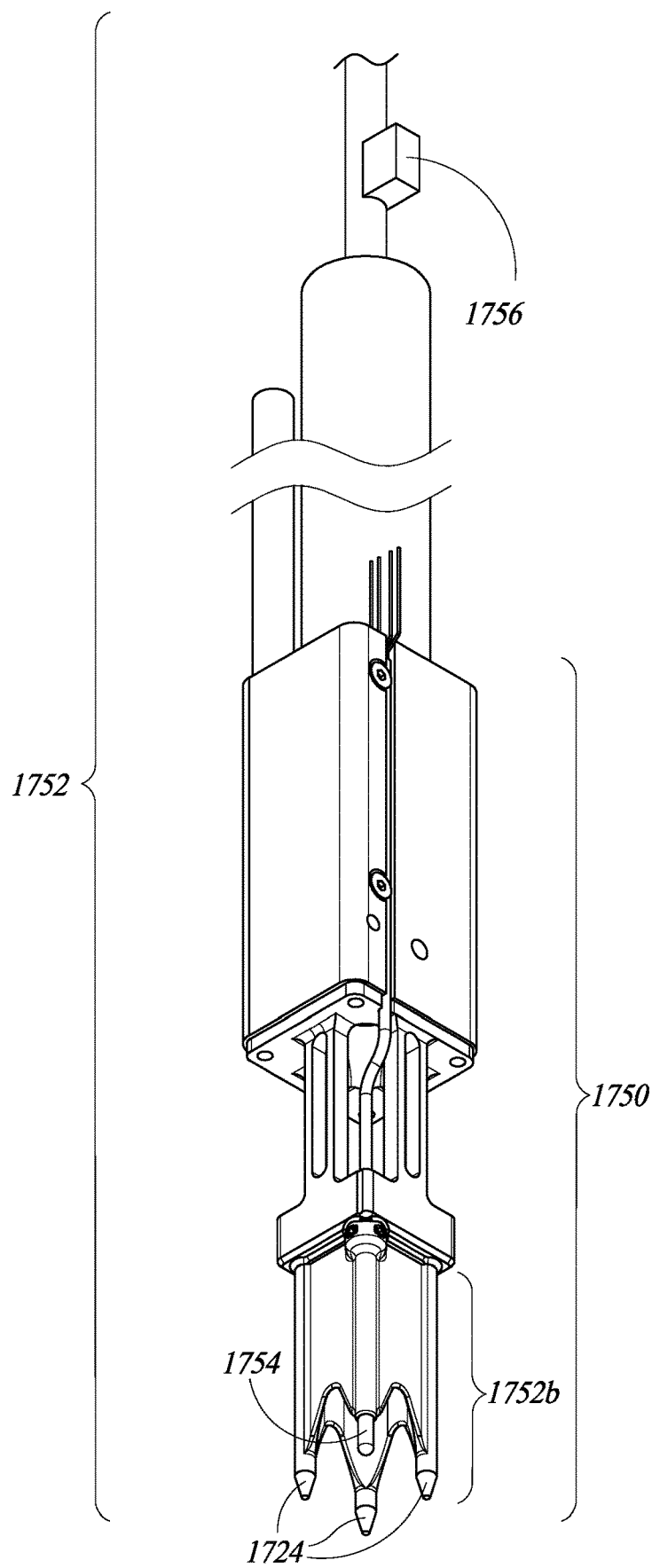
FIG. 17B is an isometric view of a distal portion of a receiver of a pick and/or place head, according to at least one illustrated implementation, better illustrating a temperature sensor probe at a distal end thereof.

FIG. 17B shows a distal portion of a receiver 1750 of a pick and/or place head 1752, according to at least one illustrated implementation, better illustrating a temperature probe 1754 at a distal end thereof. The pick and/or place head can take the form of a mechanical pick and/or place head 1600 (FIG. 16) or a pneumatic or vacuum-based pick and/or place head 1700 (FIG. 17A).

As illustrated in FIG. 17B, one or more temperature probes 1754 (only one shown in FIG. 17B) can be carried by the receiver 1750, for example mounted on or mounted in, or otherwise carried by, or extending distally from, a distal portion 1750*b* of the receiver 1750. For instance, one or more temperature probes 1754 can extend distally from the distal portion 1750*b* in place of one or more of the feet or standoffs 1724 or in the form of one or more of the feet or standoffs 1724. Such can advantageously position the temperature probes 1754 to sense a temperature of the distal portion 1750*b* itself and/or sense a temperature of a reservoir or bath (e.g., main or primary reservoir 116, first secondary reservoir 300*a*, second secondary reservoir 302*a*) into which the temperature probe(s) 1754 may be placed, for example during cooling (e.g., pre-cooling) of the distal portion 1754*b* and/or cooling or replenishment of the specimen container 1500 with cryogenic liquid (e.g., $N_2$ in liquid form) and/or as part of a reservoir monitoring action to check a temperature and/or level or volume of cryogenic liquid in the secondary reservoir. The temperature probes 1754 can include one or more thermally conductive materials, and include or be thermally conductively coupled to one or more temperature transducers (e.g., thermocouples) which in turn can be communicatively coupled (e.g., wired, wirelessly) to processor or controller (e.g., microcontroller), the processor or controller monitoring a temperature and/or liquid levels of a reservoir (e.g., first secondary reservoir 300*a*, second secondary reservoir 302*a*) and/or monitoring a temperature of the temperature probes 1754 itself.

One or more position sensors 1756 (only shown in FIG. 17B) can be employed to determine a position (e.g., elevational position, vertical position, position along a Z-axis) of a portion of the temperature probe(s) 1754 relative to a portion (e.g., bottom or floor) of a reservoir (e.g., first secondary reservoir 300*a*, second secondary reservoir 302*a*). In some implementations, the position sensor(s) 1756 can determine a position the pick and/or place head 1752 or receiver 1750 relative to the reservoir, and hence determine a position of the temperature probe(s) 1754 relative to the receiver 1750, where there is a fixed spatial relationship between the relative to the temperature probe(s) 1754 and the pick and/or place head 1752 or receiver 1750. The position sensor(s) 1756 can take any of a large variety of forms, for example: a position encoder, a rotary encoder, a time-of-flight sensor, etc. Alternatively, a processor or microcontroller that controls movement of the receiver 1750 or the pick and/or place head 1752 can employ drive signals to, or feedback signals, from one or more actuators (e.g., solenoids, electric motors, pneumatic or hydraulic pistons) that provide an indication of expected or commanded position of the receiver 1750 or the pick and/or place head 1752 relative to the portion of the reservoir (e.g., bottom or floor), and hence a position of the temperature probe(s) 1754 carried by the receiver 1750 relative to the portion of the reservoir.

The processor or controller monitoring the temperature can also advantageously determine a level of liquid in a reservoir (e.g., first secondary reservoir 300*a*, second secondary reservoir 302*a*), for example based on a position of the temperature probe(s) 1754 relative to the reservoir when a sensed temperature abruptly changes from a temperature associated with a cryogenic fluid in gaseous form to a temperature associated with a cryogenic fluid in liquid form. The temperature at which phase or state transition occurs or at which the cryogenic fluid in liquid form can be set as a threshold temperature based on the particular cryogenic fluid being used and/or ambient pressure at which the reservoir is maintained. The ambient pressure can be set at a fixed value or can be sensed via one or more pressure sensors. Thus, the processor or controller can determine when a sensed temperature abruptly drops or when a sensed temperature falls below a threshold temperature, and determine a position (e.g., height) of the temperature probe(s) 1754 relative to, for instance a floor of a reservoir, when the sensed temperature abruptly drops or falls below the threshold temperature. A distance between the temperature probe(s) and the portion (e.g., floor) of the reservoir provides an indication of a level of cryogenic liquid in the reservoir. The processor or controller can optionally determine a volume of cryogenic liquid in the reservoir based on the level where the perimeter of the interior of the reservoir is defined by one or more equations.

Thus, the processor or controller can advantageously monitor temperature and level of cryogenic liquid in the reservoir, and optionally ambient pressure. The processor or controller can take various actions in response to various conditions. For example, the processor or controller can produce an alert if a sensed temperature in the reservoir is above a threshold temperature or even if the sensed temperature is approaching a threshold temperature. For example, the processor or controller can produce an alert if a sensed level of cryogenic liquid in the reservoir is at or below a threshold level or even if the sensed level of cryogenic liquid in the reservoir is approaching the threshold level. Also for example, the processor or controller can cause a cryogenic liquid supply system to supply cryogenic liquid supply system in the event of the sensed temperature in the reservoir is above or approaching a threshold temperature. Also for example, the processor or controller can cause a cryogenic liquid supply system to supply cryogenic liquid supply system in the event of a sensed level of cryogenic liquid in the reservoir is at or below a threshold level or even approaching the threshold level. The processor or controller can, for instance, provide signals to a solenoid, electric motor or other actuator to open and close one or more valves of a cryogenic liquid supply system.

FIG. 18 schematically shows a portion of a storage and retrieval system including a control system 1802, according to at least one illustrated implementation.

The control system 1802 which may be part of, or communicatively coupled to the mechanical pick and/or place head 1600 (FIG. 16) and/or the vacuum-based pick and/or place head 1700 (FIG. 17A), according to at least one illustrated implementation.

The control system 1802 may include one or more processors, for example one or more of: one or more microprocessors 1804, one or more digital signal processors (DSPs) 1806, one or more application specific integrated circuits (ASICs) and/or one or more field programmable gate array (FPGAs) operable to execute programmed logic. The control system 1802 may also include nontransitory processor-readable storage media, for example nonvolatile memory such as read only memory (ROM) and/or FLASH 1808 and/or volatile memory such as random access memory (RAM) 1810. The ROM/FLASH 1808 and RAM 1810 are communicatively coupled to the microprocessor 1814 via one or more communications channels, for example a power bus, instruction bus, address bus, command bus, etc. The microprocessor 1804 executes logic, for example logic stored in the nontransitory processor-readable media (e.g., ROM/FLASH 1806, RAM 1808) as one or more sets of processor-executable instructions and/or data.

The microprocessor 1804 may also be communicatively coupled to a communications radio 1812 and associated antenna 1814 and/or wired communications port 1816 to provide information and data to external systems and/or to receive instructions therefrom.

The control system 1802 may control a plumbing system 1821 including piping or other conduits and one or more valves to control a flow of cryogenic fluid from a cryogenic fluid source to one or more reservoirs and/or to allow sensing of conditions in the interior of the cryogenic tank or dewar. The plumbing system 1821 can, for example, take the form of the plumbing 200a, 200b, 200c, 200d illustrated in FIG. 2. The control system 1802 can, for example, control one or more primary reservoir valves 1820 to control a flow of cryogenic fluid to the main or primary reservoir 116 (FIG. 1B) of the cryogenic tank 102 via one or more conduits 1822 (also see FIG. 2). Also for example, the control system 1802 may control one or more first secondary reservoir valves 1824 to control a flow of cryogenic fluid to the first secondary reservoir 300a (FIG. 4), 608 (FIG. 6) of the wedged-shaped segment 600 of the rack assembly 124 via one or more conduits 1826. Also for example, the control system 1802 may control one or more second secondary reservoir valves 1828 to control a flow of cryogenic fluid to the second secondary reservoir 302a (FIG. 4), 610 (FIG. 6) of the wedged-shaped segment 600 of the rack assembly 124 via one or more conduits 1830. The control system 1802 may rely on one or more sensors (e.g., pressure sensor, level sensor, volume sensor, temperature sensor) to determine a level of cryogenic liquid in the respective reservoirs and logic to maintained the cryogenic liquid within a threshold of a defined volume or level in each of the reservoirs of cryogenic liquid. The control system 1802 can additionally control one or more motors or other actuators to align one of the secondary reservoirs 300a, 300b (FIG. 4) with a respective outlet port of one or more conduits 1826, 1830 in order to fill or refill or otherwise top up the secondary reservoirs with cryogenic liquid (e.g., liquid nitrogen).

The control system 1802 may include one or more sensors (e.g., mechanical encoders, optical encoders, magnetic encoders, electromagnetic induction encoders, rotary encoders, linear encoders, position encoders, level sensors, cameras, infrared transmitter and receiver pairs, Reed switches, Hall effect sensors, temperature sensors or thermocouples, humidity sensors, force sensors, pressure sensors, load cells, vibration sensors, flow rate or volume sensors).

For example, the control system 1802 may include one or more position sensors communicatively coupled with the processor(s) 1804, 1806. The position sensor(s) may be positioned and/or oriented to detect a position of the pick and/or place head 1600, 1700 (FIGS. 16 and 17), for example with respect to one or more specimen containers 1500 (FIG. 15). The position sensor(s) may be positioned and/or oriented to detect a position of the engagement with a single one of the specimen containers 1500. The position sensor(s) may be positioned and/or oriented to detect a position of the single one of the specimen containers 1500 with respect to the receiver or portion thereof. The processor(s) 1804, 1806 provide control signals based on positions detected by the position sensor(s), for example providing control signals to at least one actuator (e.g., translation motor) to translate the pick and/or place head 1600, 1700 (FIGS. 16, 17, or a portion thereof (e.g., drive shaft).

For example, the control system 1802 may include one or more orientation sensors communicatively coupled with the processor(s) 1804, 1806. The orientation sensor(s) may be positioned and/or oriented to detect an orientation of the single one of the specimen containers 1500 (FIG. 15) or a portion thereof (e.g., handle on cap) relative to a portion of the pick and/or place head 1600, 1700 (FIGS. 16 and 17), for example with respect to one or more specimen containers 1500. For instance the orientation sensor(s) may detect an orientation of the handle 1510 on cap 1504 with respect to the engagement head or lugs thereof. The processor(s) 1804, 1806 provides control signals based on positions detected by the orientation sensor(s), for example providing control signals to at least one actuator (e.g., rotation motor) to rotate a portion of the pick and/or place head 1600 (FIG. 16) or pick and/or place head 1700 (FIG. 17A), for instance to rotate a drive shaft 1608, 1708.

For example, the control system 1802 may include one or more frost detectors that detects frost build up on one or more portions of the system, the at least one frost detector communicatively coupled with the processor(s) 1804, 1806, wherein with the processor(s) 1804, 1806 provides control signals based at least in part on detected frost build up. The frost detectors can take a variety of forms, for example one or more frost sensors and/or one or more resistance sensor(s).

For example, the control system 1802 may include one or more optical sensors communicatively coupled with the processor(s) 1804, 1806. The optical sensor(s) may be positioned and/or oriented to detect the single one of the specimen containers 1500 (FIG. 15) or a portion thereof, and/or to detect or optically read information (e.g., one-dimensional or two-dimensional machine-readable symbols) carried by or on the single one of the specimen containers 1500. The optical sensor(s) may be positioned and/or oriented to detect the single one of the specimen containers 1500 or a portion thereof, and/or to image an interior of the single one of the specimen containers 1500 to determine or assess the contents thereof. The optical sensor(s) may take a variety of forms. For example, the optical sensor(s) may take the form of a linear or two-dimensional array of charged-coupled devices (CCDs), for use with imaging of a machine-readable symbol using ambient lighting or active lighting. Also for example, the optical sensor(s) may take the form of a photo-diode, for use with "flying spot" machine-readable symbol reader using active lighting in which a spot of light is moved across the machine-readable symbol. The information may include information that uniquely identifies the single one of the specimen containers 1500 or the contents thereof.

For example, the control system 1802 may include one or more wireless interrogators 1831 communicatively coupled with the processor(s) 1804, 1806. The wireless interrogator(s) 1831 may include one or more interrogation radios 1832 and one or more interrogation antennas 1834 communicatively coupled to the interrogation radios 1832. The wireless interrogator(s) 1831 may include one or more mixers, filters, amplifier analog-to-digital converters and/or other electrical and electronic components operable to cause transmission of interrogation signals and processing of return signals, for example components employed in RFID interrogators. One or more processors, for example the DSP 1806 may be communicatively coupled to the interrogation radio 1832, for example to control a transmitter section and to receive signals (e.g., I/Q signals) from a receiver section of the interrogation radio 1832. The DSP 1806 may perform preprocessing on the received signals (e.g., I/Q signals) to extract information (e.g., unique identifier) from the received signals, for example including a baseband filter to filter a baseband from the received signals.

The interrogation antenna(s) 1834 may be positioned and/or oriented to interrogate wireless transponders (e.g., radio frequency identification (RFID) transponders) carried by or on the single one of the specimen containers 1500 when the single one of the specimen containers 1500 is correctly positioned in the receiver 106, 1706, to wirelessly detect or read information encoded in the wireless transponder(s) carried by or on the single one of the specimen containers 1500. The information may include information that uniquely identifies the single one of the specimen containers 1500 or the contents thereof. The information may, for example, include any one or more of identification information (e.g., unique identifier for the specimen container 1500, the specimen, patient name or identifier and/or date of birth, clinic identifier, clinician identifier, procedure, times, dates).

Sensors may, for example, include one or more of contact switches, momentary switches, optical detectors for instance an infrared light emitting diode and sensor pair, range finder, time of flight camera.

The interrogation (e.g., an interrogation cycle) or optical reading may by automatic and autonomous triggered, for example in response to detection of the specimen container 1500 being in a certain position (e.g., fully inserted) in the receiver 106, 1706. Automatic and autonomously triggered interrogation and/or optical reading may improve overall information capture since such is triggered based on correct positioning of the antenna of the wireless transponder carried by the specimen container 1500 with respect to the interrogation antenna(s) 1834. The automatic and autonomous triggered optical capture of information from the specimen container 1500 may improve overall optical capture of information from the specimen container 1500 since such is triggered based on correct positioning of a portion of the specimen container 1500 bearing optically readable information with respect to the optical sensors.

The control system 1802 may include one or more actuators or transducers.

For example, the control system 1802 may include one or more electric motors (e.g., stepper motors) 1836a, 1836b, 1836c. The electric motors 1836a, 1836b, 1836c may, for example correspond to the translation motor, rotation, and other motors previously described. The control system 1802 may include one or more motor controllers 1838 communicatively coupled to receive control signals from the processor 1804, and communicatively coupled to provide signals to control the motors 1836a, 1836b, 1836c accordingly.

For example, the control system 1802 may include one or more vacuum subsystems 1840 (one shown). The vacuum subsystem 1840 may, for example, include a vacuum source, for instance a vacuum pump 1842 or a Venturi, which is operated to generate a negative pressure. The vacuum subsystem 1840 may, for example, include a reservoir 1844 fluidly communicatively coupled to the vacuum source (e.g., vacuum pump 1842) to maintain a low pressure reservoir of fluid (e.g., air) thereon. The vacuum subsystem 1840 may, for example, include one or more ports 1846 fluidly communicatively coupleable to the vacuum conduit of the pick and/or place head 1700 to induce a negative pressure or vacuum therein. The port(s) 1846 may include any of a large variety of mechanical couplers, for example threaded couplers, bayonet couplers, detents, etc., which may allow detachable physical coupling or even permanent physical coupling. The vacuum subsystem 1840 may, for example, include one or more values 1848 operable to control fluid communication between the reservoir 1844 and the port(s) 1846, for example either manually and/or in response to control signals provided by the processor 1804. The valves 1848 may take any of a large variety of forms commonly employed with control of fluid flow, and in particular gas flow.

For example, the control system 1802 may include one or more defrosters selectively operable to defrost or remove a frost build up, for example on a portion of the receiver, on a drive shaft and/or a portion of a single specimen container 1500. The defroster(s) may include one or more heat sources that is or are selectively operable to provide heat to at least one location in the system. The heat source(s) may take any of a large variety of forms, for instance electric-resistance radiant heat elements. The defroster(s) may include one or more blowers or fans, selectively operable to conductively circulate heat generated by the heat source(s) to one or more components on which frost has built up or on which frost is expected to buildup. The heat source(s) and/or blowers or fans may be communicatively coupled with the at least one processor 1804, for control thereby.

The control system 1802 may include a user interface (UI) 1852. The UI 1852 may include one or more user interface (UI) components, for example one or more switches, triggers, display screens (e.g., LCD display), lights (e.g., LEDs), speakers, microphones, haptic engines, graphical user interfaces (GUIs) with via a touch-sensitive display screen which displays user-selectable icons operable to allow input to the control system 1802 and/or output from the control system 1802. The UI components allow a user to control operation and/or optionally to receive information. For example, a user may press a button, key or trigger to cause operation of pick and/or place head 102, 1700.

While the above is described and illustrated with respect to automated operation including translating the pick and/or place head 1600, 1700 (FIGS. 16 and 17) along a rail 104a, in some implementations the pick and/or place head 1600, 1700 can take the form of an end of arm tool or end effector (not illustrated) mounted to, or part of, a robotic appendage, and the positioning and triggering may be fully automated (i.e., performed autonomously by a robot), for example as part of a pick and place operation in response to signals from the at least one processor-based control system.

While the above is described with respect to automatic or autonomous operation, in some implementations the interrogation device or system may allow manual operation of one or more aspects.

Figure 19:
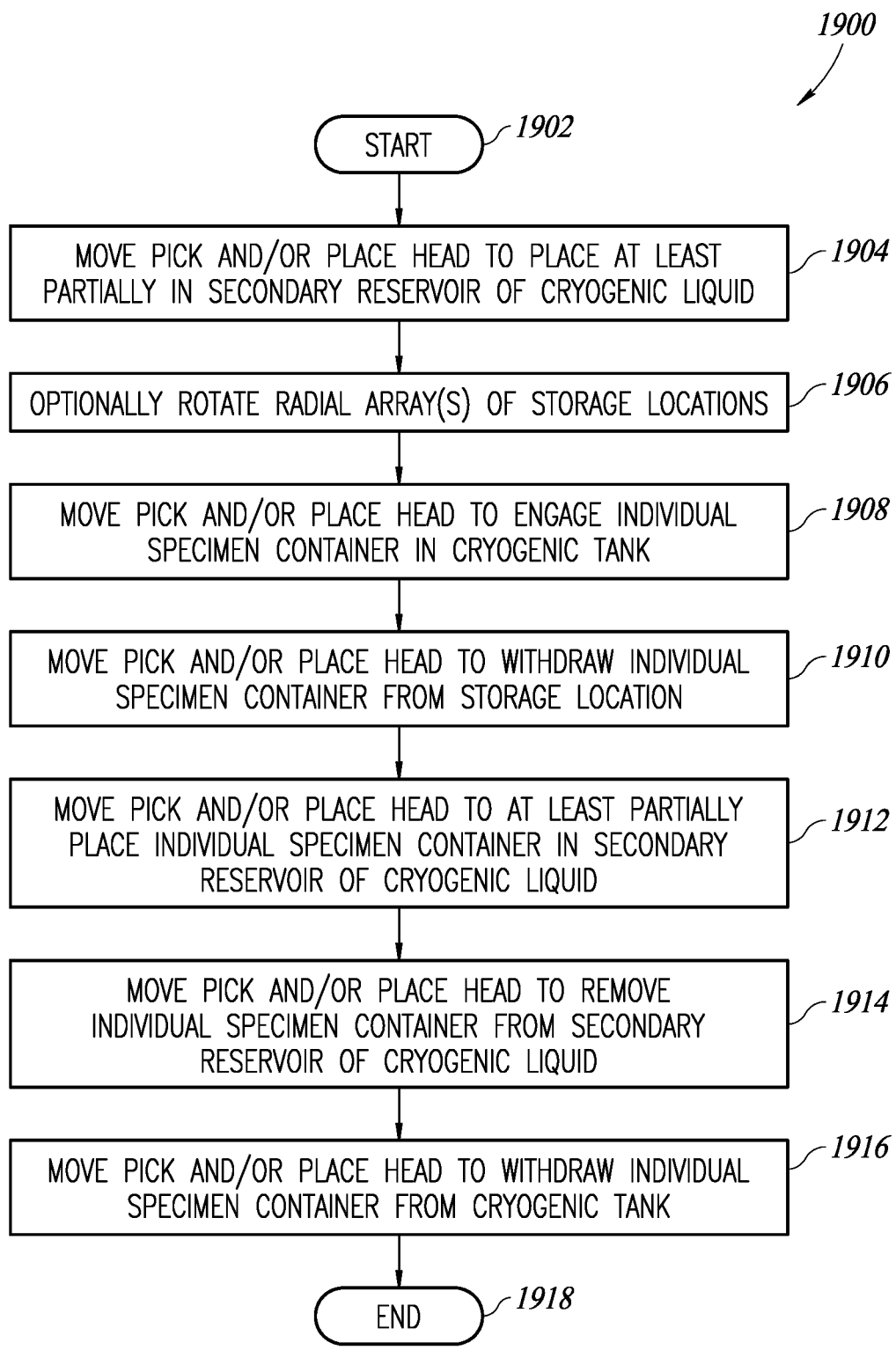
FIG. 19 is a flow diagram showing a method of operation of a pick and/or place system to pick or retrieve individual specimen containers from a storage location in a cryogenic environment, represented as a cryogenic tank, according to at least one illustrated implementation.

FIG. 19 shows a method 1900 of operation of a pick and/or place system to pick or retrieve individual specimen containers from a storage location in a cryogenic environment, represented as a cryogenic tank, according to at least one illustrated implementation.

The method 1900 starts at 1902, for example in response to a command or call to perform a pick or retrieval operation for a specific, individual, specimen container, for instance the specimen containers described elsewhere herein.

At 1904, a processor-based control system causes a pick and/or place head to move to place at least a portion of the pick and/or place head in a secondary reservoir of cryogenic liquid. The processor-based control system can, for example, provide control signals to one or more motor controllers to drive one or more electric motors. Such can advantageously cool the pick and/or place head before the pick and/or place head engages the specimen container. As described above, the secondary reservoir can be located in the cryogenic tank. Also as described above, there can be one or more pairs of secondary reservoirs, one secondary reservoir of the pair for cooling or "pre-cooling" the pick and/or place head and the secondary reservoir of the pair for recharging the individual specimen container with cryogenic liquid. Cooling the pick and/or place head prior to engaging a specimen container can advantageously limit or even prevent heat transfer from the pick and/or place head to the individual specimen container. Recharging the individual specimen container with cryogenic liquid can advantageously further cool the contents of the individual specimen container which typically was located in a gaseous environment, for example a cryogenic gaseous spaced above a cryogenic liquid in the cryogenic tank. While having pairs of secondary reservoir may be advantageous for maintaining temperature of each secondary reservoir, some implementations can use the same secondary reservoir for cooling or "pre-cooling" the pick and/or place head as recharging the specimen containers.

At 1906, the processor-based control system optionally causes a rotation or pivoting of one or more radial arrays of storage locations. The processor-based control system can, for example, provide control signals to one or more motor controllers to drive one or more electric motors. In some instances, an upper radial array of storage locations may be rotated or pivoted about a central axis to align a gap therein with an opening in the cryogenic tank in order to allow the pick and/or place head to access a lower radial array of storage locations. In some instances, an upper or a lower radial array of storage locations may be rotated or pivoted to align a particular storage location with the opening in the cryogenic tank in order to allow the pick and/or place head to access the particular storage location.

At 1908, the processor-based control system causes the pick and/or place head to move to engage an individual specimen container in cryogenic tank. The processor-based control system can, for example, provide control signals to one or more motor controllers to drive one or more electric motors. The pick and/or place head may physically engage a portion of the specimen container, for example lugs of the pick and/or place head can engage a handle or other feature of the pick and/or place head. Alternatively or additionally, pick and/or place head may apply a negative pressure or vacuum to engage the specimen container.

At 1910, the processor-based control system causes the pick and/or place head to move to withdraw individual specimen container from storage location. The processor-based control system can, for example, provide control signals to one or more motor controllers to drive one or more electric motors. The pick and/or place head can, for example, withdraw individual specimen container vertically from a storage location in a radial array of storage locations.

At 1912, the processor-based control system causes the pick and/or place head to move to at least partially place individual specimen container in secondary reservoir of cryogenic liquid. The processor-based control system can, for example, provide control signals to one or more motor controllers to drive one or more electric motors. The pick and/or place head can partially submerge the individual specimen container in secondary reservoir of cryogenic liquid below a level of a number of ports in the individual specimen container, typically for a time sufficient to allow ingress of liquid cryogenic fluid into the interior of the specimen container. The pick and/or place head ca ensure that an upper portion of the individual specimen container with a number of vents remains above a level of cryogenic liquid in the secondary reservoir.

At 1914, the processor-based control system causes the pick and/or place head to move to remove individual specimen container from secondary reservoir of cryogenic liquid.

The processor-based control system can, for example, provide control signals to one or more motor controllers to drive one or more electric motors.

At 1916, the processor-based control system causes the pick and/or place head to move to withdraw individual specimen container from cryogenic tank. The processor-based control system can, for example, provide control signals to one or more motor controllers to drive one or more electric motors.

The method 1900 ends at 1918, for example until invoked again.

Figure 20:
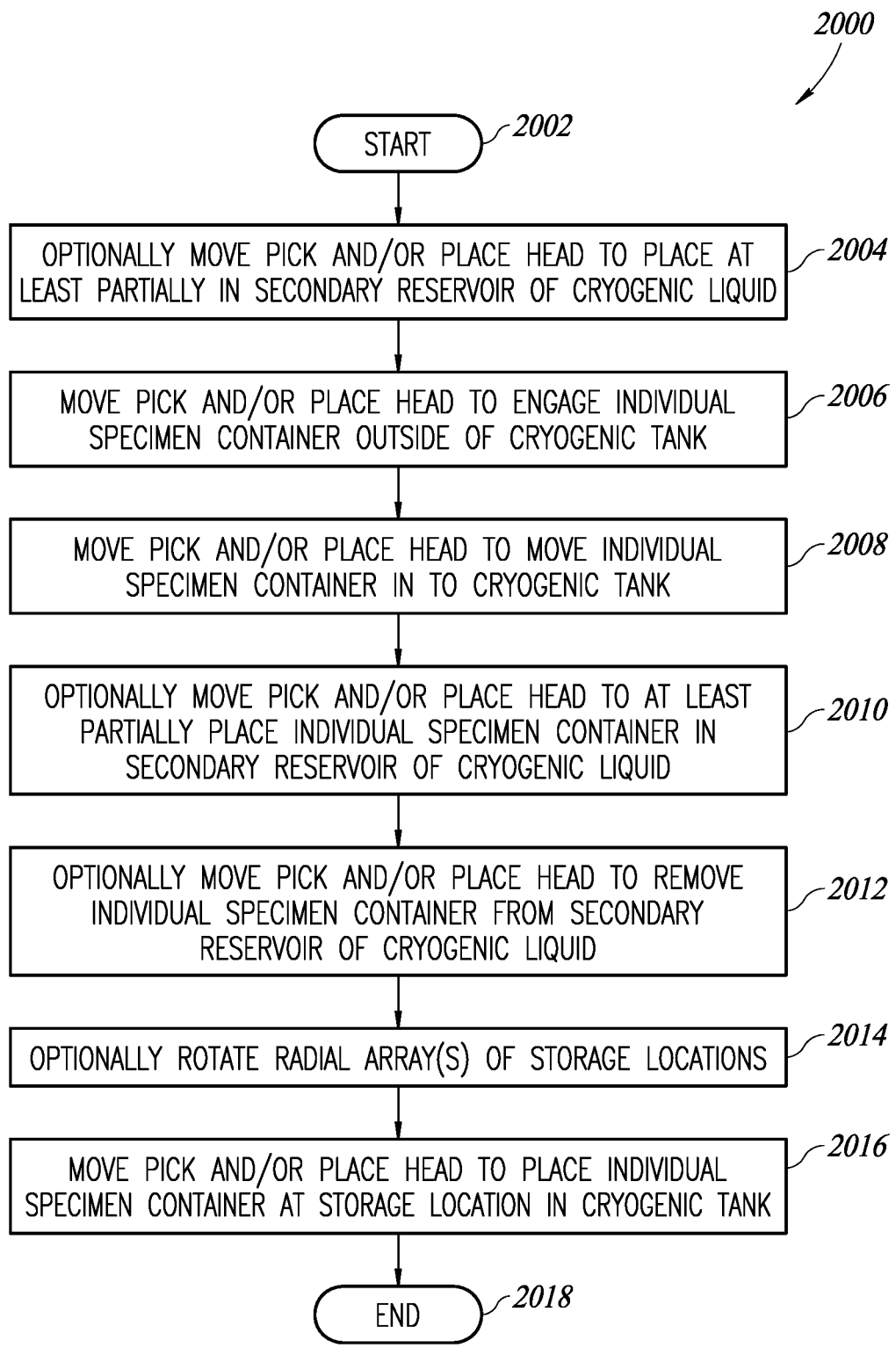
FIG. 20 is a flow diagram showing a method of operation of a pick and/or place system to place or store individual specimen containers to a storage location in a cryogenic environment, represented as a cryogenic tank, according to at least one illustrated implementation.

FIG. 20 shows a method 2000 of operation of a pick and/or place system to place or store individual specimen containers to a storage location in a cryogenic environment, represented as a cryogenic tank, according to at least one illustrated implementation.

The method 2000 starts at 2002, for example in response to a command or call to perform a pick or retrieval operation for a specific, individual, specimen container, for instance the specimen containers described elsewhere herein.

At 2004, a processor-based control system causes a pick and/or place head optionally to move to place at least partially in secondary reservoir of cryogenic liquid. The processor-based control system can, for example, provide control signals to one or more motor controllers to drive one or more electric motors. Such can advantageously cool the pick and/or place head before the pick and/or place head engages the specimen container. As described above, the secondary reservoir can be located in the cryogenic tank. Also as described above, there can be one or more pairs of secondary reservoirs, one secondary reservoir of the pair for cooling the pick and/or place head and the secondary reservoir of the pair for recharging the individual specimen container with cryogenic liquid. Cooling the pick and/or place head prior to engaging a specimen container can advantageously limit or even prevent heat transfer from the pick and/or place head to the individual specimen container. Recharging the individual specimen container with cryogenic liquid can advantageously further cool the contents of the individual specimen container which typically was located in a gaseous environment, for example a cryogenic gaseous spaced above a cryogenic liquid in the cryogenic tank. While having pairs of secondary reservoir may be advantageous for maintaining temperature of each secondary reservoir, some implementations can use the same secondary reservoir for cooling the pick and/or place head as recharging the specimen containers.

At 2006, the processor-based control system optionally causes the pick and/or place head to move to engage individual specimen container outside of cryogenic tank. The processor-based control system can, for example, provide control signals to one or more motor controllers to drive one or more electric motors. The pick and/or place head may physically engage a portion of the specimen container, for example lugs of the pick and/or place head can engage a handle or other feature of the pick and/or place head. Alternatively or additionally, pick and/or place head may apply a negative pressure or vacuum to engage the specimen container.

At 2008, the processor-based control system optionally causes the pick and/or place head to move to move individual specimen container into cryogenic tank. The processor-based control system can, for example, provide control signals to one or more motor controllers to drive one or more electric motors.

At 2010, the processor-based control system optionally causes the pick and/or place head to move to at least partially place individual specimen container in secondary reservoir of cryogenic liquid. The processor-based control system can, for example, provide control signals to one or more motor controllers to drive one or more electric motors. The pick and/or place head can partially submerge the individual specimen container in secondary reservoir of cryogenic liquid below a level of a number of ports in the individual specimen container, typically for a time sufficient to allow ingress of liquid cryogenic fluid into the interior of the specimen container. The pick and/or place head ca ensure that an upper portion of the individual specimen container with a number of vents remains above a level of cryogenic liquid in the secondary reservoir.

At 2012, the processor-based control system optionally causes the pick and/or place head to move to remove individual specimen container from secondary reservoir of cryogenic liquid. The processor-based control system can, for example, provide control signals to one or more motor controllers to drive one or more electric motors.

At 2014, the processor-based control system optionally causes one or more radial array(s) of storage locations to rotate or pivot. The processor-based control system can, for example, provide control signals to one or more motor controllers to drive one or more electric motors. In some instances, an upper radial array of storage locations may be rotated or pivoted about a central axis to align a gap therein with an opening in the cryogenic tank in order to allow the pick and/or place head to access a lower radial array of storage locations. In some instances, an upper or a lower radial array of storage locations may be rotated or pivoted to align a particular storage location with the opening in the cryogenic tank in order to allow the pick and/or place head to access the particular storage location.

At 2016, the processor-based control system optionally causes the pick and/or place head to move to place individual specimen container at storage location in cryogenic tank. The processor-based control system can, for example, provide control signals to one or more motor controllers to drive one or more electric motors. The pick and/or place head can, for example, vertically insert the individual specimen container into a defined storage location in a radial array of storage locations.

The method 2000 ends at 2018, for example until invoked again.

Figure 21:
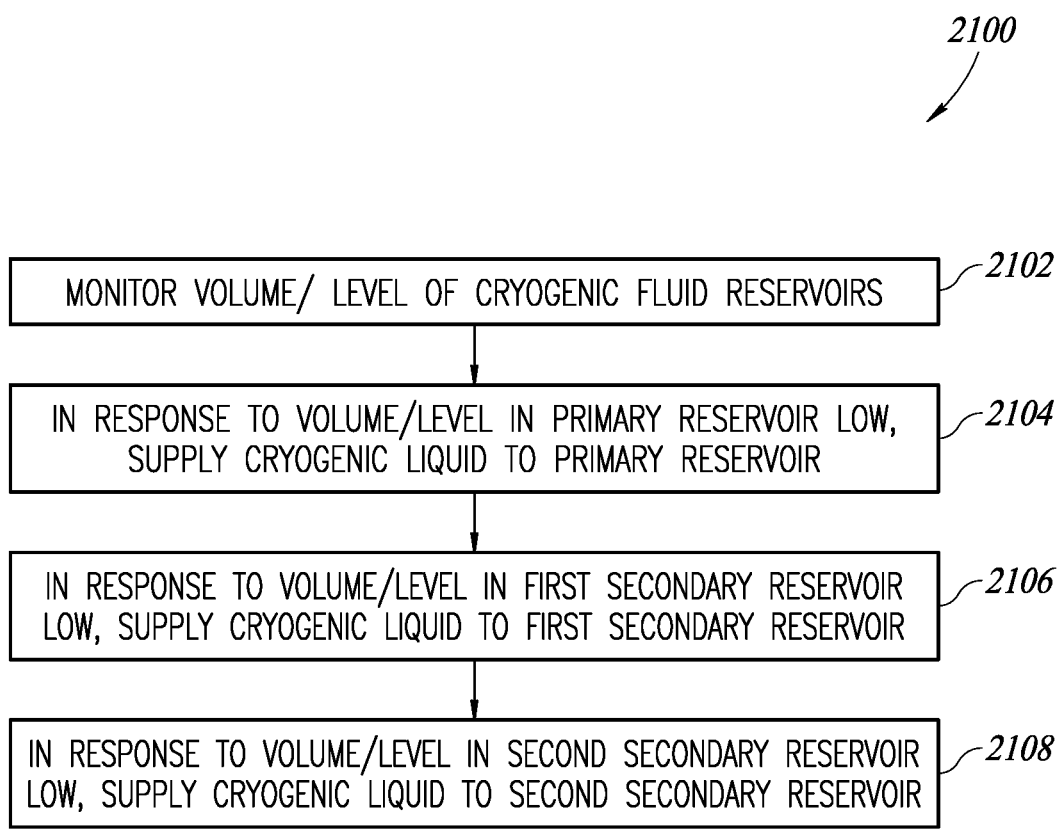
FIG. 21 is a flow diagram showing a method of operation of a pick and/or place system to place or store individual specimen containers to a storage location in a cryogenic environment, represented as a cryogenic tank, according to at least one illustrated implementation.

FIG. 21 shows a method 2100 of operation of a pick and/or place system to maintain cryogenic fluid volumes or levels in reservoirs, according to at least one illustrated implementation.

At 2102, a processor-based control system monitors a volume or level of cryogenic fluid in a main or primary reservoir of cryogenic fluid, monitors a volume or level of cryogenic fluid in a first secondary reservoir of cryogenic fluid, and monitors a volume or level of cryogenic fluid in a second secondary reservoir of cryogenic fluid.

At 2104, in response to a volume or level of cryogenic fluid in the main or primary reservoir of cryogenic fluid being below a defined threshold, the processor-based control system causes a supplying of cryogenic fluid in liquid form to the main reservoir. The processor-based control system can, for example, provide control signals to one or more actuators to open and/or close one or more valves of a plumbing system.

At 2106, in response to a volume or level of cryogenic fluid in the first secondary reservoir of cryogenic fluid being below a defined threshold, the processor-based control system causes a supplying of cryogenic fluid in liquid form directly to the first secondary reservoir, for example independently of supplying the cryogenic liquid to the main or primary reservoir. The processor-based control system can, for example, provide control signals to one or more actuators to open and/or close one or more valves of a plumbing system.

At 2108, in response to a volume or level of cryogenic fluid in the second secondary reservoir of cryogenic fluid being below a defined threshold, the processor-based control system causes a supplying cryogenic fluid in liquid form directly to the second secondary reservoir, for example independently of supplying the cryogenic liquid to the main or primary reservoir. The processor-based control system can, for example, provide control signals to one or more actuators to open and/or close one or more valves of a plumbing system.

Figure 22:
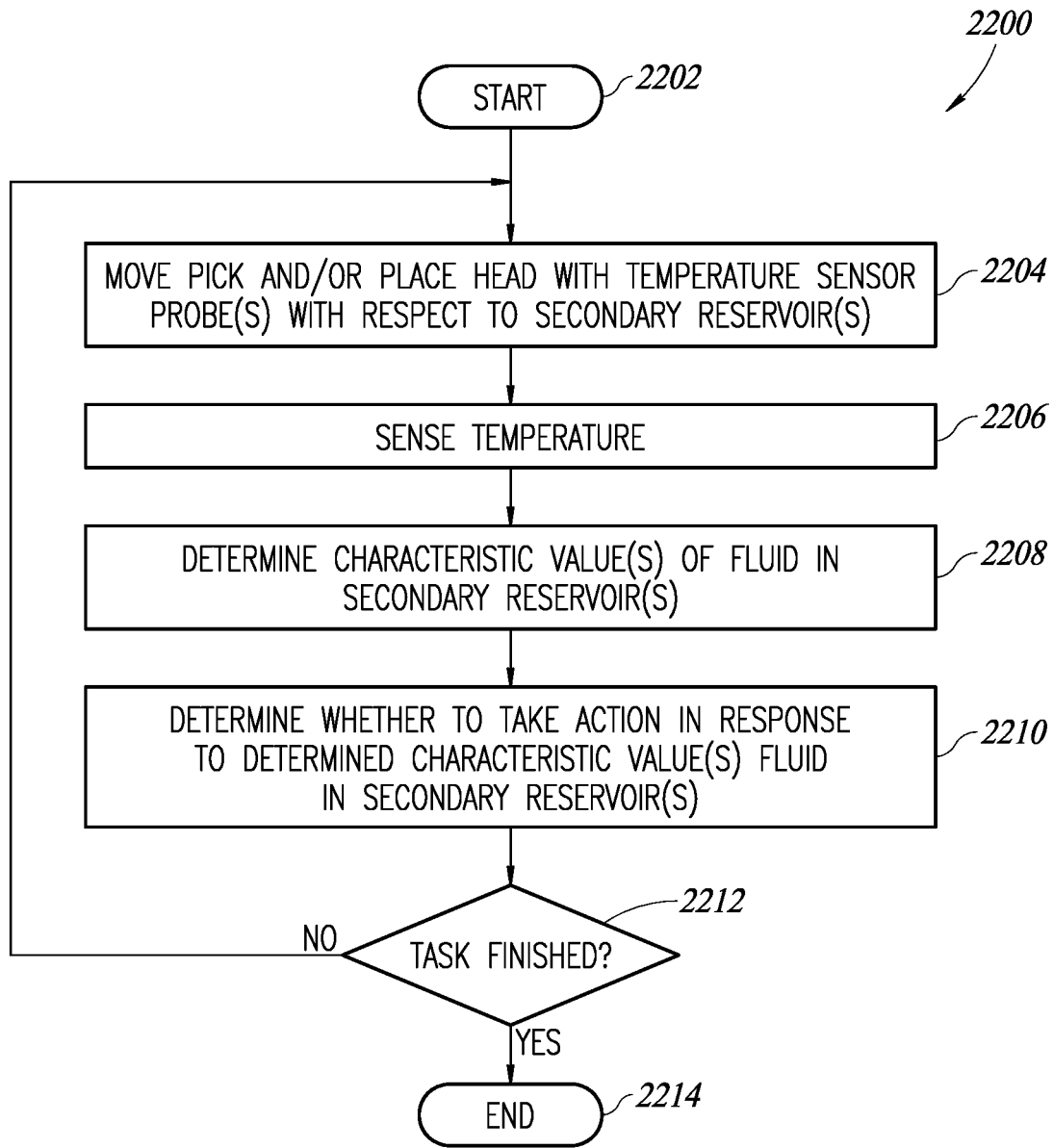
FIG. 22 is a flow diagram showing a method of operation of a pick and/or place system to monitor characteristic values of a cryogenic liquid in a secondary reservoir and take one or more optional actions based on the conditions in the secondary reservoir, according to at least one illustrated implementation.

FIG. 22 shows a method 2200 of operation of a pick and/or place system to monitor characteristic values of a cryogenic liquid in a secondary reservoir and take one or more optional actions based on the conditions in the secondary reservoir, according to at least one illustrated implementation. The method 2200 can be executed or performed as part of any of the methods 1900 (FIG. 19), 2000 (FIG. 20) and/or 2100 (FIG. 21), or alternatively performed independently thereof.

The method 2200 starts at 2202, for example, for example in response to a command or call to perform a pick or retrieval operation for a specific, individual, specimen container, for instance the specimen containers described elsewhere herein.

At 2204, at least one processor causes movement of pick and/or place head with one or more temperature sensors (e.g., thermocouple, temperature sensor probe). In particular, the processor(s) cause the pick and/or place head to move with respect to one of the secondary reservoirs. The pick and/or place head can be moved laterally (e.g., radially) to align with a position of the secondary reservoir, and/or the secondary reservoir can rotate or pivot to angularly align with an opening in the cryogenic tank through which the pick and/or place head will enter and exit the interior of the cryogenic tank. The at least one processor can, for example, provide drive signals to one or more actuators (e.g., solenoid, electric motor, piston, electromagnet) or motor controller to cause the desired movement (e.g., radially and vertically) of the pick and/or place head with one or more temperature sensors.

At 2206, a temperature sensor (e.g., thermocouple, temperature sensor probe) senses a temperature. Temperature sensing can be continuous or period, for example as the pick and/or place head moves, or even while the pick and/or place head is held in a stationary position (e.g., partially in the secondary reservoir). Circuitry can provide a signal indicative of (e.g., proportional to) the sensed temperature. In some implementations, a temperature transducer (e.g., thermocouple) may be located on the pick and/or place head so as to come into direct physical contact with cryogenic fluid in a reservoir (e.g., secondary reservoir). In other implementations, a temperature transducer (e.g., thermocouple) may be located on the pick and/or place head, or even remotely therefrom, so as to not come into direct physical contact with cryogenic fluid in a reservoir (e.g., secondary reservoir). In such implementations, a thermally conductive element or member (e.g., probe) is located on the pick and/or place head so as to come into direct physical contact with cryogenic fluid in a reservoir (e.g., secondary reservoir), and is thermally conductively coupled to the temperature transducer.

At 2208, at least one processor determines one or more characteristic value(s) of a fluid in secondary reservoir.

For example, the at least one processor can determine a temperature as sensed via the at least one temperature sensor or transducer.

Also for example, the at least one processor can determine a level or volume of cryogenic liquid in the at least one secondary reservoir.

To determine a level or volume of cryogenic liquid in the at least one secondary reservoir, the at least one processor can rely on the fact that in at least some instances a cryogenic fluid takes a liquid form when at or below a phase or state transition temperature, while taking a gaseous form when above the phase or state transition temperature. Thus, it is possible to discern the liquid phase or state from the gaseous phase or state based on a sensed temperature of a cryogenic fluid. Since the liquid phase or state typically is at a colder temperature than the gaseous or state, it may be preferable that the reservoir has at least a defined minimal amount of cryogenic fluid in the liquid phase or state.

The at least one processor can determine when an abrupt change in sensed temperature occurs (e.g., an abrupt decrease or increase in sensed temperature) which abrupt change is indicative of a temperature sensor transitioning (e.g., entering or exiting) between gaseous and liquid phases of the cryogenic fluid. Alternatively or additionally, the at least one processor can determine whether a sensed temperature is equal to or less than a characteristic temperature at which the cryogenic fluid is in a liquid form or phase. Alternatively or additionally, the at least one processor can determine whether a sensed temperature is equal to or greater than a characteristic temperature at which the cryogenic fluid is in a gaseous form or phase. Thus, at least one processor can employ a characteristic temperature (e.g., a phase or state transition temperature) at which a specific cryogenic fluid transitions phases or states between gaseous and liquid for instance at a given ambient pressure.

The at least one processor can determine a level or volume of cryogenic liquid in the at least one secondary reservoir based at least in part on a position (e.g., elevation, height, position along a vertical or Z-axis) of the pick and/or place head or position of the at least one temperature sensor when the temperature sensed via the at least one temperature sensor is first sensed to abruptly change or when first sensed to be at or below a temperature in which the fluid takes a liquid form or is otherwise subject to an abrupt change (e.g., decrease, increase) in temperature, or alternatively when first sensed to be at or above a temperature in which the fluid takes a gaseous form. Where a position (e.g., elevation, height, position along a vertical or Z-axis) of the pick and/or place head or the temperature sensor or probe above a floor of a reservoir is known, the at least one processor can determine a level of cryogenic fluid in the reservoir. Where the reservoir has known or fixed dimensions, the at least one processor can determine a volume of fluid in the reservoir based on the level.

At 2210, the at least one processor determines whether to take action in response to determined characteristic value(s) fluid in secondary reservoir, which in at least some implementations can also include determining which action or actions to take.

For example, the at least one processor can determine whether a temperature as sensed via the at least one temperature sensor is equal to or less than a defined minimum acceptable temperature (e.g., a characteristic temperature at which the cryogenic fluid takes a liquid form or is in a liquid phase), and determine to take one or more actions based on the outcome of that determination. For instance, the at least processor can determine to take one or more actions in response to a determination that the sensed temperature is not equal to or less than a defined minimum acceptable temperature. Alternatively or additionally, the at least processor can determine to take one or more actions in response to a determination that the sensed temperature is equal to or less than a defined minimum acceptable temperature.

Also for example, the at least one processor can determine whether a temperature as sensed via the at least one temperature sensor is approaching a defined minimum acceptable temperature (e.g., a characteristic temperature at which the cryogenic fluid takes a liquid form or is in a liquid phase), and determine to take one or more actions based on the outcome of that determination.

Also for example, the at least one processor can determine whether a determined level or volume of cryogenic liquid in a reservoir (e.g., secondary reservoir) is equal to a defined minimum acceptable level or volume or whether such is equal to or greater than the defined minimum acceptable level or volume. The minimum acceptable level or volume can represent a level or volume of cryogenic liquid that is specified for safe operation or compliant with specified standards for operation of the cryogenic system.

Also for example, the at least one processor can determine whether a determined level or volume of cryogenic liquid in a reservoir (e.g., secondary reservoir) is approaching a defined minimum acceptable level or volume, and determine to take one or more actions based on the outcome of that determination.

As noted above, the at least one processor can determine which action or actions to take in response to the determined characteristics value(s) of the cryogenic fluid in the reservoir (e.g., secondary reservoir). Example actions can include, for example generating or producing an alert in detection of an out of compliance or out of specification condition, recording an incident for instance an out of compliance or out of specification condition or even an in compliance or in specification condition, replenishment of cryogenic liquid to the reservoir, movement to locate the pick and/or place head in the reservoir for cooling such and/or movement to locate at least a portion of a container or vial held by the pick and/or place head into the reservoir for charging the container or vial with liquid cryogenic fluid for instance as part of a retrieval operation.

At 2210, least one processor determines whether a given task (e.g., picking container operation, placing container operation, pre-cooling pick and/or place head operation; recharging container with cryogenic fluid in liquid form operation) has been finished or completed. If the given task has not been finished or completed, control returns to 2204. If the given task has been finished or completed, control passes to 2214.

The method 2200 terminates at 2214, for example until invoked again. Alternatively, the method 2200 can continually repeat while the system is operating or powered ON, and can even operate as a process via a multi-threaded processor.

Figure 23:
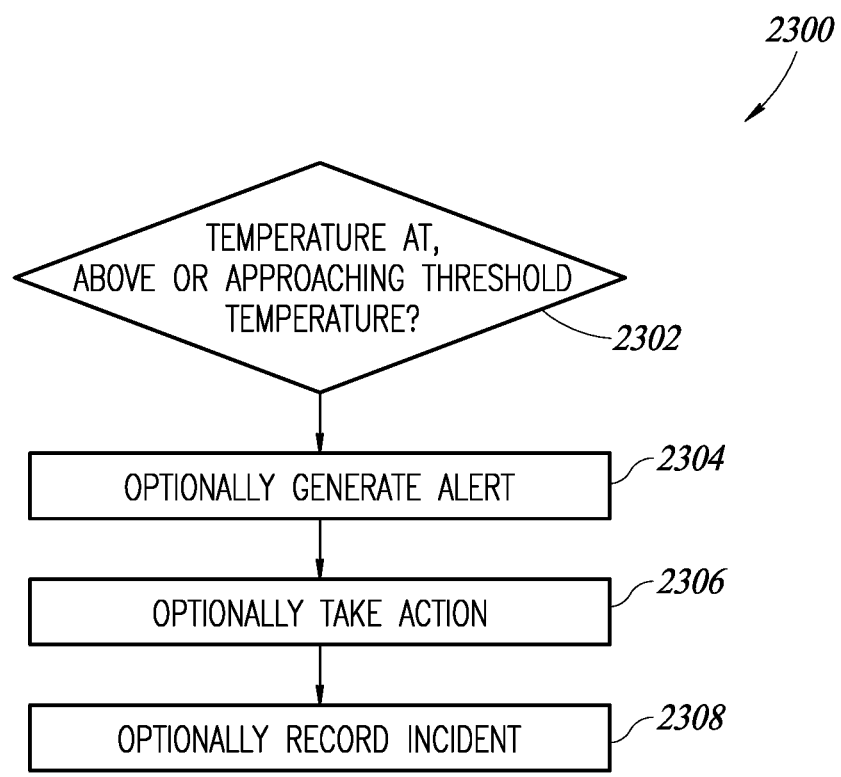
FIG. 23 is a flow diagram showing a method of operation of a pick and/or place system to monitor a temperature of a cryogenic liquid in a secondary reservoir and take one or more optional actions based on the conditions in the secondary reservoir, according to at least one illustrated implementation.

FIG. 23 shows a method 2300 of operation of a pick and/or place system to monitor a temperature of a cryogenic liquid in a secondary reservoir and take one or more optional actions based on the conditions in the secondary reservoir, according to at least one illustrated implementation. The method 2300 can, for example, be executed or performed as part of performing the method 2200 (FIG. 22).

At 2302, least one processor determines whether a sensed temperature in a reservoir (e.g., secondary reservoir) is at a threshold temperature, above a threshold temperature or approaching a threshold temperature. The threshold temperature can, for example, be a characteristic temperature at which a given cryogenic fluid transitions from a liquid phase or state to a gaseous phase or state, for instance at an ambient pressure to which the cryogenic fluid is exposed.

Optionally at 2304, the at least one processor generates or produces an alert. For example, the at least one processor generates or produces an alert in response to a determination that the sensed temperature in the reservoir (e.g., secondary reservoir) is one or more of: at, above or approaching the threshold temperature. Alternatively or additionally, the at least one processor generates or produces an indication of whether or not the sensed temperature is within a specified range, whether or not the sensed temperature in the reservoir (e.g., secondary reservoir) is one or more of: at, above or approaching the threshold temperature. For example, in response to a determination that the sensed temperature is not equal to nor less than the defined minimum acceptable temperature, the at least one processor can produce an alert indicative of the out of compliance condition.

Optionally at 2306, the at least one processor causes at least one action to be taken. For example, the at least one processor causes at least one action to be taken in response to a determination that the sensed temperature in the reservoir (e.g., secondary reservoir) is one or more of: at, above or approaching the threshold temperature. Alternatively or additionally, the at least one processor causes at least one action to be taken, whether or not the sensed temperature in the reservoir (e.g., secondary reservoir) is one or more of: at, above or approaching the threshold temperature. Actions can, for example include one or more of: replenishing the reservoir with cryogenic liquid to lower a temperature of the reservoir and/or to adjust a level of cryogenic liquid in the reservoir, picking a container from the cryogenic tank, placing a container in the cryogenic tank, pre-cooling the pick and/or place head by placing such at least partially in the secondary reservoir; recharging a container held by the pick and/or place head with cryogenic fluid in liquid form by placing such at least partially in the secondary reservoir). For example, in response to a determination that the sensed temperature is not equal to nor less than the defined minimum acceptable temperature, the at least one processor can cause a replenishing of the reservoir with a cryogenic liquid having a temperature that is equal to below the defined minimum acceptable temperature. Replenishing of the reservoir with a cryogenic liquid in liquid form can, for instance include supplying signals to operate valves, pumps, compressors, etc., to supply the cryogenic fluid in liquid form to the reservoir.

Optionally at 2308, the at least one processor generates or creates one or more records of an incident. For example, the at least one processor generates or creates one or more records of an incident in response to a determination that the sensed temperature in the reservoir (e.g., secondary reservoir) is one or more of: at, above or approaching the threshold temperature. Alternatively, the at least one processor generates or creates one or more records of an incident can generate or produce a record of a measurement without respect to whether or not the sensed temperature in the reservoir (e.g., secondary reservoir) is one or more of: at, above or approaching the threshold temperature.

The method 2300 can terminate, for example after a task (e.g., picking container operation, placing container operation, pre-cooling pick and/or place head operation; recharging container with cryogenic fluid in liquid form operation) is completed. Alternatively, the method 2300 can repeat, for example executing continually while the pick and/or place system is in operation.

Figure 24:
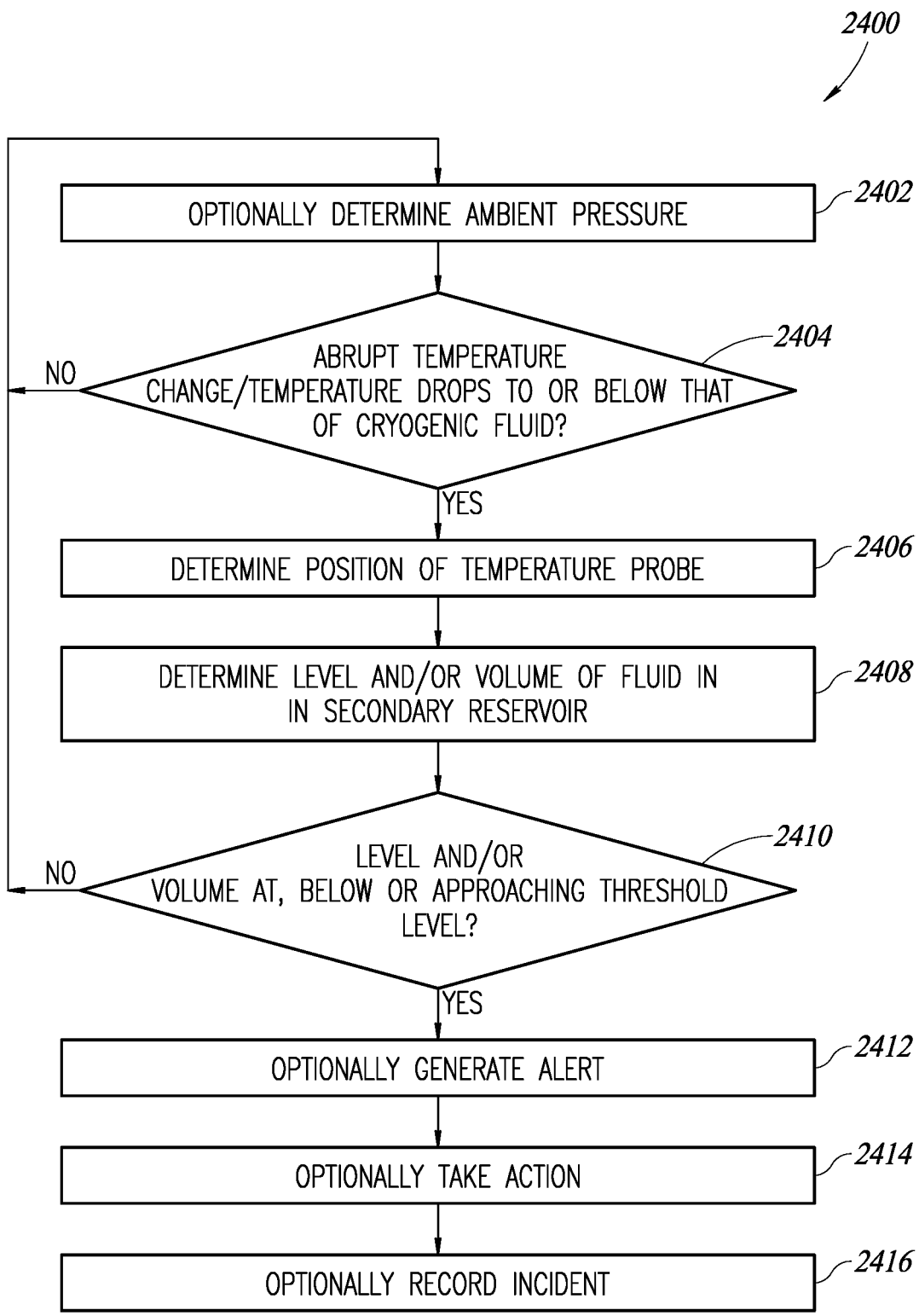
FIG. 24 is a flow diagram showing a method of operation of a pick and/or place system to monitor a level or volume of a cryogenic liquid in a secondary reservoir and take one or more optional actions based on the conditions in the secondary reservoir, according to at least one illustrated implementation.

FIG. 24 shows a method 2400 of operation of a pick and/or place system to monitor a level or volume of a cryogenic liquid in a secondary reservoir and take one or more optional actions based on the conditions in the secondary reservoir, according to at least one illustrated implementation. The method 2400 can, for example, be executed or performed as part of performing the method 2200 (FIG. 22). The method 2400 can, for example, be executed or performed in conjunction with performing the method 2300 (FIG. 23).

Optionally at 2402, the at least one processor determines an ambient pressure to which at least a reservoir (e.g. secondary reservoir) is subjected. The at least one processor can receive signals from one or more pressure transducers, the signals representative (e.g., proportional to) of a sensed ambient pressure. As will be understood by those skilled in the art, a volume of a fluid is typically a function of temperature, pressure and a constant that is associated with the particular fluid.

At 2404, the at least one processor monitors the sensed temperature. For example, the least one processor monitors for, or detects, an abrupt temperature change. Additionally or alternatively, the least one processor monitors for, or detects, if and/or when the sensed temperature drops to or below a characteristic temperature at which the cryogenic fluid transitions between a liquid state or phase and a gaseous state or phase. Additionally or alternatively, the least one processor monitors for, or detects, if and/or when the sensed temperature rises to or above a characteristic temperature at which the cryogenic fluid transitions between a liquid state or phase and a gaseous state or phase.

At 2406, the at least one processor determines a position of the temperature sensor, temperature probe, and/or pick and/or place head, for example in response to detection of the abrupt temperature change and/or a temperature dropping to or below the characteristic temperature or rising to or above the characteristic temperature. For instance, as the temperature sensor, temperature probe, and/or pick and/or place head enters a cryogenic liquid in a reservoir, that entry can be detected by an abrupt temperature change or a change to a temperate that is characteristic of a liquid phase or state for the given cryogenic fluid at a given ambient pressure. Also for instance, as the temperature sensor, temperature probe, and/or pick and/or place head exits a cryogenic liquid in a reservoir, that exiting can be detected by an abrupt temperature change or a change to a temperate that is characteristic of a gaseous phase or state for the given cryogenic fluid at a given ambient pressure. In either case, a position (e.g., elevation, height, vertical or Z-axis) of the temperature sensor, temperature probe, and/or pick and/or place head at the time of transition is representative of a level of cryogenic fluid in the reservoir.

At 2408, the at least one processor determines a level and/or a volume of cryogenic fluid in the reservoir (e.g., secondary reservoir). For example, the at least one processor can determines the level based on a position (e.g., elevation, height, vertical or Z-axis) of the temperature sensor, temperature probe, and/or pick and/or place head relative to a bottom or some other portion of the reservoir at the time of transition. Also for example, the at least one processor can determine the volume of cryogenic liquid in the reservoir based on the determined level and the knowledge of a fixed geometric shape on an inner surface of the reservoir.

At 2410, the at least one processor determines whether the level and/or the volume of cryogenic liquid in the reservoir is at, below and/or approaching a threshold level. The at least one processor can compare the level and/or the volume of cryogenic liquid with a threshold level and/or threshold volume. In response to a determination that the level and/or the volume of cryogenic liquid in the reservoir is not at, below and/or approaching a threshold level, control returns to 2402, and the at least one processor continues monitoring the reservoir. In response to a determination that the level and/or the volume of cryogenic liquid in the reservoir is at, below and/or approaching a threshold level, control passes to 2412.

Optionally at 2412, the at least one processor generates or produces an alert. For example, the at least one processor generates or produces an alert in response to a determination that the sensed temperature in the reservoir (e.g., secondary reservoir) is one or more of: at, above or approaching the threshold temperature. Alternatively or additionally, the at least one processor generates or produces an indication of whether or not the sensed temperature is within a specified range, or whether or not the sensed temperature in the reservoir (e.g., secondary reservoir) is one or more of: at, above or approaching the threshold temperature. For example, in response to a determination that a determined level or volume of cryogenic liquid in the reservoir (e.g., secondary reservoir) is not equal to, or not equal to nor greater than, a defined minimum acceptable level or volume, the at least one processor can produce an alert indicative of the out of compliance or out of specification condition.

Optionally at 2414, the at least one processor can take one or more actions and/or or cause at least one action to occur. For example, the at least one processor causes at least one action to be taken in response to a determined level or volume of cryogenic liquid in the reservoir (e.g., secondary reservoir) not being equal to, or not being equal to nor greater than, a defined minimum acceptable level or volume. Alternatively or additionally, the at least one processor causes at least one action to be taken, whether or not the determined level or volume of cryogenic liquid in the reservoir (e.g., secondary reservoir) is equal to or greater than, a defined minimum acceptable level or volume.

Actions can, for example, include replenishing the reservoir with cryogenic liquid to adjust a level of cryogenic liquid in the reservoir wherein a determined level or volume of cryogenic liquid in the reservoir (e.g., secondary reservoir) is not equal to, or not equal to nor greater than, a defined minimum acceptable level or volume. For example, in response to a determination a determined level or volume of cryogenic liquid in the reservoir (e.g., secondary reservoir) is not equal, or not equal to or greater than, a defined minimum acceptable level or volume, the at least one processor can cause a replenishing the reservoir with a cryogenic liquid in liquid form. Replenishing of the reservoir with a cryogenic liquid in liquid form can, for instance include supplying signals to operate valves, pumps, compressors, etc., to supply the cryogenic fluid in liquid form to the reservoir.

In some implementations, the at least one processor can determine that a level or volume of cryogenic liquid in the reservoir (e.g., secondary reservoir) is greater than a defined maximum acceptable level or volume, and take appropriate action, for instance draining some cryogenic liquid from the reservoir.

Other actions can, for example, include one or more of: picking a container from the cryogenic tank, placing a container in the cryogenic tank, pre-cooling the pick and/or place head by placing such at least partially in the secondary reservoir; recharging a container held by the pick and/or place head with cryogenic fluid in liquid form by placing such at least partially in the secondary reservoir), for example when the determined level or volume of cryogenic liquid in the reservoir is determined to be an adequate amount (e.g., equal to or greater than the defined minimum acceptable level or volume) for pre-cooling or recharging.

Optionally at 2416, the at least one processor generates or creates one or more records of an incident. For example, the at least one processor generates or creates one or more records of an incident in response to a determination that the determined level or volume of cryogenic liquid in the reservoir (e.g., secondary reservoir) is one or more of: at, below or approaching the defined minimum acceptable level or volume. Alternatively, the at least one processor generates or creates one or more records without respect to whether or not the determined level or volume of cryogenic liquid in the reservoir (e.g., secondary reservoir) is one or more of: at, below or approaching the defined minimum acceptable level or volume.

For example, the action(s) can include moving a pick and/or place head to position at least a portion of the pick and/or place head into at least one secondary reservoir, below a level of the cryogenic liquid in the at least one secondary reservoir to cool or pre-cool the pick and/or place head, for instance just prior to a pick or a place operation. The action(s) can, for example, include leaving a portion of the pick and/or place head in the at least one secondary reservoir below the level of the cryogenic liquid in the at least one secondary reservoir until a temperature of the pick and/or place head is at or below the defined minimum acceptable temperature; and subsequent to the temperature of the pick and/or place head being at or below the defined minimum acceptable temperature, moving the pick and/or place head from the at least one secondary reservoir.

For example, the action(s) can include moving the pick and/or place head to position at least a portion of a specimen container held by the pick and/or place head into the at least one secondary reservoir below a level of the cryogenic liquid in the at least one secondary reservoir; leaving the at least a portion of specimen container held by the pick and/or place head in the at least one secondary reservoir below the level of the cryogenic liquid in the at least one secondary reservoir until the specimen container is charged or recharged with cryogenic liquid from the at least one secondary reservoir; and subsequent to the specimen container being charged or recharged with cryogenic liquid from the at least one secondary reservoir, moving the pick and/or place head to remove the at least a portion of the specimen container from the at least one secondary reservoir.

Optionally at 2416, the at least one processor can record or generate a record of an incident for instance an out of compliance or out of specification condition or even an in compliance or in specification condition. In some implementations, the at least one processor can record an in compliance or in specification condition.

The method 2400 can terminates, for example until invoked again. Alternatively, the method 2400 can continually repeat while the system is operating or powered ON or while the pick and/or place system is operating.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification, including: U.S. Application Ser. No. 63/087,000; U.S. application Ser. No. 16/593,062, now published as US2020-0107541; U.S. Application Ser. No. 62/927,566; U.S. Application Ser. No. 62/936,133; U.S. Application Ser. No. 63/026,526; U.S. application Ser. No. 29/748,815; International (PCT) Application Serial No. PCT/US2019/054722; U.S. application Ser. No. 17/082,359; U.S. application Ser. No. 17/083,179; U.S. Application Ser. No. 63/082,789; U.S. Application Ser. No. 63/106,533; U.S. Application Ser. No. 63/136,886; and U.S. Application Ser. No. 63/253,856, are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A system to store and/or retrieve specimen containers, the system comprising:
a first secondary reservoir that holds a cryogenic fluid in liquid form, the first secondary reservoir located in a cryogenic storage tank and spaced relatively above an upper level of a cryogenic liquid of a main reservoir of the cryogenic liquid of the cryogenic storage tank;
a pick and/or place head;
at least one motor drivingly coupled to move the pick and/or place head;
a control system controlling coupled to the at least one motor and operable to:
cause the pick and/or place head to engage at least one of the specimen containers that is stored in the cryogenic storage tank;
move the pick and/or place head to place the at least one of the specimen containers at least partially in the first secondary reservoir of the cryogenic fluid in liquid form after the pick and/or place head engages the at least one of the specimen containers that is stored in the cryogenic storage tank;
move the pick and/or place head to remove the at least one of the specimen containers from the first secondary reservoir of the cryogenic fluid in liquid form; and
move the pick and/or place head to remove the at least one of the specimen containers from the cryogenic storage tank after moving the pick and/or place head to remove the at least one of the specimen containers from the first secondary reservoir of the cryogenic fluid in liquid form as part of a retrieval task.

2. The system of claim 1 wherein the control system is further operable to:
move the pick and/or place head to retrieve the at least one of the specimen containers from a defined storage location in the cryogenic storage tank, the defined storage location spaced relatively above the upper level of the cryogenic liquid of the main reservoir of the cryogenic liquid of the cryogenic storage tank before the control system moves the pick and/or place head to place the at least one of the specimen containers at least partially in a first secondary reservoir of a cryogenic fluid in liquid form.

3. The system of claim 2 wherein the control system is further operable to:
rotate a radial array of storage locations to pivot about a central axis to permit the pick and/or place head to physically access the defined storage location at which the at least one of the specimen containers is stored before the control system moves the pick and/or place head to place the at least one of the specimen containers at least partially in a first secondary reservoir of a cryogenic fluid in liquid form.

4. The system of claim 1 wherein the main reservoir has a maximum cryogenic liquid storage volume and the first secondary reservoir has a maximum cryogenic liquid storage volume, the maximum cryogenic liquid storage volume of the first secondary reservoir being less than half of the maximum cryogenic liquid storage volume of the main reservoir.

5. The system of claim 1 wherein the pick and/or place head is operable to engage a single one of the specimen containers at a time.

6. The system of claim 1, further comprising:
the cryogenic tank.

7. A system to store and/or retrieve specimen containers, the system comprising:
a first secondary reservoir that holds a cryogenic fluid in liquid form, the first secondary reservoir located in a cryogenic storage tank and spaced relatively above an upper level of a cryogenic liquid of a main reservoir of the cryogenic liquid of the cryogenic storage tank;

a pick and/or place head;
at least one motor drivingly coupled to move the pick and/or place head;
a control system controlling coupled to the at least one motor and operable to:
cause the pick and/or place head to engage at least one of the specimen containers that is to be stored in the cryogenic storage tank;
move the pick and/or place head to place the at least one of the specimen containers at least partially in the first secondary reservoir of the cryogenic fluid in liquid form in the cryogenic storage tank after the pick and/or place head engages the at least one of the specimen containers that is to be stored in the cryogenic storage tank;
move the pick and/or place head to remove the at least one of the specimen containers from the first secondary reservoir of the cryogenic fluid in liquid form; and
move the pick and/or place head to place the at least one of the specimen containers in a defined storage location in the cryogenic storage tank after moving the pick and/or place head to remove the at least one of the specimen containers from the first secondary reservoir of the cryogenic fluid in liquid form as part of a storage task.

8. The system of claim 7, further comprising:
a radial array of storage locations spaced above the upper level of the cryogenic liquid of the main reservoir of the cryogenic liquid of the cryogenic storage tank and arrayed and pivotal about a central axis, wherein the radial array of storage locations includes a first group of one or more sets of storage locations, the sets of storage locations of the first group arranged in respective wedge-shaped segments that reside at a first level in the cryogenic storage tank and wherein the radial array of storage locations includes a second group of one or more sets of storage locations, the sets of storage locations of the second group arranged in respective in wedge-shaped segments which reside at a second level in the cryogenic storage tank, the second level below the first level, and at least one gap exists between two successively angularly adjacent ones of the sets of storage locations of the first group of storage locations, the gap sized to provide a pick and/or place head access therethrough to the second group of storage locations; and
at least one motor drivingly coupled to cause the radial array of storage locations to pivot about the central axis.

9. The system of claim 8 wherein to move the pick and/or place head to place the at least one of the specimen containers in a defined storage location in the cryogenic storage tank the control system causes the pick and/or place head to move to place a single one of the specimen containers in a defined storage location in the radial array of storage locations.

10. The system of claim 8 wherein each of the first group of one or more sets of storage locations respectively includes an upper rack and a lower rack, the upper rack having a plurality of throughholes extending therethrough and the lower rack having a plurality of throughholes extending therethrough, the throughholes of the lower rack each aligned with a respective one of the throughholes of the upper rack, the throughholes sized to receive a portion of the specimen containers therein.

11. The system of claim 10 wherein each of the second group of one or more sets of storage locations respectively includes an upper rack and a lower rack, the upper rack having a plurality of throughholes extending therethrough and the lower rack having a plurality of throughholes extending therethrough, the throughholes of the lower rack each aligned with a respective one of the throughholes of the upper rack, the throughholes sized to receive a portion of the specimen containers therein.

12. A system of claim 8 to store and/or retrieve specimen containers, the system comprising:
a first secondary reservoir that holds a cryogenic fluid in liquid form, the first secondary reservoir located in a cryogenic storage tank and spaced relatively above an upper level of a cryogenic liquid of a main reservoir of the cryogenic liquid of the cryogenic storage tank;
a pick and/or place head;
at least one motor drivingly coupled to move the pick and/or place head;
a control system controlling coupled to the at least one motor and operable to:
cause the pick and/or place head to engage at least one of the specimen containers that is stored in the cryogenic storage tank;
move the pick and/or place head to place the at least one of the specimen containers at least partially in the first secondary reservoir of the cryogenic fluid in liquid form after the pick and/or place head engages the at least one of the specimen containers that is stored in the cryogenic storage tank;
move the pick and/or place head to remove the at least one of the specimen containers from the first secondary reservoir of the cryogenic fluid in liquid form; and
wherein the first secondary reservoir is carried by at least one of an upper rack or a lower rack of at least one of the sets of storage locations.

13. The system of claim 12 wherein the first secondary reservoir is spaced radially inward from the storage locations of at least one of the sets of storage locations.

14. A system to store and/or retrieve specimen containers, the system comprising:
a first secondary reservoir of a cryogenic fluid in liquid form, the first secondary reservoir located in a cryogenic storage tank and spaced relatively above an upper level of a cryogenic liquid of a main reservoir of the cryogenic liquid of the cryogenic storage tank;
a pick and/or place head;
at least one motor drivingly coupled to move the pick and/or place head;
a control system controlling coupled to the at least one motor and operable to:
cause the pick and/or place head to engage at least one of the specimen containers;
move the pick and/or place head to place the at least one of the specimen containers at least partially in the first secondary reservoir of the cryogenic fluid in liquid form;
move the pick and/or place head to remove the at least one of the specimen containers from the first secondary reservoir of the cryogenic fluid in liquid form; and
a first secondary supply line that supplies the cryogenic fluid in liquid form directly to the first secondary reservoir, independently of the cryogenic liquid to the main reservoir.

15. The system of claim 14 wherein the system includes a plurality of first secondary reservoirs radially arrayed for rotation about an axis, and wherein:
the first secondary supply line has an outlet positioned to supply the cryogenic fluid in liquid form directly to each of the first secondary reservoirs of the plurality of the first secondary reservoirs at respective times when each of the first secondary reservoirs of the plurality of the first secondary reservoirs is successively aligned with the outlet as the plurality of the first secondary reservoirs is rotated about the axis.

16. A system to store and/or retrieve specimen containers, the system comprising:
a first secondary reservoir of a cryogenic fluid in liquid form, the first secondary reservoir located in a cryogenic storage tank and spaced relatively above an upper level of a cryogenic liquid of a main reservoir of the cryogenic liquid of the cryogenic storage tank;
a pick and/or place head;
at least one motor drivingly coupled to move the pick and/or place head;
a control system controlling coupled to the at least one motor and operable to:
cause the pick and/or place head to engage at least one of the specimen containers;
move the pick and/or place head to place the at least one of the specimen containers at least partially in the first secondary reservoir of the cryogenic fluid in liquid form;
move the pick and/or place head to remove the at least one of the specimen containers from the first secondary reservoir of the cryogenic fluid in liquid form; and
a second secondary reservoir of a cryogenic fluid in liquid form, the second secondary reservoir located in the cryogenic storage tank and spaced relatively above the upper level of the cryogenic liquid of the main reservoir of the cryogenic liquid of the cryogenic storage tank.

17. The system of claim 16 wherein the control system is further operable to:
before causing the pick and/or place head to engage at least one of the specimen containers with a pick and/or place head, move the pick and/or place head to place at least a portion of the pick and/or place head at least partially in the second secondary reservoir of the cryogenic fluid in liquid form as part of either a storage or a retrieval task while the pick and/or place head is not engaged with any of the specimen containers to pre-cool the pick and/or place head before engaging the at least one of the specimen containers.

18. The system of claim 17 wherein the control system is further operable to:
move the pick and/or place head to remove the pick and/or place head from the cryogenic storage tank and to position to the pick and/or place head to engage at least one of the specimen containers as part of the storage task, after moving the pick and/or place head to remove the at least one of the specimen containers from the first secondary reservoir of the cryogenic fluid in liquid form and before engaging at least one of the specimen containers with a pick and/or place head.

19. The system of claim 16 wherein the system includes a plurality of first secondary reservoirs radially arrayed for rotation about an axis and a plurality of second secondary reservoirs radially arrayed for rotation about the axis, and further comprising:
a first secondary supply line that has an outlet positioned to supply the cryogenic fluid in liquid form directly to each of the first secondary reservoirs of the plurality of the first secondary reservoirs at respective times when each of the first secondary reservoirs of the plurality of the first secondary reservoirs is successively aligned with the outlet as the plurality of the first secondary reservoirs is rotated about the axis and to supply the cryogenic fluid in liquid form directly to each of the second secondary reservoirs of the plurality of the second secondary reservoirs at respective times when each of the second secondary reservoirs of the plurality of the second secondary reservoirs is successively aligned with the outlet as the plurality of the second secondary reservoirs is rotated about the axis.

20. The system of claim 16, further comprising:
a first secondary supply line that supplies the cryogenic fluid in liquid form directly to the first secondary reservoir, independently of the cryogenic liquid to the main reservoir; and
a second secondary supply line that supplies the cryogenic fluid in liquid form directly to the second secondary reservoir, independently of the cryogenic liquid to the main reservoir.

21. The system of claim 16 wherein at least one of the first secondary reservoir or the second secondary reservoir are physically coupled to pivot with a radial array of storage locations.

22. A system to store and/or retrieve specimen containers, the system comprising:
a first secondary reservoir that holds a cryogenic fluid in liquid form, the first secondary reservoir located in a cryogenic storage tank and spaced relatively above an upper level of a cryogenic liquid of a main reservoir of the cryogenic liquid of the cryogenic storage tank;
a pick and/or place head;
at least one motor drivingly coupled to move the pick and/or place head;
a control system controlling coupled to the at least one motor and operable to:
move the pick and/or place head to place the pick and/or place head at least partially into the cryogenic fluid in liquid form in the first secondary reservoir of the cryogenic fluid in liquid form to cool the pick and/or place head; and
subsequently move the pick and/or place head to withdraw the pick and/or place head from the cryogenic fluid in liquid form in the first secondary reservoir of the cryogenic fluid in liquid form.

23. The system to store and/or retrieve specimen containers of claim 22, wherein the control system is further operable to:
move the pick and/or place head to engage the at least one of the specimen containers that is stored in the cryogenic storage tank after the pick and/or place head is move to withdraw the pick and/or place head from the cryogenic fluid in liquid form in the first secondary reservoir of the cryogenic fluid in liquid form; and
move the pick and/or place head to remove the engaged at least one of the specimen containers from the cryogenic storage tank as part of a retrieval task.

* * * * *